(12) United States Patent
Sato et al.

(10) Patent No.: US 7,098,879 B2
(45) Date of Patent: Aug. 29, 2006

(54) DISPLAY DEVICE

(75) Inventors: Tomohiko Sato, Chiba (JP); Takahiro Ochiai, Mobara (JP); Kikuo Ono, Mobara (JP); Ryutaro Oke, Mobara (JP); Norio Mamba, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 397 days.

(21) Appl. No.: 10/354,072

(22) Filed: Jan. 30, 2003

(65) Prior Publication Data

US 2003/0179335 A1    Sep. 25, 2003

(30) Foreign Application Priority Data

Jan. 31, 2002    (JP) ............................. 2002-022655

(51) Int. Cl.
*G09G 3/36* (2006.01)
(52) U.S. Cl. .......................................... 345/87; 345/92
(58) Field of Classification Search ................ 345/87, 345/90, 92, 204–206
See application file for complete search history.

(56) References Cited

U.S. PATENT DOCUMENTS

| | | | | |
|---|---|---|---|---|
| 6,046,790 A * | 4/2000 | Hara et al. | ................... | 349/172 |
| 6,049,132 A * | 4/2000 | Iwahashi et al. | ............ | 257/763 |
| 6,052,167 A * | 4/2000 | Song | .......................... | 349/139 |
| 6,323,515 B1 * | 11/2001 | Yamazaki et al. | .......... | 257/316 |
| 6,432,835 B1 * | 8/2002 | Yunogami et al. | .......... | 438/720 |
| 6,797,982 B1 * | 9/2004 | Okada et al. | ................. | 257/59 |

* cited by examiner

*Primary Examiner*—Ricardo Osorio
(74) *Attorney, Agent, or Firm*—Antonelli, Terry, Stout and Kraus, LLP.

(57) ABSTRACT

A display device such as liquid crystal display device which restrains the entrance of static electricity into a scanning signal driver circuit or a video signal driver circuit includes a pair of substrates, a signal line, a capacitance line and a counter voltage line formed on one substrate of the pair of substrate, a pixel including a thin film transistor connected to the signal line, a pixel electrode connected to the thin film transistor and a counter electrode connected to the counter voltage line, a driver circuit formed on the one substrate and connected to the signal line and an interconnection layer disposed between the pixel and the driver circuit. At least one of the capacitance line and the counter voltage line is connected to the interconnection layer between the driver circuit and the pixel.

4 Claims, 53 Drawing Sheets

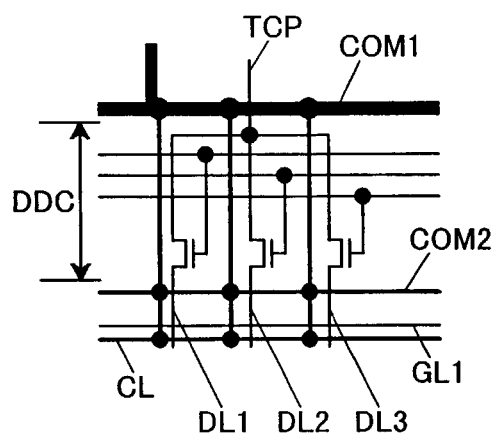
FIG.41A
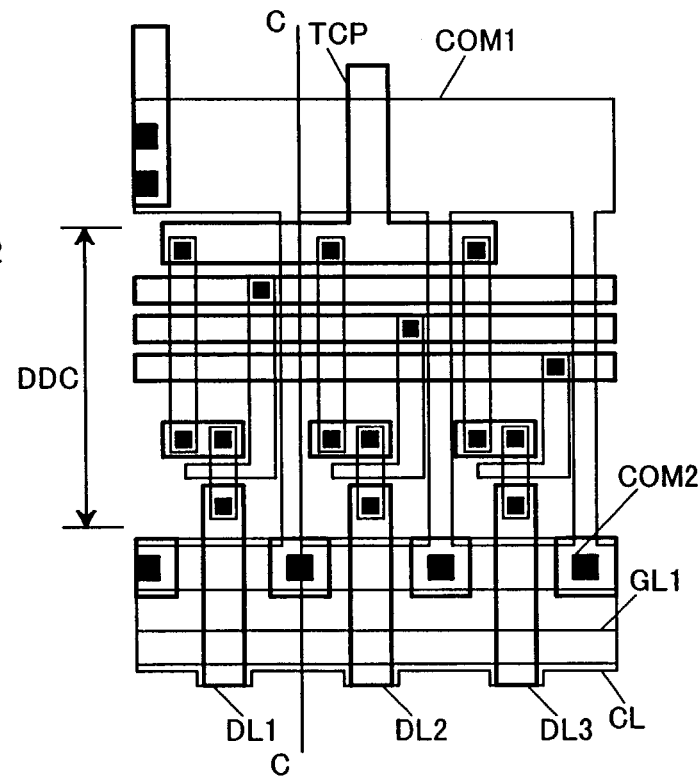
FIG.41B
FIG.41C
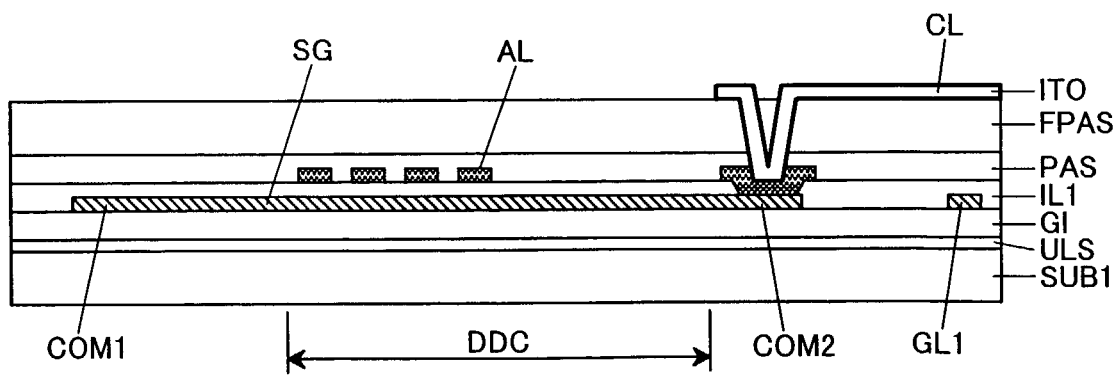

DISPLAY DEVICE

BACKGROUND OF THE INVENTION

1. Field of the Invention

The present invention relates to an image display device, and more particularly, to a liquid crystal display device in which a scanning signal driver circuit and a video signal driver circuit are formed on a liquid-crystal-side surface of one of substrates disposed in opposition to each other with a liquid crystal interposed therebetween.

2. Background Art

A liquid crystal display device includes a plurality of gate signal lines disposed in juxtaposition and a plurality of drain signal lines juxtaposed to intersect the plurality of gate signal lines on a liquid-crystal-side surface of one of substrates disposed in opposition to each other with a liquid crystal interposed therebetween. Pixel areas are respectively formed by areas each surrounded by adjacent ones of the gate signal lines and adjacent ones of the drain signal lines, and each of the pixel areas is provided with a switching element driven by a scanning signal from a corresponding one of the gate signal lines, and a pixel electrode supplied with a video signal from a corresponding one of the drain signal lines via the switching element.

In addition, a scanning signal driver circuit and a video signal driver circuit are formed on the liquid-crystal-side surface of the one of the substrates. The scanning signal driver circuit for progressively supplying scanning signals to the gate signals is formed on the side of at least one end of each of the gate signal lines, while the video signal driver circuit for supplying video signals in synchronism with the timing of supplying the scanning signals is formed on the side of at least one end of each of the drain signal lines.

SUMMARY OF THE INVENTION

However, it has been pointed out that in the liquid crystal display device constructed in this manner, since the scanning signal driver circuit or the video signal driver circuit is positioned in a peripheral portion of the substrate, problems easily occur owing to the entrance of static electricity into the scanning signal driver circuit or the video signal driver circuit.

In addition, it has been pointed out that in a liquid crystal display device of the type in which a backlight is disposed in its rear portion, light from the backlight leaks to the side of an observer through a portion in which the scanning signal driver circuit or the video signal driver circuit is formed.

Furthermore, it has been pointed out that since the scanning signal driver circuit or the video signal driver circuit is formed on a surface of a substrate such as a glass substrate, no sufficient heat radiation effect can be obtained and the scanning signal driver circuit or the video signal driver circuit is likely to malfunction.

The invention has been made in view of the above-described problems, and aims to provide a liquid crystal display device capable of restraining static electricity from entering the scanning signal driver circuit or the video signal driver circuit.

The invention also aims to provide a liquid crystal display device capable of restraining the leak of light through the portion in which the scanning signal driver circuit or the video signal driver circuit is formed.

The invention further aims to provide a liquid crystal display device capable of restraining the malfunction of the scanning signal driver circuit or the video signal driver circuit.

According to a first embodiment of a display device of the present invention, there is provided for example, a pair of substrates, and a signal line, a capacitance line and a counter voltage line formed on one substrate of the pair of substrate, and a pixel comprising a thin film transistor connected to the signal line, a pixel electrode connected to the thin film transistor and a counter electrode connected to the counter voltage line, and a driver circuit formed on the one substrate and connected to the signal line, and a interconnection layer disposed between the pixel and the driver circuit.

At least one of the capacitance line and the counter voltage line is connected to the interconnection layer between the driver circuit and the pixel.

According to a modification of the first embodiment of the display device of the present invention, for example, the signal line is a gate signal line, and the driver circuit is a scanning signal driver circuit. According to a further modification of the first embodiment, for example, the interconnection layer is disposed between the scanning signal driver circuit and the pixel, and the scanning signal driver circuit and a nearest edge of the one substrate to the scanning signal driver circuit. And according to a further modification of the first embodiment, at least one of the capacitance line and the counter voltage line is connected to the interconnection layer between the scanning signal driver circuit and the nearest edge of the one substrate. According to another modification of the first embodiment, a width of the interconnection layer between the scanning signal driver circuit and the pixel is smaller than a width of the interconnection layer between the scanning signal driver circuit and the nearest edge of the one substrate.

According to another modification of the first embodiment of the present invention, for example, the capacitance line and the gate signal line are made by same metal material and are disposed in a same layer. And according to another modification of the first embodiment of the present invention, for example, the counter voltage line is formed to cover the scanning signal driver circuit.

According to another modification of the first embodiment of the display device of the present invention, for example, the signal line is a drain signal line, and the driver circuit is a video signal driver circuit. According to a further modification of the first embodiment, for example, the interconnection layer is disposed between the video signal driver circuit and the pixel, and the video signal driver circuit and a nearest edge of the one substrate to the video signal driver circuit. And according to a further modification of the first embodiment, at least one of the capacitance line and the counter voltage line is connected to the interconnection layer between the video signal driver circuit and the nearest edge of the one substrate. According to another modification of the first embodiment, a width of the interconnection layer between the video signal driver circuit and the pixel is smaller than a width of the interconnection layer between the video signal driver circuit and the nearest edge of the one substrate.

According to another modification of the first embodiment of the present invention, for example, the interconnection layer and the drain signal line are made by same metal material and are disposed in a same layer. According to a another modification of the first embodiment of the present invention, for example, the counter voltage line is formed to cover the video signal driver circuit.

According to a modification of the second embodiment of the display device of the present invention, for example, a pair of substrates, and a signal line, a capacitance line and a counter voltage line formed on one substrate of the pair of substrate, and a pixel comprising a thin film transistor connected to the signal line, a pixel electrode connected to the thin film transistor and a counter electrode connected to the counter voltage line, and a driver circuit formed on the one substrate and connected to the signal line, and a interconnection layer disposed between the pixel and a nearest edge of the one substrate to the driver circuit.

At least one of the capacitance line and the counter voltage line is connected to the interconnection layer between the driver circuit and the nearest edge of the one substrate.

According to a second embodiment of the display device of the present invention, for example, the signal line is a gate signal line, the driver circuit is a scanning signal driver circuit, the interconnection layer is disposed between the scanning signal driver circuit and the nearest edge of the one substrate, and the scanning signal driver circuit and the pixel, and a width of the interconnection layer between the scanning signal driver circuit and the pixel is smaller than a width of the interconnection layer between the scanning signal driver circuit and the nearest edge of the one substrate.

According to a modification of the second embodiment of the display device of the present invention, for example, the signal line is a drain signal line, and the driver circuit is a video signal driver circuit. According to another modification of the second embodiment, the interconnection layer and the drain signal line are made by same metal material and are disposed in a same layer.

According to a third embodiment of the display device of the present invention, for example, a pair of substrates, a plurality of pixels comprising a plurality of pixel electrodes and a plurality of counter electrodes formed on one substrate of the pair of substrates, a plurality of gate signal lines and a plurality of drain signal lines formed on the one substrate, a plurality of capacitance lines, and a counter voltage line connected to the plurality of counter electrodes, a driver circuit connecting at least one of the plurality of gate signal lines and the plurality of drain signal lines, and a conductive layer restraining static electricity from entering the driver circuit.

The conductive layer is formed adjacent to the driver circuit, and at least one of the plurality of capacitance lines and the counter voltage line is connected to the conductive layer.

According to a modification of the second embodiment of the display device of the present invention, for example, the conductive layer is formed on the driver circuit. According to another modification of the second embodiment of the display device of the present invention, for example, the conductive layer is formed between the driver circuit and the one substrate of the pair of substrates.

And according to other embodiments of the display device of the present invention, for example, (1) A liquid crystal display device according to the invention includes, for example, at least pixels, gate signal lines and capacitance lines all of which are formed on a liquid-crystal-side surface of one of substrates disposed in opposition to each other with a liquid crystal interposed therebetween, the pixels constituting a liquid crystal display part, the gate signal lines being respectively common to pixel groups each made of pixels juxtaposed in one direction, the capacitance lines being respectively common to the pixel groups, and a scanning signal driver circuit to which at least one end of each of the gate signal lines is connected, and an interconnection layer formed to surround the scanning signal driver circuit, and the interconnection layer being formed to be smaller in line width on the same side as the liquid crystal display part than on the opposite side to the liquid crystal display part, and the capacitance lines being disposed to intersect the scanning signal driver circuit and be connected to the interconnection layer on the opposite side to the liquid crystal display part.

(2) A liquid crystal display device according to the invention includes, for example, at least pixels, gate signal lines and capacitance lines all of which are formed on a liquid-crystal-side surface of one of substrates disposed in opposition to each other with a liquid crystal interposed therebetween, the pixels constituting a liquid crystal display part, the gate signal lines being respectively common to pixel groups each made of pixels juxtaposed in one direction, the capacitance lines being respectively common to the pixel groups, a scanning signal driver circuit to which at least one end of each of the gate signal lines is connected, and an interconnection layer formed to surround the scanning signal driver circuit, the interconnection layer being formed to be smaller in line width on the same side as the liquid crystal display part than on the opposite side to the liquid crystal display part, the capacitance lines being made of an optically nontransmissive material, and being disposed to intersect a layer underlying the scanning signal driver circuit and be connected to the interconnection layer on the opposite side to the liquid crystal display part.

(3) A liquid crystal display device according to the invention includes, for example, on a liquid-crystal-side surface of one of substrates disposed in opposition to each other with a liquid crystal interposed therebetween, a plurality of gate signal lines disposed in juxtaposition, a plurality of drain signal lines juxtaposed to intersect the gate signal lines, pixel areas each formed by an area surrounded by adjacent ones of the gate signal lines and adjacent ones of the drain signal lines, a liquid crystal display part formed by an aggregation of the pixel areas, a switching element, a pixel electrode and a counter electrode all of which are disposed in each of the pixel areas, the switching element being driven by a scanning signal from a corresponding one of the gate signal lines, the pixel electrode being supplied with a video signal from a corresponding one of the drain signal lines via the switching element, the counter electrode being connected to a counter voltage signal line to generate an electric field between the counter electrode and the pixel electrode, the counter electrode being formed integrally with the counter voltage signal line and having a portion formed to cover the corresponding one of the drain signal lines and the corresponding one of the gate signal lines with an insulating layer interposed between the counter electrode and the corresponding ones, a scanning signal driver circuit to which at least one end of each of the gate signal lines is connected, and an interconnection layer formed to surround the scanning signal driver circuit, the interconnection layer being formed to be smaller in line width on the same side as the liquid crystal display part than on the opposite side to the liquid crystal display part, the counter voltage signal line being disposed to intersect a layer overlying the scanning signal driver circuit and be connected to the interconnection layer on the opposite side to the liquid crystal display part.

(4) In a liquid crystal display device according to the invention based on the construction described in (3), the counter voltage signal line is formed to cover the whole of an area in which the scanning signal driver circuit is formed.

(5) A liquid crystal display device according to the invention includes, for example, on a liquid-crystal-side surface of one of substrates disposed in opposition to each other with a liquid crystal interposed therebetween, a plurality of gate signal lines disposed in juxtaposition, a plurality of drain signal lines juxtaposed to intersect the gate signal lines, pixel areas each formed by an area surrounded by adjacent ones of the gate signal lines and adjacent ones of the drain signal lines, a liquid crystal display part formed by an aggregation of the pixel areas, a switching element, a pixel electrode and a counter electrode all of which are disposed in each of the pixel areas, the switching element being driven by a scanning signal from a corresponding one of the gate signal lines, the pixel electrode being supplied with a video signal from a corresponding one of the drain signal lines via the switching element, the counter electrode being connected to a counter voltage signal line to generate an electric field between the counter electrode and the pixel electrode, the counter electrode being formed integrally with the counter voltage signal line and having a portion formed to cover the corresponding one of the drain signal lines and the corresponding one of the gate signal lines with an insulating layer interposed between the counter electrode and the corresponding ones, a video signal driver circuit to which at least one end of each of the drain signal lines is connected, and an interconnection layer formed along the video signal driver circuit on the opposite side to the liquid crystal display part, the counter voltage signal line being disposed to intersect a layer overlying the video signal driver circuit and be connected to the interconnection layer.

(6) A liquid crystal display device according to the invention includes, for example, on a liquid-crystal-side surface of one of substrates disposed in opposition to each other with a liquid crystal interposed therebetween, a plurality of gate signal lines disposed in juxtaposition, a plurality of drain signal lines juxtaposed to intersect the gate signal lines, pixel areas each formed by an area surrounded by adjacent ones of the gate signal lines and adjacent ones of the drain signal lines, a liquid crystal display part formed by an aggregation of the pixel areas, a switching element, a pixel electrode and a counter electrode all of which are disposed in each of the pixel areas, the switching element being driven by a scanning signal from a corresponding one of the gate signal lines, the pixel electrode being supplied with a video signal from a corresponding one of the drain signal lines via the switching element, the counter electrode being connected to a counter voltage signal line to generate an electric field between the counter electrode and the pixel electrode, the counter electrode being formed integrally with the counter voltage signal line and having a portion formed to cover the corresponding one of the drain signal lines and the corresponding one of the gate signal lines with an insulating layer interposed between the counter electrode and the corresponding ones, a video signal driver circuit including a drain distribution circuit to which at least one end of each of the drain signal lines is connected, and an interconnection layer formed to surround the drain distribution circuit, the interconnection layer being formed to be smaller in line width on the same side as the liquid crystal display part than on the opposite side to the liquid crystal display part, the counter voltage signal line being disposed to intersect a layer overlying the video signal driver circuit and be connected to the interconnection layer.

(7) In a liquid crystal display device according to the invention based on one of (5) and (6), the counter voltage signal line is formed to cover the whole of an area in which the video signal driver circuit is formed.

(8) A liquid crystal display device according to the invention includes, for example, on a liquid-crystal-side surface of one of substrates disposed in opposition to each other with a liquid crystal interposed therebetween, a plurality of gate signal lines disposed in juxtaposition, a plurality of drain signal lines juxtaposed to intersect the gate signal lines, pixel areas each formed by an area surrounded by adjacent ones of the gate signal lines and adjacent ones of the drain signal lines, a liquid crystal display part formed by an aggregation of the pixel areas, a switching element and a pixel electrode which are disposed in each of the pixel areas, the switching element being driven by a scanning signal from a corresponding one of the gate signal lines, the pixel electrode being supplied with a video signal from a corresponding one of the drain signal lines via the switching element, a video signal driver circuit provided at first ends of the drain signal lines, an equalizing circuit provided at second ends of the drain signal lines, and an interconnection layer formed to surround the equalizing circuit, the interconnection layer being formed to be smaller in line width on the same side as the liquid crystal display part than on the opposite side to the liquid crystal display part.

(9) A liquid crystal display device according to the invention based on (8) further includes a counter electrode which is connected to a counter voltage signal line to generate an electric field between the counter electrode and the pixel electrode, the counter voltage signal line being disposed to intersect the equalizing circuit and be connected to the interconnection layer on the side of the equalizing circuit opposite to the liquid crystal display part.

(10) A liquid crystal display device according to the invention, for example, includes on a liquid-crystal-side surface of one of substrates disposed in opposition to each other with a liquid crystal interposed therebetween, a plurality of gate signal lines disposed in juxtaposition, a plurality of drain signal lines juxtaposed to intersect the gate signal lines, pixel areas each formed by an area surrounded by adjacent ones of the gate signal lines and adjacent ones of the drain signal lines, a liquid crystal display part formed by an aggregation of the pixel areas, a switching element, a pixel electrode and a counter electrode all of which are disposed in each of the pixel areas, the switching element being driven by a scanning signal from a corresponding one of the gate signal lines, the pixel electrode being supplied with a video signal from a corresponding one of the drain signal lines via the switching element, the counter electrode being connected to a counter voltage signal line to generate an electric field between the counter electrode and the pixel electrode, a video signal driver circuit provided at first ends of the drain signal lines, an equalizing circuit provided at second ends of the drain signal lines, and an interconnection layer formed on the side of the equalizing circuit opposite to the liquid crystal display part, the counter voltage signal line being disposed to intersect the equalizing circuit and be connected to the interconnection layer.

BRIEF DESCRIPTION OF THE DRAWINGS

The invention will become more readily appreciated and understood from the following detailed description of preferred embodiments of the invention when taken in conjunction with the accompanying drawings, in which:

FIG. 41A is a circuit diagram showing a video signal driver circuit and a peripheral portion of Embodiment 12 of the liquid crystal display device according to the invention and FIG. 41B is a diagrammatic view of FIG. 41A, and FIG. 41C is a sectional view taken along line c—c of FIG. 41B.

FIG. 41C is a sectional view taken along line c—c of FIG. 41B.

DETAILED DESCRIPTION

Preferred embodiments of a liquid crystal display device according to the invention will be described below with reference to the accompanying drawings.

EMBODIMENT 1

<<Entire Construction of Liquid Crystal Display Device>>

Figure 2:
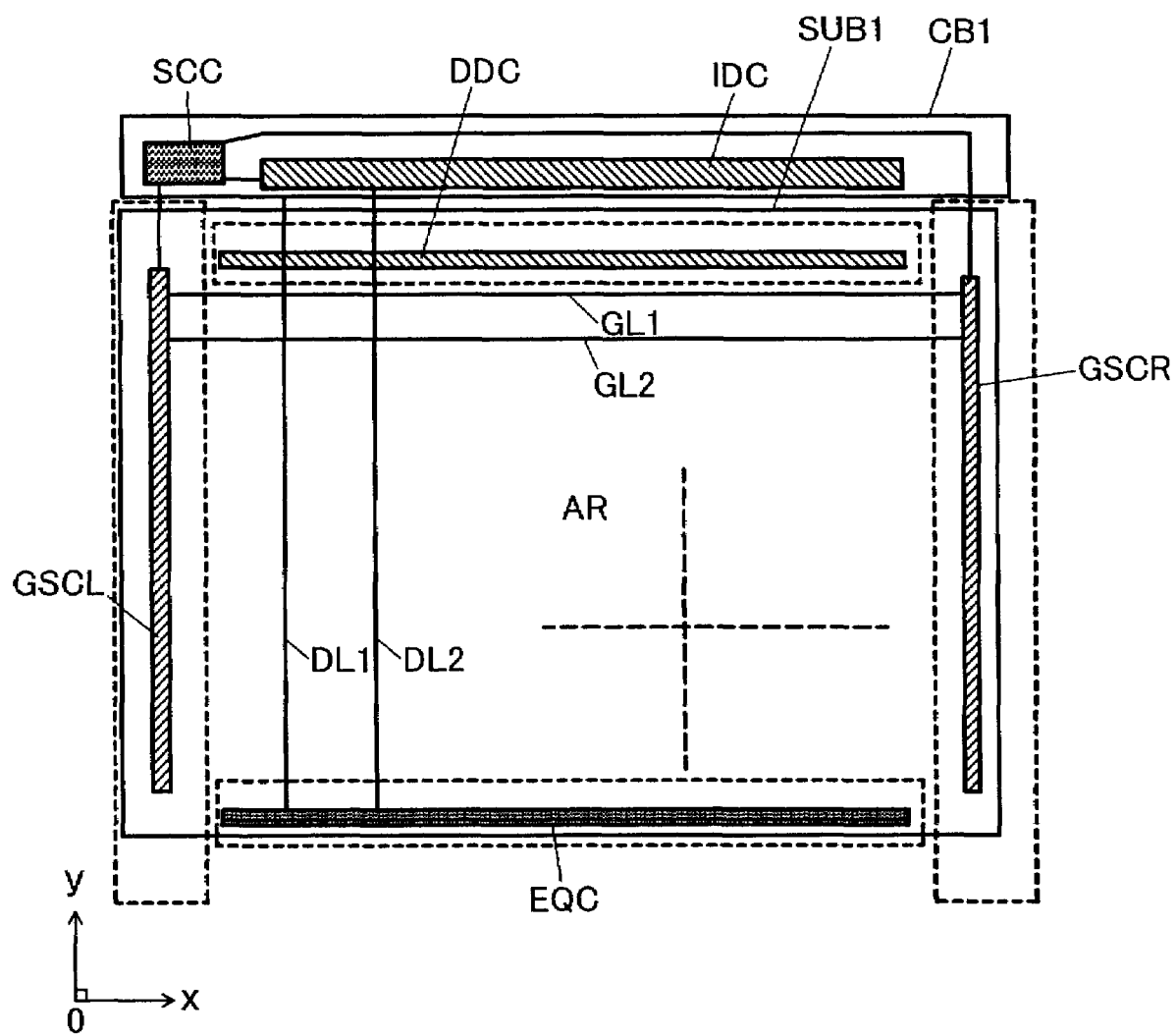
FIG. 2 is a diagrammatic view showing the entire construction of Embodiment 1 of the liquid crystal display device according to the invention.

FIG. 2 is a diagrammatic view showing the entire construction of Embodiment 1 of the liquid crystal display device according to the invention, and shows the construction of a liquid-crystal-side surface of one of transparent substrates opposed to each other with a liquid crystal interposed therebetween.

As shown in FIG. 2, gate signal lines GL1, GL2, . . . (hereinafter referred to simply also as gate signal line(s) GL) and drain signal lines DL1, DL2, . . . (hereinafter referred to simply also as drain signal line(s) DL) are formed in the central portion of a transparent substrate SUB1 except the periphery thereof. The gate signal lines GL1, GL2, . . . are disposed to be extended in the x direction and to be juxtaposed in the y direction as viewed in FIG. 2, while the drain signal lines DL1, DL2, . . . are disposed to be extended in the y direction and to be juxtaposed in the x direction as viewed in FIG. 2.

Areas each of which is surrounded by adjacent ones of the gate signal lines GL and adjacent ones of the drain signal lines DL constitute pixel area, respectively, and an aggregation of this pixel area constitutes a liquid crystal display part AR. The detailed construction of each of the pixel areas will be described later.

The both ends of the gate signal lines GL are connected to scanning signal driver circuits GSCL and GSCR, respectively, and scanning signals are progressively supplied to the gate signal lines GL by the scanning signal driver circuits GSCL and GSCR. Each of the scanning signal driver circuits GSCL and GSCR is made of, for example, a multiplicity of MIS (metal insulator semiconductor) transistors having semiconductor layers using polysilicon, and interconnection layers for interconnecting these MIS transistors. Each of the scanning signal driver circuits GSCL and GSCR is formed on the surface of the transparent substrate SUB1.

One end (the top side of FIG. 2) of each of the drain signal lines DL is connected to a video signal driver circuit. This video signal driver circuit is made of a drain distribution circuit DDC formed on a side close to the drain signal lines DL, and a circuit IDC other than the drain distribution circuit DDC. The drain distribution circuit DDC is made of, for example, a multiplicity of MIS transistors having semiconductor layers using polysilicon, and interconnection layers for interconnecting these MIS transistors. The drain distribution circuit DDC is formed on the surface of the transparent substrate SUB1. The circuit IDC is made of a semiconductor layer made of semiconductor chips mounted on the transparent substrate SUB1. The other end (the bottom side of FIG. 2) of each of the drain signal lines DL is connected to an equalizing circuit EQC. This equalizing circuit EQC is made of, for example, a multiplicity of MIS transistors having semiconductor layers using polysilicon, and interconnection layers for interconnecting these MIS transistors.

The scanning signal driver circuits GSCL and GSCR, the drain distribution circuit DDC and the circuit IDC are supplied with power source voltages or signals from a power source and control circuit SCC.

Figure 3:
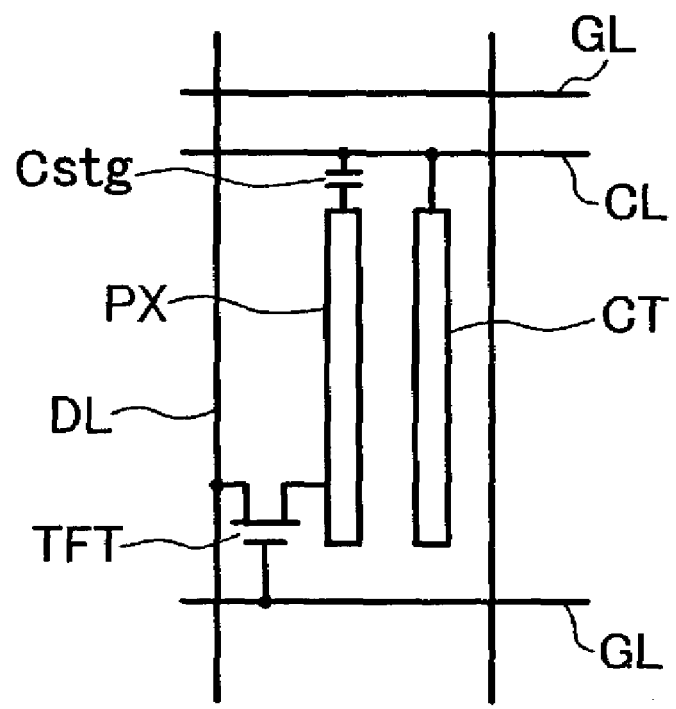
FIG. 3 is an equivalent circuit diagram showing one embodiment of a pixel of the liquid crystal display device according to the invention.

FIG. 3 is a schematic view showing the equivalent circuit of the pixel area. The pixel area is provided with a thin film transistor TFT to be electrically connected an adjacent gate line and an adjacent drain line and to be turned on by a scanning signal from the adjacent gate line GL, a pixel electrode PX to be supplied with a video signal from the adjacent drain line DL via this thin film transistor TFT, and a counter electrode CT disposed in opposition to the pixel electrode PX and arranged to generate an electric field between the counter electrode CT and the pixel electrode PX. The counter electrode CT is supplied with a signal which serves as a reference for a video signal, via a counter voltage signal line CL. The optical transmissivity of the liquid crystal is controlled by a component parallel to the transparent substrate SUB1 which component is contained in the electric field generated between the pixel electrode PX and the counter electrode CT.

A capacitance element Cstg is formed between the pixel electrode PX and the counter voltage signal line CL so that a video signal supplied to the pixel electrode PX is stored for a comparatively long time by this capacitance element Cstg.

The thin film transistor TFT has a semiconductor layer formed of polysilicon. The thin film transistor TFT has a construction approximately the same as the MIS transistor that is a constituent part of each of the scanning signal driver circuits GSCL and GSCR and the drain distribution circuit DDC. Accordingly, the scanning signal driver circuits GSCL and GSCR and the drain distribution circuit DDC are manufactured in parallel with the manufacture of the construction of the pixel area.

<<Construction of Pixel>>

Figure 4A:
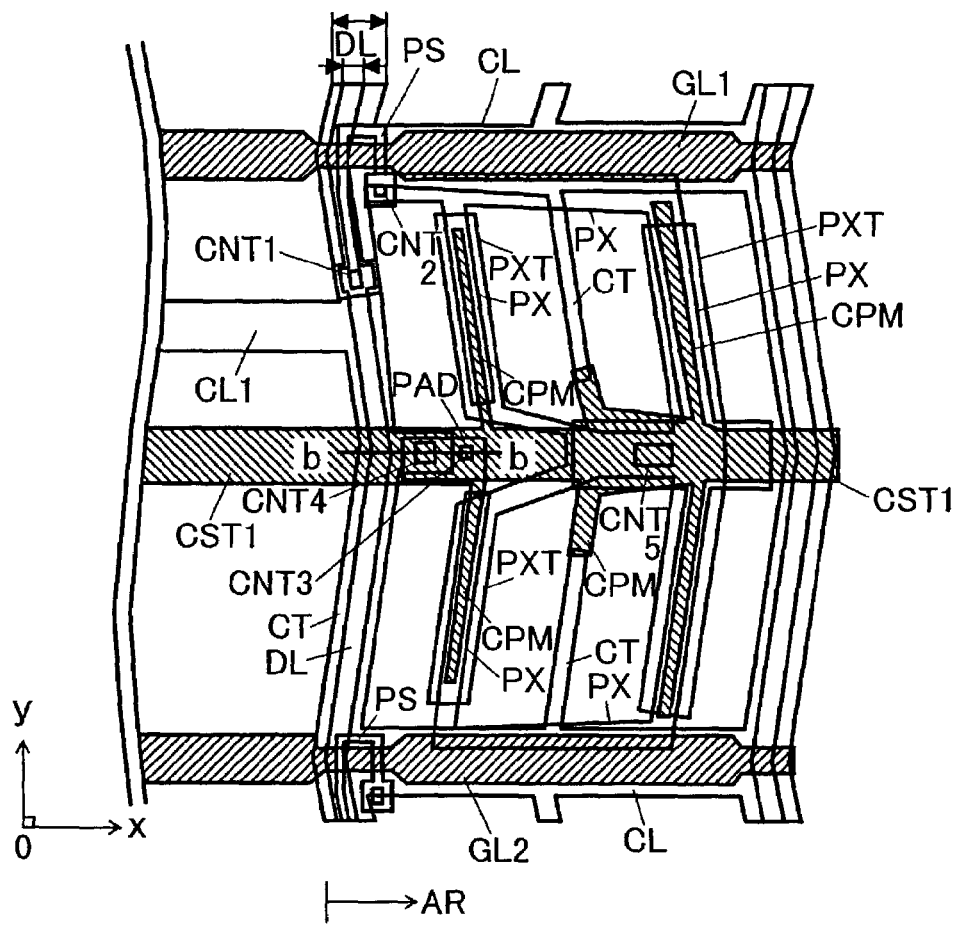
FIG. 4A is a diagrammatic view showing one embodiment of a pixel of the liquid crystal display device according to the invention and FIG. 4B is a sectional view of FIG. 4A taken along line b—b of FIG. 4A.
Figure 4B:
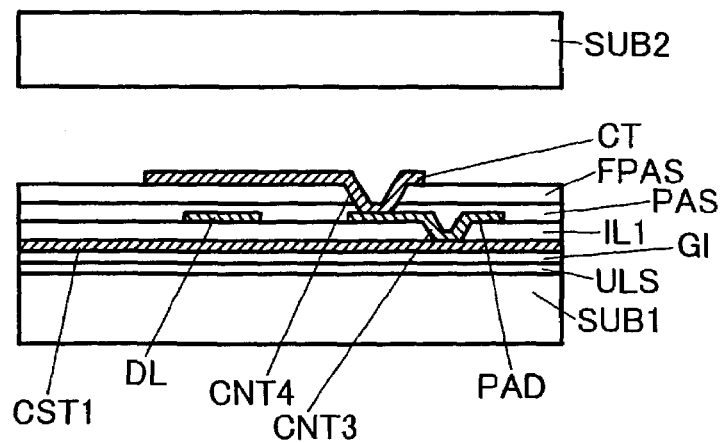

FIG. 4A is a plan view showing one embodiment of the construction of the above-described pixel area. FIG. 4B is a cross-sectional view taken along line b—b of FIG. 4A.

As shown in FIGS. 4A and 4B, a base insulating film ULS is formed on the surface of the transparent substrate SUB1, and a semiconductor layer PS made of polysilicon is formed on a part of the surface of the base insulating film ULS. This semiconductor layer PS constitutes a semiconductor layer of the thin film transistor TFT.

An insulating film GI is formed to cover the semiconductor layer PS on the entire surface of the transparent substrate SUB1. This insulating film GI functions as a gate insulating film of the thin film transistor TFT.

The gate signal lines GL1 and GL2 (hereinafter referred to also as the gate signal line(s) GL) which are disposed to be extended in the x direction and to be juxtaposed in the y direction are formed on the surface of the insulating film GI. These gate signal lines GL and the drain signal lines DL which will be described later are disposed to surround a rectangular area so that this rectangular area is constructed as a pixel area. In this case, each of the gate signal lines GL is formed to traverse the corresponding semiconductor layer PS, and a portion where each of the gate signal lines GL and the corresponding semiconductor layer PS are superposed on each other functions as a gate electrode of the thin film transistor TFT.

A capacitance signal line CST1 is formed approximately in the middle between each of the gate signal lines GL, i.e., approximately in the middle of the pixel area in parallel with the gate signal lines GL. This capacitance signal line CST1 is formed at the same time as the formation of the gate signal lines GL.

An interlayer insulating film IL1 is formed to cover each of the gate signal lines GL and the capacitance signal lines CST1 on the entire surface of the transparent substrate SUB1 on which the gate signal lines GL and the capacitance signal lines CST1 are formed in the above-described manner.

The drain signal lines DL which are disposed to be extended in the y direction and to be juxtaposed in the x direction are formed on the surface of the interlayer insulating film IL1. Each of the drain signal lines DL is connected to one end (drain region) of the corresponding semiconductor layer PS through a through-hole CNT1 previously formed to extend through the interlayer insulating film IL1 and the insulating film GI, and this connection portion also serves as a drain electrode of the thin film transistor TFT.

A pad layer PAD is formed at the same time as the formation of the drain signal lines DL. The pad layer PAD is connected to the portion of the capacitance signal line CST1 that is exposed in a through-hole CNT3 formed in the interlayer insulating film IL1. This pad layer PAD constitutes an intermediate layer to be connected to the counter electrode CT which will be described later.

The pixel electrode PX is formed at the same time as the formation of the drain signal lines DL. This pixel electrode PX is made of a plurality of (in FIG. 4A, two) strip-shaped electrodes which are disposed to be extended in the y direction and to be juxtaposed in the x direction, and the strip-shaped electrodes are formed in a pattern (an approximately square θ-shaped pattern) in which the strip-shaped electrodes are electrically connected to one another at a position above the capacitance signal line CST1 and at their end portions.

A part of the pixel electrode PX is connected to the other end (source region) of the semiconductor layer PS through a through-hole CNT2 previously formed to extend through the interlayer insulating film IL1 and the insulating film GI, and this connection portion also serves as a source electrode of the thin film transistor TFT.

A protective film PAS made of an inorganic material and a protective film FPAS made of an organic material are formed to be stacked in named order on the surface of the transparent substrate SUB1 on which the drain signal lines DL, the pixel electrode PX and the like are formed.

The stacked structure of the protective films PAS and FPAS is formed in order to avoid direct contact between the thin film transistors TFT and the liquid crystal, and is also formed to be lowered in dielectric constant.

The counter electrode CT is formed on the upper surface of the protective film FPAS. The counter electrode CT is made of an optically transparent material such as ITO (Indium Tin Oxide), ITZO (Indium Tin Zinc Oxide), IZO (Indium Zinc Oxide), $SnO_2$ (Tin Oxide) and $In_2O_3$ (Indium Oxide). This counter electrode CT is made of a plurality of (in FIG. 4A, three) electrodes which are disposed to be extended in the y direction and to be juxtaposed in the x direction similarly to the pixel electrode PX, and the pixel electrode PX is positioned between each of the counter electrodes in plan view. The counter electrode CT and the pixel electrode PX are disposed at equal intervals in the order of counter electrode, pixel electrode, counter electrode, pixel electrode, . . . , and counter electrode from the drain signal line DL lying on one side to the drain signal lines lying on the other side.

The counter electrodes CT which are respectively disposed on the opposite extreme sides of the pixel area are formed to be partly superposed on the respective drain signal lines DL, and are formed as the counter electrodes CT shared by adjacent pixel areas, respectively. In other words, each of the counter electrodes CT is superposed on the corresponding one of the drain signal lines DL so that their central axes approximately coincide with each other, and the width of each of the counter electrodes CT is formed to be larger than that of each of the drain signal lines DL. The portion of the counter electrode CT that is located on the left side of each of the drain signal lines DL constitutes one of the counter electrodes CT of the left-hand pixel area as viewed in FIG. 4A, while the portion of the counter electrode CT that is located on the right side of each of the drain signal lines DL constitutes one of the counter electrodes CT of the right-hand pixel area as viewed in FIG. 4A.

The construction in which the counter electrodes CT wider than the drain signal lines DL are respectively formed over the drain signal lines DL in the above-described manner serves the advantage that lines of electric force from the drain signal lines DL are made to terminate at the counter electrodes CT so that the lines of electric force can be prevented from terminating at the pixel electrode PX. If the lines of electric force from the drain signal lines DL terminate at the pixel electrode PX, they will produce noise.

The counter electrodes CT each made of a plurality of electrodes are formed of the same material as and integrally with the counter voltage signal lines CL which are formed to fully cover the respective gate signal lines GL, so that a reference voltage is supplied to each of the counter electrodes CT via the corresponding one of the counter voltage signal lines CL.

As shown in FIG. 4A, a lead line CL1 for supplying a reference voltage signal to the counter voltage signal lines CL and the counter electrodes CT is formed to extend between the capacitance signal line CST1 and one of the gate signal lines GL which define the pixel area, in parallel with these signal lines GL and CST1 in an area outside the liquid crystal display area AR.

Optically transparent pixel electrodes PXT which overlap the respective pixel electrodes PX are formed at the same time as the formation of the counter electrodes CT and the counter voltage signal lines CL.

The capacitance element Cstg is formed between the pixel electrode PX and the capacitance signal line CST1, and this capacitance element Cstg has, for example, the function of storing a video signal supplied to the pixel electrode PX for a comparatively long time. As shown in FIG. 4A, the capacitance signal line CST1 has extended portions CPM formed to overlap the respective pixel electrodes PX in order to increase the capacitance of the capacitance element Cstg.

<<Constructions of Scanning Signal Driver Circuit and Periphery Thereof>>

Figure 1:
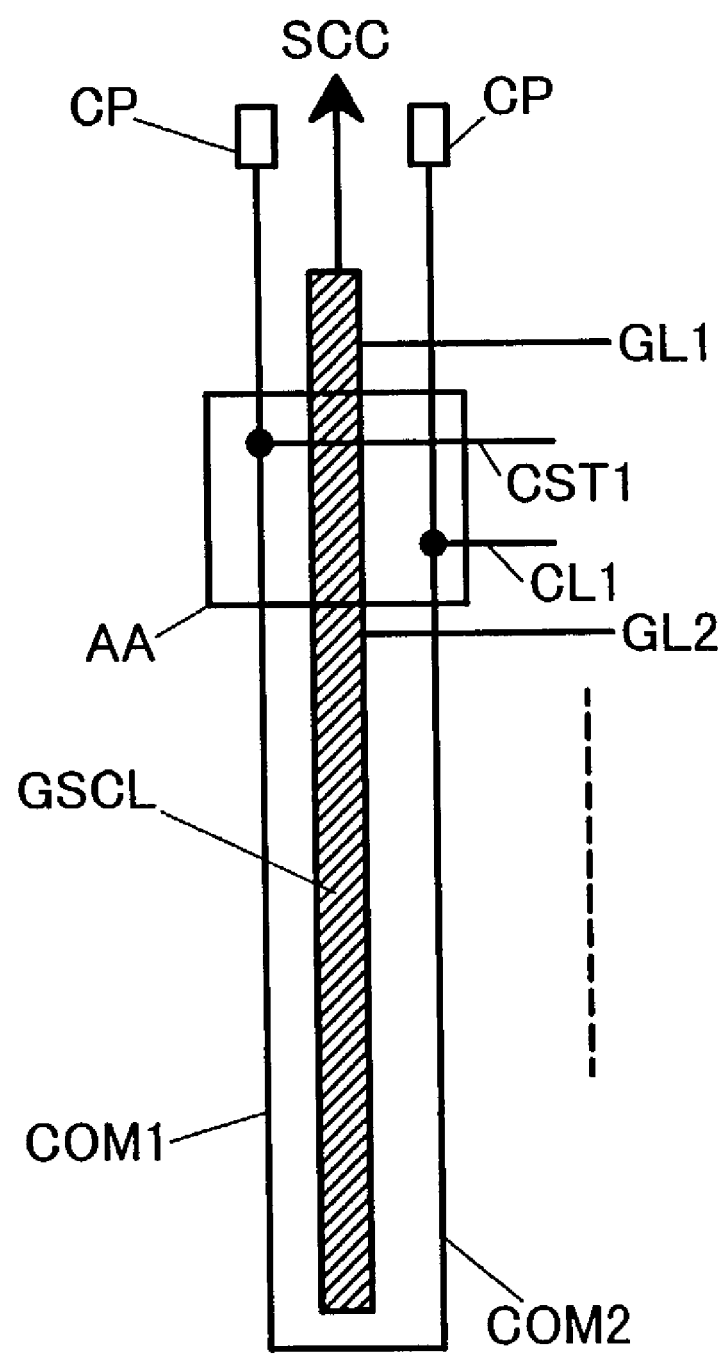
FIG. 1 is an explanatory view of the essential portions of Embodiment 1 of the liquid crystal display device according to the invention.

FIG. 1 is a plan view showing the constructions of the scanning circuits GSCL and the periphery thereof according to one embodiment.

As shown in FIG. 1, an interconnection layer COM which is connected to the lead line CL1 of the counter voltage signal line CL and the capacitance signal line CST1 is formed to surround the scanning signal driver circuit GSCL.

This interconnection layer COM is provided with two terminals CP on a side where the scanning signal driver circuit GSCL is disposed, and is formed to run from one of the terminals CP through the portion between the scanning signal driver circuit GSCL and the liquid crystal display part AR, extend to the side of the scanning signal driver circuit GSCL opposite to the liquid crystal display part AR, and reach the other of the terminals CP.

Accordingly, the scanning signal driver circuit GSCL can be protected from external static electricity by the interconnection layer COM.

In this case, the line width of an interconnection layer COM2 disposed along the scanning signal driver circuit GSCL on the same side as the liquid crystal display part AR is formed to be thinner than the line width of an interconnection layer COM1 disposed along the scanning signal driver circuit GSCL on the opposite side to the liquid crystal display area AR.

A multiplicity of gate signal lines GL extend from the scanning signal driver circuit GSCL in the liquid crystal display part AR, and the interconnection layer COM2 needs to be formed to traverse the gate signal lines GL. By thinning the line width of the interconnection layer COM2, it is possible to greatly decrease parasitic capacitance which occurs between the gate signal lines GL and the interconnection layer COM2, thereby decreasing the delay of scanning signals on the gate signal lines GL.

Accordingly, it is possible to prevent an increase in the electrical resistance of the interconnection layer COM itself by sufficiently thickening the line width of the interconnection layer COM1 on the opposite side to the liquid crystal display area AR by an amount corresponding to the amount of thinning of the line width of the interconnection layer COM2 on the same side as the liquid crystal display part AR.

The counter voltage signal lines CL formed in the area of the liquid crystal display part AR are connected via the lead lines CL1 to the interconnection layer COM2 disposed on the same side as the liquid crystal display part AR, while the capacitance signal lines CST1 pass across (intersect) the scanning signal driver circuit GSCL and are connected to the interconnection layer COM1 disposed on the opposite side to the liquid crystal display area AR.

In this case, since the capacitance signal lines CST1 are made of an optically nontransparent material such as metal, the portions of the capacitance signal lines CST1 serve a light blocking function, whereby the leak of light from the rear to the front of a liquid crystal display panel can be decreased. In addition, the capacitance signal lines CST1 have the role of heat radiation lines, and the heat of the scanning signal driver circuit GSCL can be diffused and radiated on the entire surface of the liquid crystal display panel through the heat radiation lines, whereby the scanning signal driver circuit GSCL can achieve its normal operation.

Figure 5:
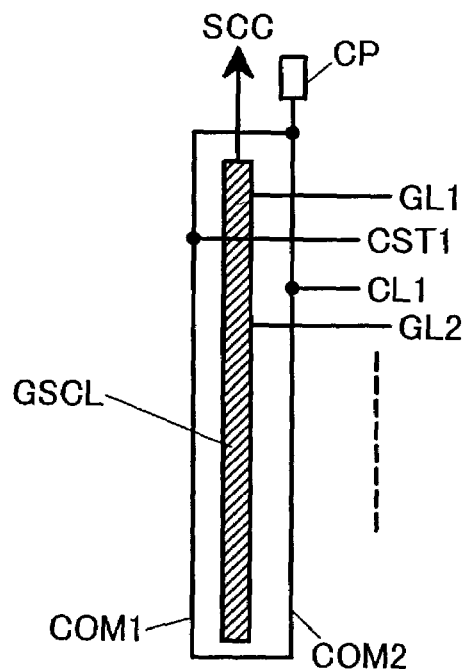
FIG. 5 is an explanatory view of the essential portions of a modification of Embodiment 1 of the liquid crystal display device according to the invention.
Figure 6:
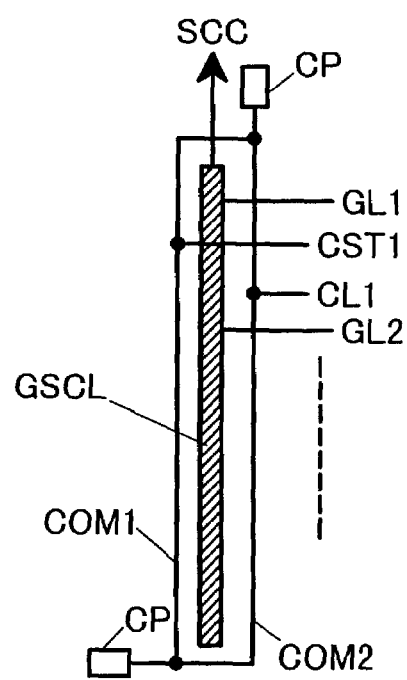
FIG. 6 is an explanatory view of the essential portions of another modification of Embodiment 1 of the liquid crystal display device according to the invention.
Figure 7:
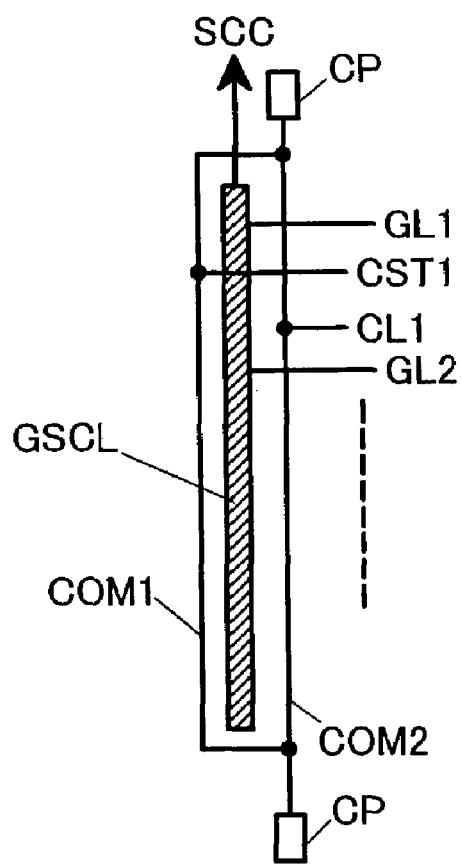
FIG. 7 is an explanatory view of the essential portions of another modification of Embodiment 1 of the liquid crystal display device according to the invention.

As shown in FIG. 5 by way of example, the interconnection layer COM may also be formed to surround completely the scanning signal driver circuit GSCL and to be supplied with a reference signal from one terminal CP. Furthermore, it goes without saying that, as shown in FIGS. 6 and 7, the interconnection layer COM may be formed in such a manner that two terminals CP are respectively provided at the mutually most distant locations and a reference signal is supplied to each of the terminals CP.

The interconnection layer COM which surrounds the scanning signal driver circuit GSCL needs only to be formed along the scanning signal driver circuit GSCL at least on the same side as and the opposite side to the liquid crystal display part AR, and the circuits formed on both sides may be electrically connected to each other.

Figure 8A:
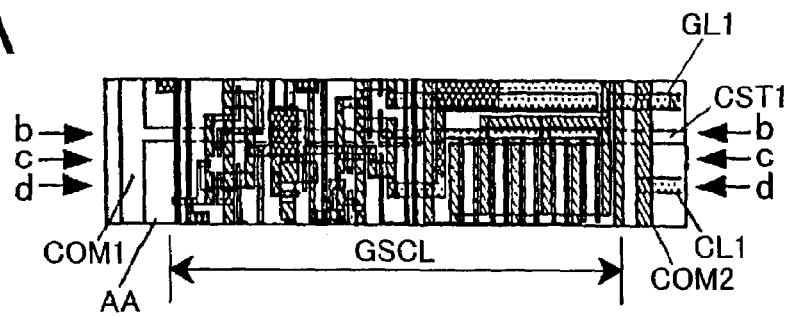
FIG. 8A is a diagrammatic view showing a scanning signal driver circuit and a peripheral portion thereof in Embodiment 1 of the liquid crystal display device according to the invention and FIGS. 8B, 8C and 8D are sectional views of FIG. 8A taken along lines b—b, c—c and d—d respectively.
Figure 8B:
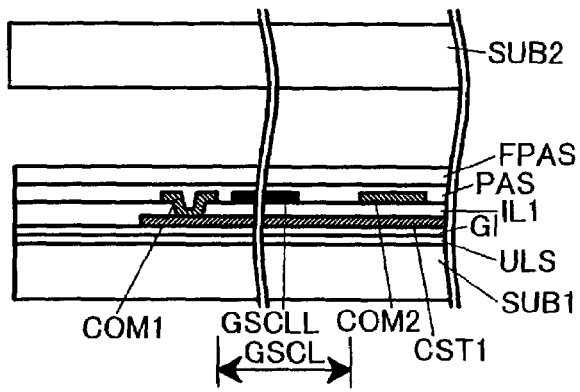
Figure 8C:
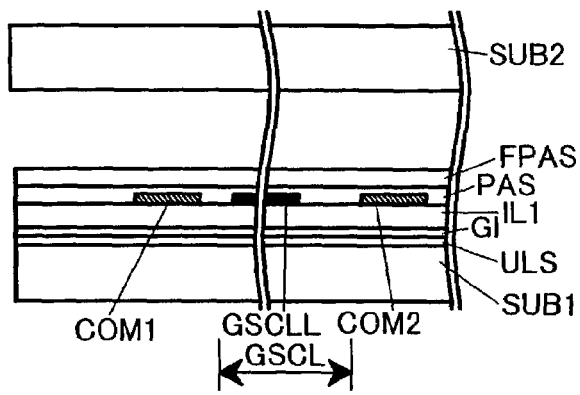
Figure 8D:
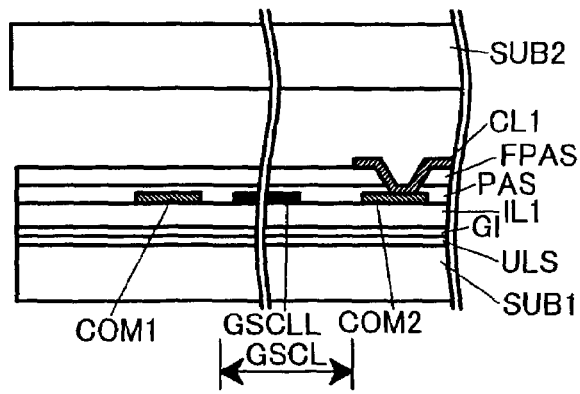

FIG. 8A is a plan view showing a part of the scanning signal driver circuit GSCL, and FIGS. 8B, 8C and 8D are cross-sectional views taken along lines b—b, c—c and d—d of FIG. 8A, respectively.

As shown in FIGS. 8B, 8C and 8D, the interconnection layer COM is formed on the upper surface of the interlayer insulating film IL1, and is formed at the same time as the formation of, for example, the drain signal lines DL.

As shown in FIG. 8B, the capacitance signal line CST1 is positioned to underlie and intersect the scanning signal driver circuit GSCL with the interlayer insulating film IL1 interposed therebetween. The connection between the capacitance signal line CST1 and the interconnection layer COM1 is provided through a through-hole formed in the interlayer insulating film IL1.

In this case, since the capacitance signal line CST1 is formed of metal, the capacitance signal line CST1 has a light blocking function in a portion which intersects the scanning signal driver circuit GSCL, whereby the leak of light from the rear to the front of the liquid crystal display panel can be decreased. In addition, the capacitance signal line CST1 has the role of a heat radiation line, whereby the scanning signal driver circuit GSCL can achieve its normal operation.

As shown in FIG. 8D, the lead line CL1 of the counter voltage signal line CL is connected to an interconnection layer through a through-hole which extends through the protective film FPAS and the protective film PAS.

EMBODIMENT 2

Figure 9:
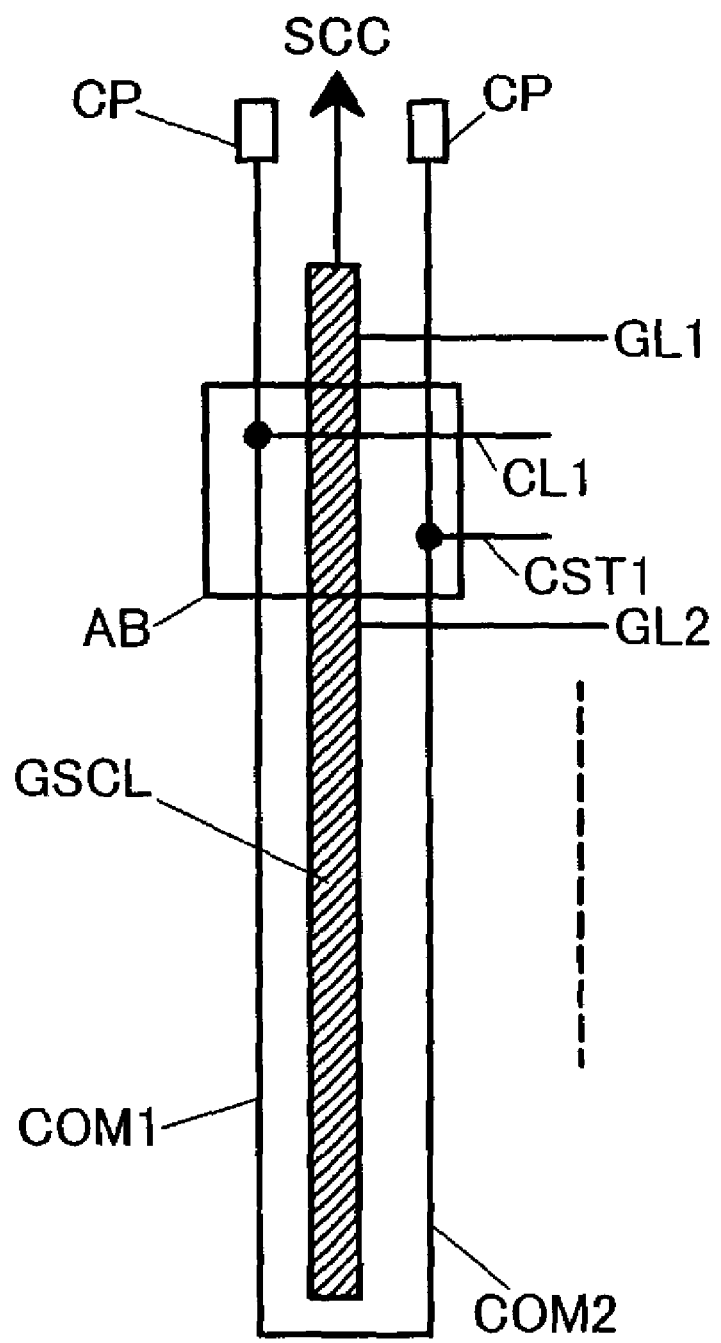
FIG. 9 is an explanatory view of the essential portions of Embodiment 2 of the liquid crystal display device according to the invention.

FIG. 9 is a plan view showing Embodiment 2 of the liquid crystal display device according to the invention, and is a view corresponding to FIG. 1.

As compared with Embodiment 1 shown in FIG. 1, Embodiment 2 has a different construction in that the lead line CL1 of the counter voltage signal line CL that is connected to the interconnection layer COM1 formed along the scanning signal driver circuit GSCL on the opposite side to the liquid crystal display part AR is formed to intersect the scanning signal driver circuit GSCL in a layer overlying the scanning signal driver circuit GSCL.

According to this construction, the lead line CL1 can partly prevent electromagnetic waves from entering the scanning signal driver circuit GSCL from outside, thereby decreasing the malfunction of the scanning signal driver circuit GSCL due to external noise.

In this case, the capacitance signal line CST1 is connected to the interconnection layer COM2 formed along the scanning signal driver circuit GSCL on the same side as the liquid crystal display part AR.

Figure 10:
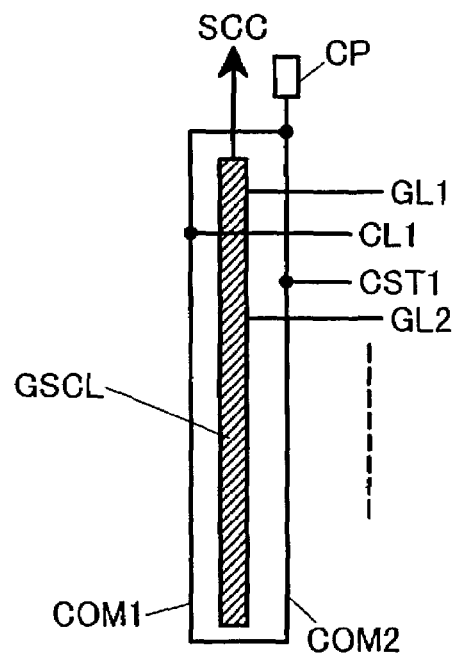
FIG. 10 is an explanatory view of the essential portions of a modification of Embodiment 2 of the liquid crystal display device according to the invention.
Figure 11:
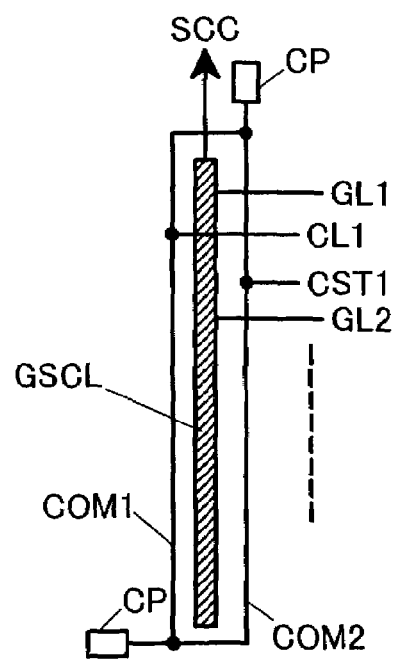
FIG. 11 is an explanatory view of the essential portions of another modification of Embodiment 2 of the liquid crystal display device according to the invention.
Figure 12:
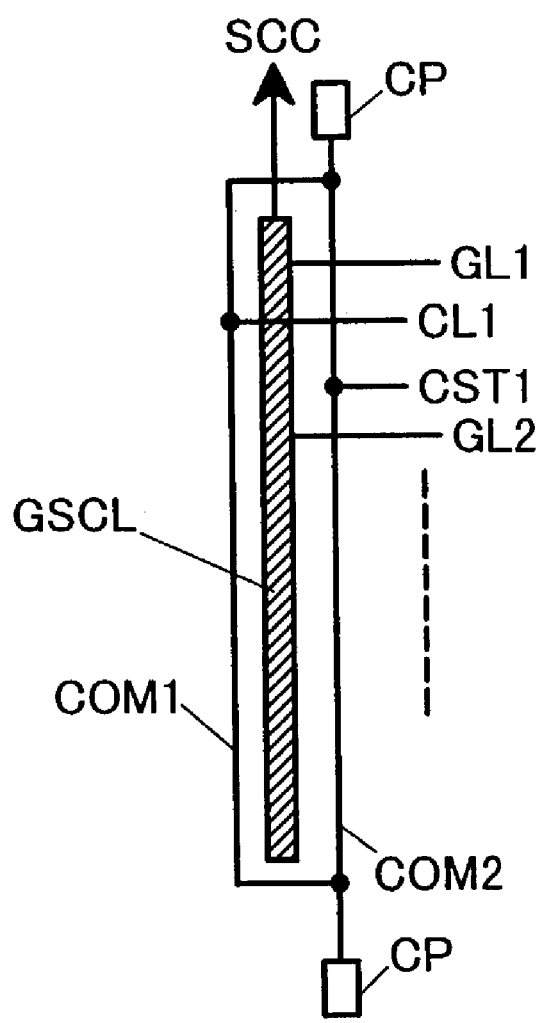
FIG. 12 is an explanatory view of the essential portions of another modification of Embodiment 2 of the liquid crystal display device according to the invention.

Incidentally, in this case as well, as shown in FIG. 10 by way of example, the interconnection layer COM may also be formed to surround completely the scanning signal driver circuit GSCL and to be supplied with a reference signal from one terminal CP. Furthermore, it goes without saying that, as shown in FIGS. 11 and 12, the interconnection layer COM may be formed in such a manner that two terminals CP are respectively provided at the mutually most distant locations and a reference signal is supplied to each of the terminals CP.

Figure 13A:
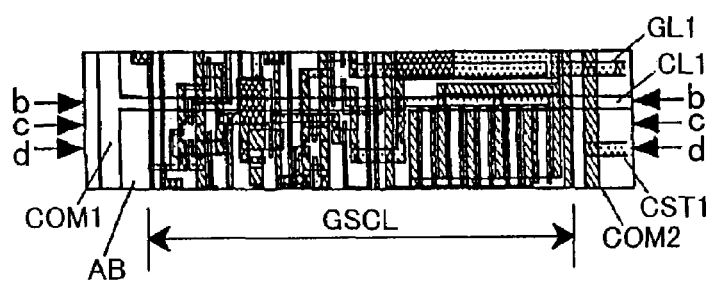
FIG. 13A is a diagrammatic view showing the scanning signal driver circuit and the peripheral portion thereof in Embodiment 2 of the liquid crystal display device according to the invention and FIGS. 13B, 13C and 13D are sectional views of FIG. 13A taken along lines b—b, c—c and d—d respectively.
Figure 13B:
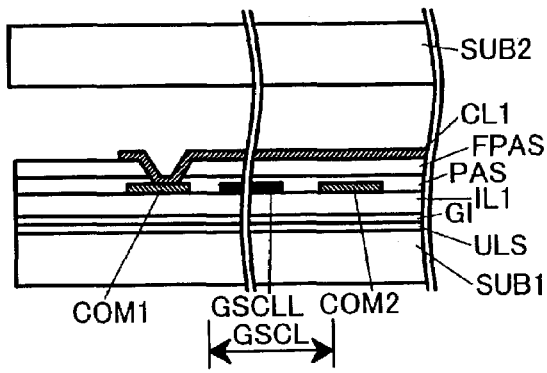
Figure 13C:
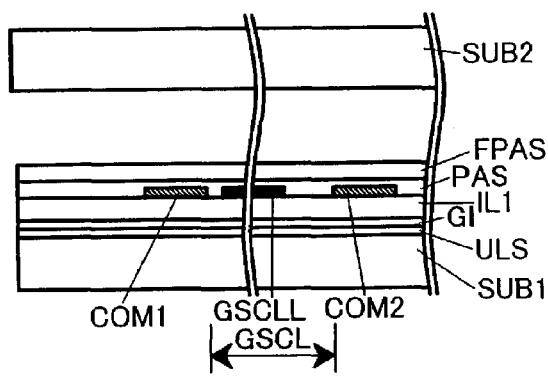
Figure 13D:
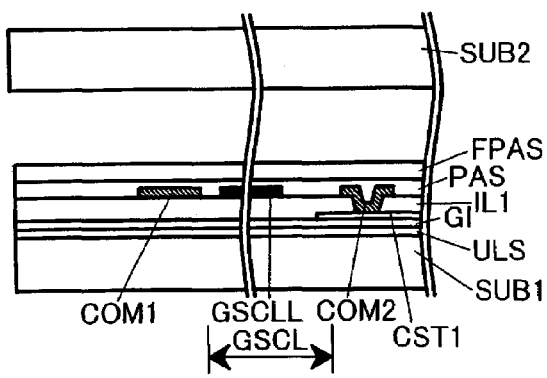

FIG. 13A is a plan view showing a part of the scanning signal driver circuit GSCL, and FIGS. 13B, 13C and 13D are cross-sectional views taken along lines b—b, c—c and d—d of FIG. 13A, respectively.

As shown in FIG. 13B, the lead line CL1 of the counter voltage signal line CL is positioned to overlie and intersect the scanning signal driver circuit GSCL, and is connected to the interconnection layer COM1 through a through-hole formed to extend through the protective film FPAS and the protective film PAS.

As shown in FIG. 13D, the capacitance signal line CST1 is connected to the interconnection layer COM2 through a through-hole which extends through the interlayer insulating film IL1 overlying the capacitance signal line CST1.

EMBODIMENT 3

Figure 14A:
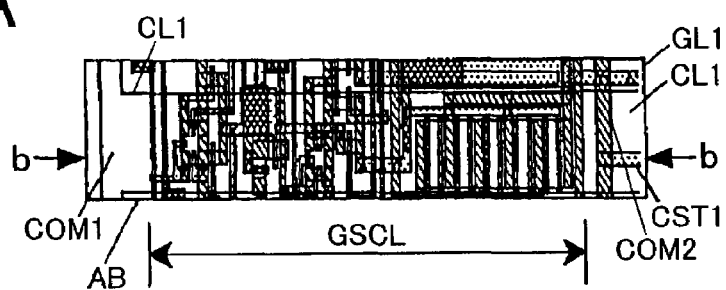
FIG. 14A is a diagrammatic view showing the scanning signal driver circuit and the peripheral portion thereof in Embodiment 3 of the liquid crystal display device according to the invention and FIG. 14B is a sectional view of FIG. 14A taken along line b—b of FIG. 14A.
Figure 14B:
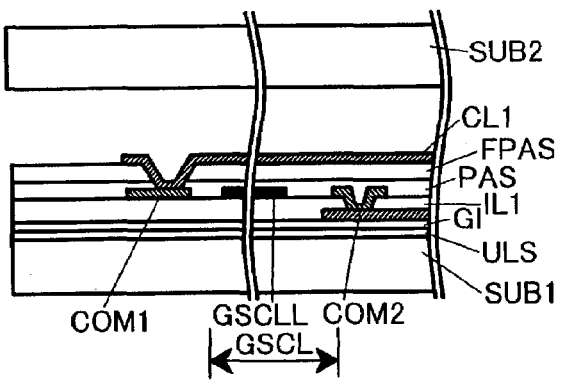

FIG. 14A is a plan view showing a part of the scanning signal driver circuit GSCL, and is a view corresponding to FIG. 13A. FIG. 14B is a cross-sectional view taken along line b—b of FIG. 14A.

As compared with Embodiment 2 shown in FIG. 13A, Embodiment 3 has a different construction in that the lead line CL1 of the counter voltage signal line CL is formed to cover the entire area of the scanning signal driver circuit GSCL.

According to this construction, the lead line CL1 can approximately completely prevent electromagnetic waves from entering the scanning signal driver circuit GSCL from outside, thereby preventing the malfunction of the scanning signal driver circuit GSCL due to external noise.

EMBODIMENT 4

Figure 15:
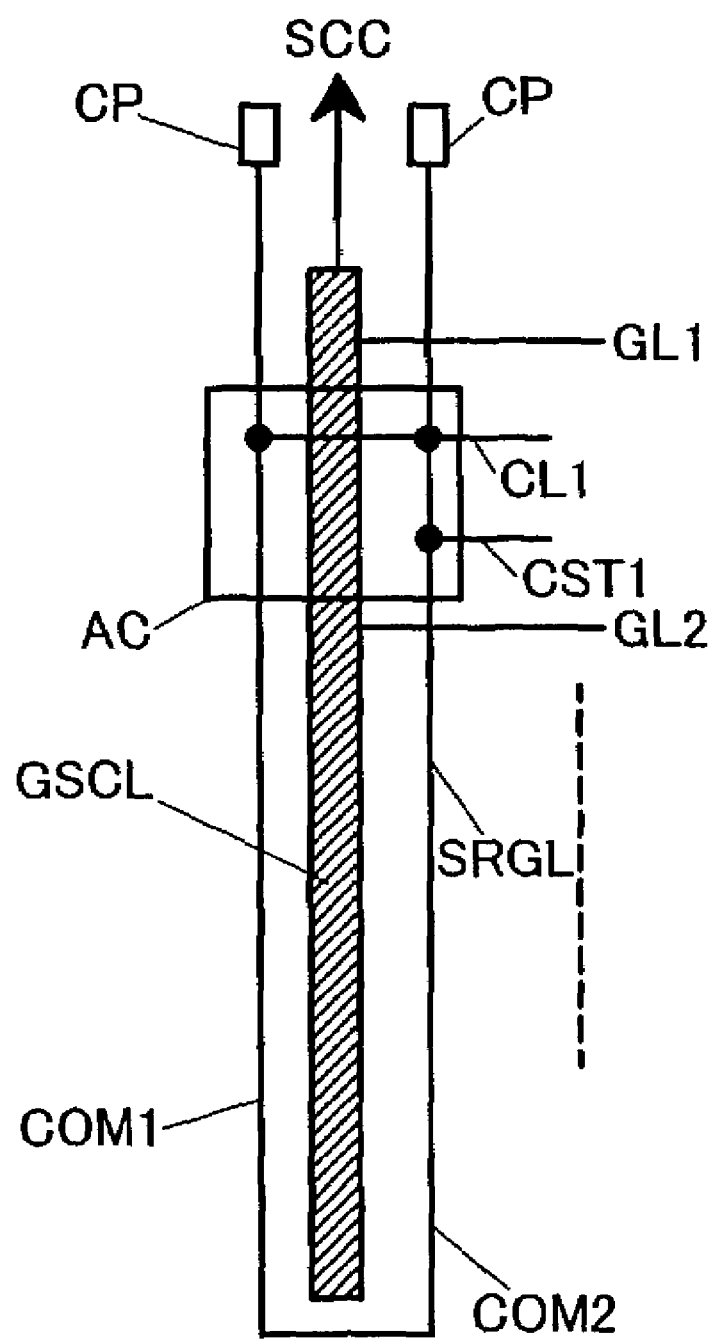
FIG. 15 is an explanatory view of the essential portions of Embodiment 4 of the liquid crystal display device according to the invention.

FIG. 15 is a plan view showing Embodiment 4 of the liquid crystal display device according to the invention, and is a view corresponding to FIG. 9.

As compared with Embodiment 3 shown in FIG. 9, Embodiment 4 has a different construction in that the lead line CL1 of the counter voltage signal line CL that is formed to intersect the scanning signal driver circuit GSCL is connected not only to the interconnection layer COM1 disposed on the opposite side to the liquid crystal display part AR but also to the interconnection layer COM2 disposed on the same side as the liquid crystal display part AR.

This construction serves the advantage that even if disconnection occurs in the interconnection layer COM1 disposed on the opposite side to the liquid crystal display part AR, a reference signal can be reliably supplied to the counter voltage signal line CL.

Figure 16:
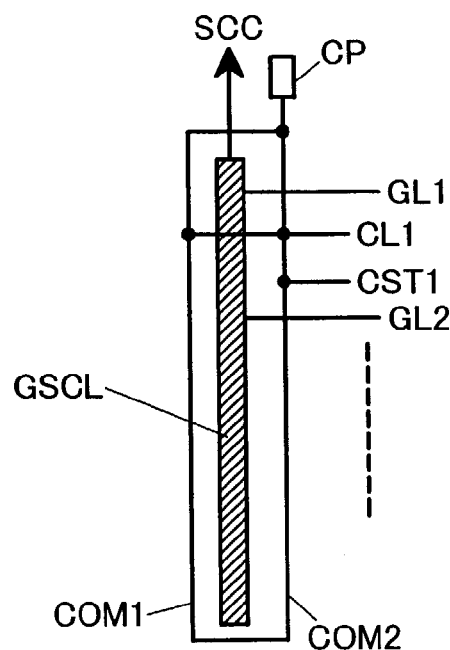
FIG. 16 is an explanatory view of the essential portions of a modification of Embodiment 4 of the liquid crystal display device according to the invention.
Figure 17:
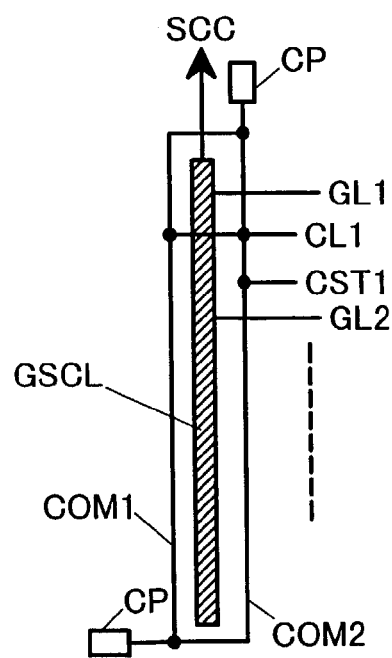
FIG. 17 is an explanatory view of the essential portions of another modification of Embodiment 4 of the liquid crystal display device according to the invention.
Figure 18:
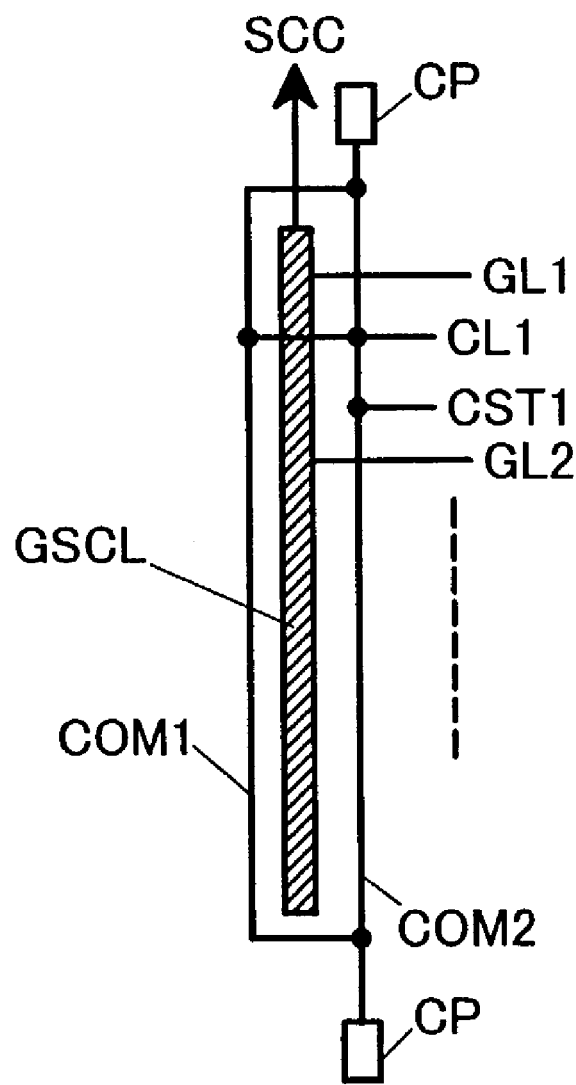
FIG. 18 is an explanatory view of the essential portions of another modification of Embodiment 4 of the liquid crystal display device according to the invention.

Incidentally, in this case as well, as shown in FIG. 16 by way of example, the interconnection layer COM may also be formed to surround completely the scanning signal driver circuit GSCL and to be supplied with a reference signal from one terminal CP. Furthermore, it goes without saying that, as shown in FIGS. 17 and 18, the interconnection layer COM may be formed in such a manner that two terminals CP are respectively provided at the mutually most distant locations and a reference signal is supplied to each of the terminals CP.

Figure 19A:
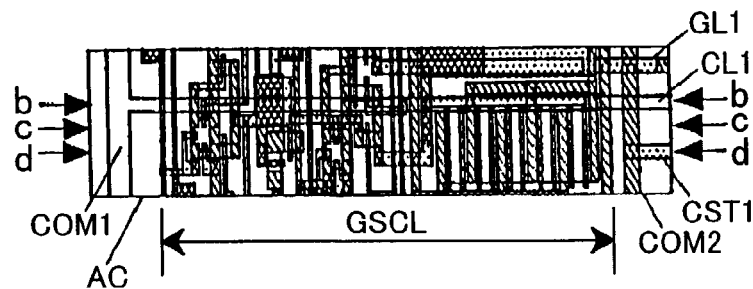
FIG. 19A is a diagrammatic view showing the scanning signal driver circuit and the peripheral portion thereof in Embodiment 4 of the liquid crystal display device according to the invention and FIGS. 19B, 19C and 19D are sectional views of FIG. 19A taken along lines b—b, c—c and d—d respectively.
Figure 19B:
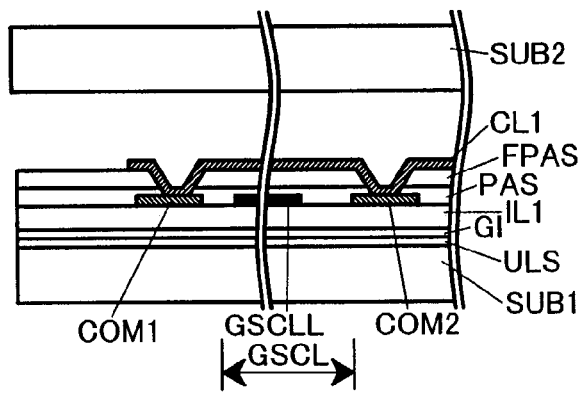
Figure 19C:
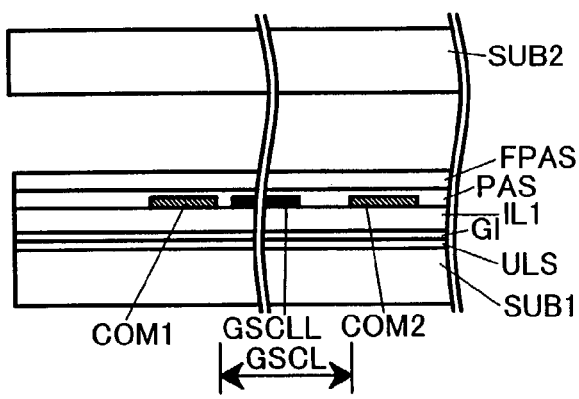
Figure 19D:
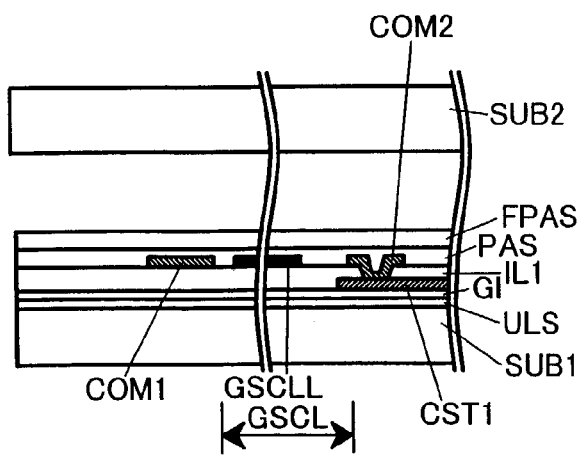

FIG. 19A is a plan view showing a part of the scanning signal driver circuit GSCL, and FIGS. 19B, 19C and 19D are cross-sectional views taken along lines b—b, c—c and d—d of FIG. 19A, respectively.

As shown in FIG. 19B, the lead line CL1 of the counter voltage signal line CL is connected to the interconnection layer COM1 disposed on the opposite side to the liquid crystal display part AR and to the interconnection layer COM2 disposed on the same side as the liquid crystal display part AR, respectively, through through-holes formed in the protective film FPAS and the protective film PAS.

Figure 20A:
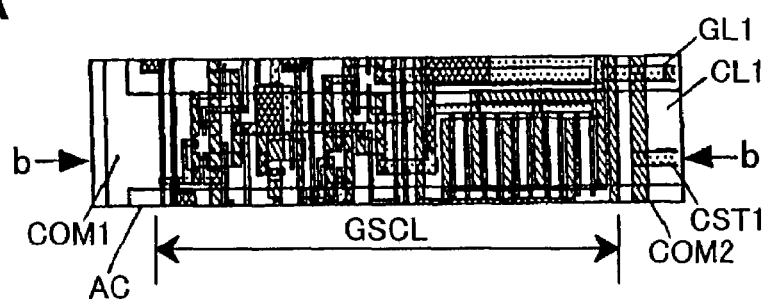
FIG. 20A is a diagrammatic view showing other examples of the scanning signal driver circuit and the peripheral portion thereof in Embodiment 4 of the liquid crystal display device according to the invention and FIG. 20B is a sectional view of FIG. 20A taken along line b—b.
Figure 20B:
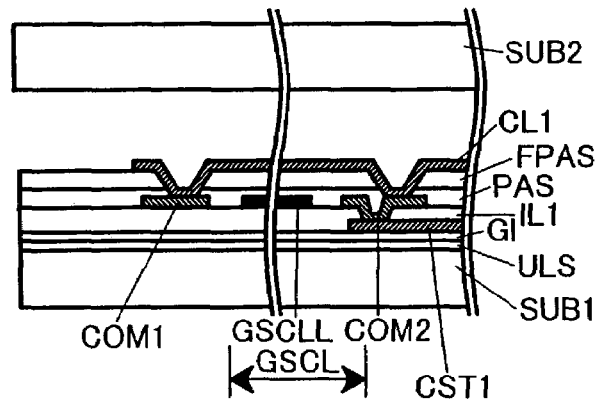

In this case, as shown in FIGS. 20A and 20B, the lead line CL1 of the counter voltage signal line CL may be formed to cover the entire area of the scanning signal driver circuit GSCL, and may be connected at required locations to the interconnection layer COM1 disposed on the opposite side to the liquid crystal display part AR and to the interconnection layer COM2 disposed on the same side as the liquid crystal display part AR.

EMBODIMENT 5

Figure 21:
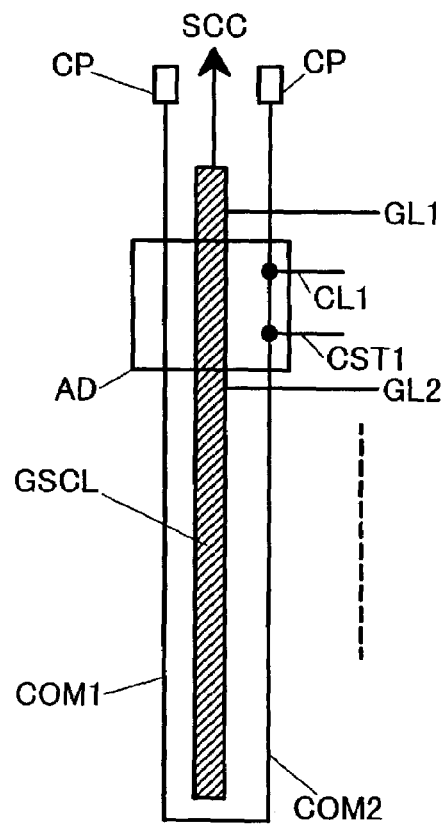
FIG. 21 is an explanatory view of the essential portions of Embodiment 5 of the liquid crystal display device according to the invention.

FIG. 21 is a plan view showing Embodiment 5 of the liquid crystal display device according to the invention, and is a view corresponding to FIG. 15.

As compared with Embodiment 4 shown in FIG. 15, Embodiment 5 has a different construction in that both the capacitance signal line CST1 and the lead line CL1 of the counter voltage signal line CL are connected to only the interconnection layer COM2 disposed on the same side as the liquid crystal display part AR.

Figure 22:
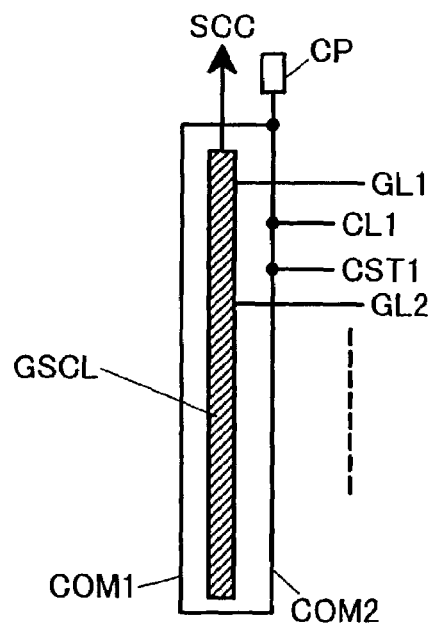
FIG. 22 is an explanatory view of the essential portions of a modification of Embodiment 5 of the liquid crystal display device according to the invention.
Figure 23:
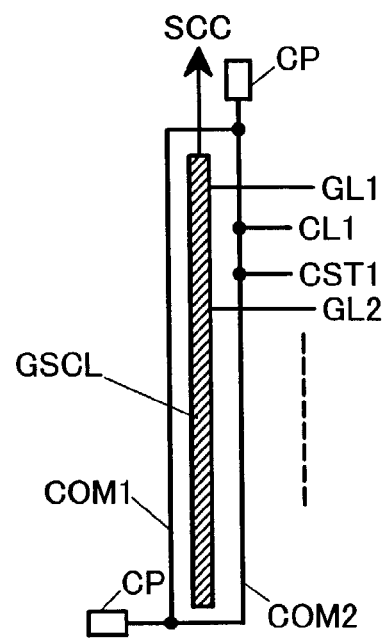
FIG. 23 is an explanatory view of the essential portions of another modification of Embodiment 5 of the liquid crystal display device according to the invention.
Figure 24:
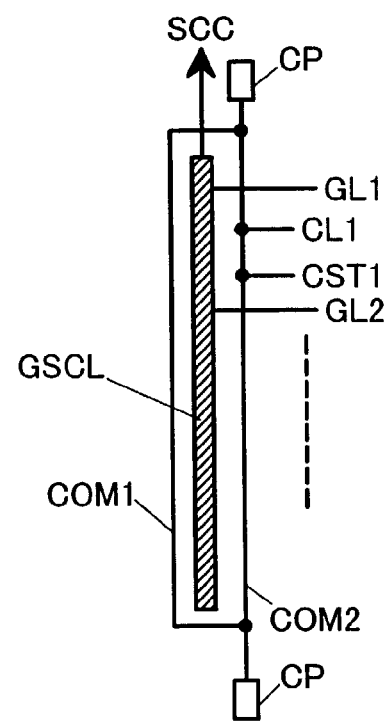
FIG. 24 is an explanatory view of the essential portions of another modification of Embodiment 5 of the liquid crystal display device according to the invention.

Incidentally, in this case as well, as shown in FIG. 22 by way of example, the interconnection layer COM may also be formed to surround completely the scanning signal driver circuit GSCL and to be supplied with a reference signal from one terminal CP. Furthermore, it goes without saying that, as shown in FIGS. 23 and 24, the interconnection layer COM may be formed in such a manner that two terminals CP are respectively provided at the mutually most distant locations and a reference signal is supplied to each of the terminals CP.

Figure 25A:
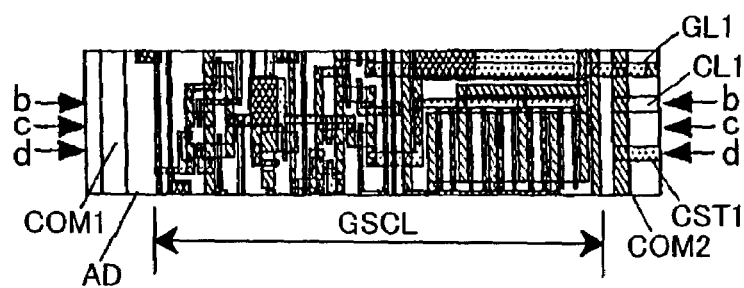
FIG. 25A is a diagrammatic view showing the scanning signal driver circuit and the peripheral portion thereof in Embodiment 5 of the liquid crystal display device according to the invention and FIGS. 25B, 25C and 25D are sectional views of FIG. 25A taken along lines b—b, c—c and d—d respectively.
Figure 25B:
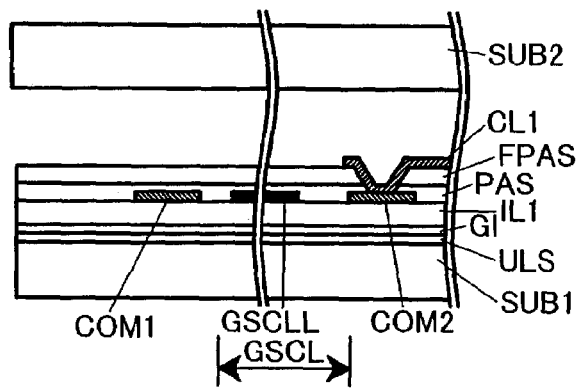
Figure 25C:
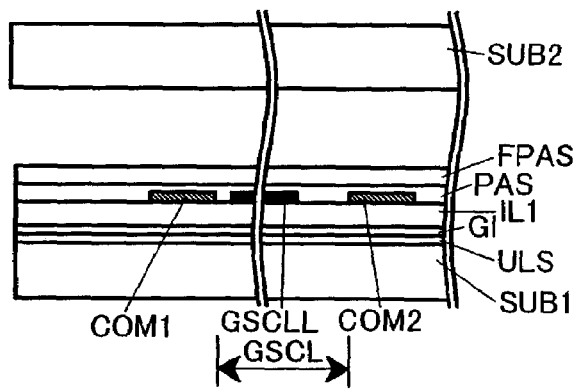
Figure 25D:
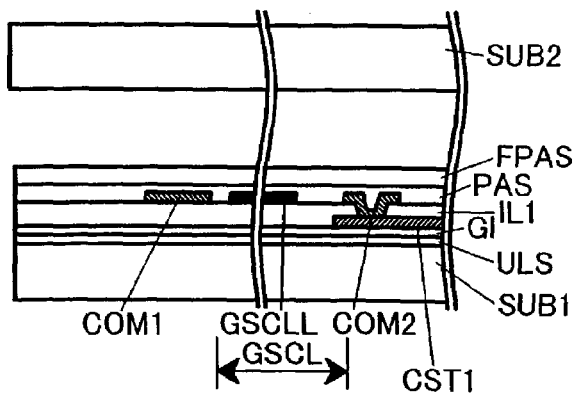

FIG. 25A is a plan view showing a part of the scanning signal driver circuit GSCL, and FIGS. 25B, 25C and 25D are cross-sectional views taken along lines b—b, c—c and d—d of FIG. 25A, respectively.

As shown in FIG. 25B, the lead line CL1 of the counter voltage signal line CL is connected to the interconnection layer COM2 disposed on the same side as the liquid crystal display part AR, through a through-hole formed to extend through the protective film FPAS and the protective film PAS.

As shown in FIG. 25D, the capacitance signal line CST1 is connected to the interconnection layer COM2 disposed on the same side as the liquid crystal display part AR, through a through-hole formed in the interlayer insulating film IL1 overlying the capacitance signal line CST1.

EMBODIMENT 6

Figure 26:
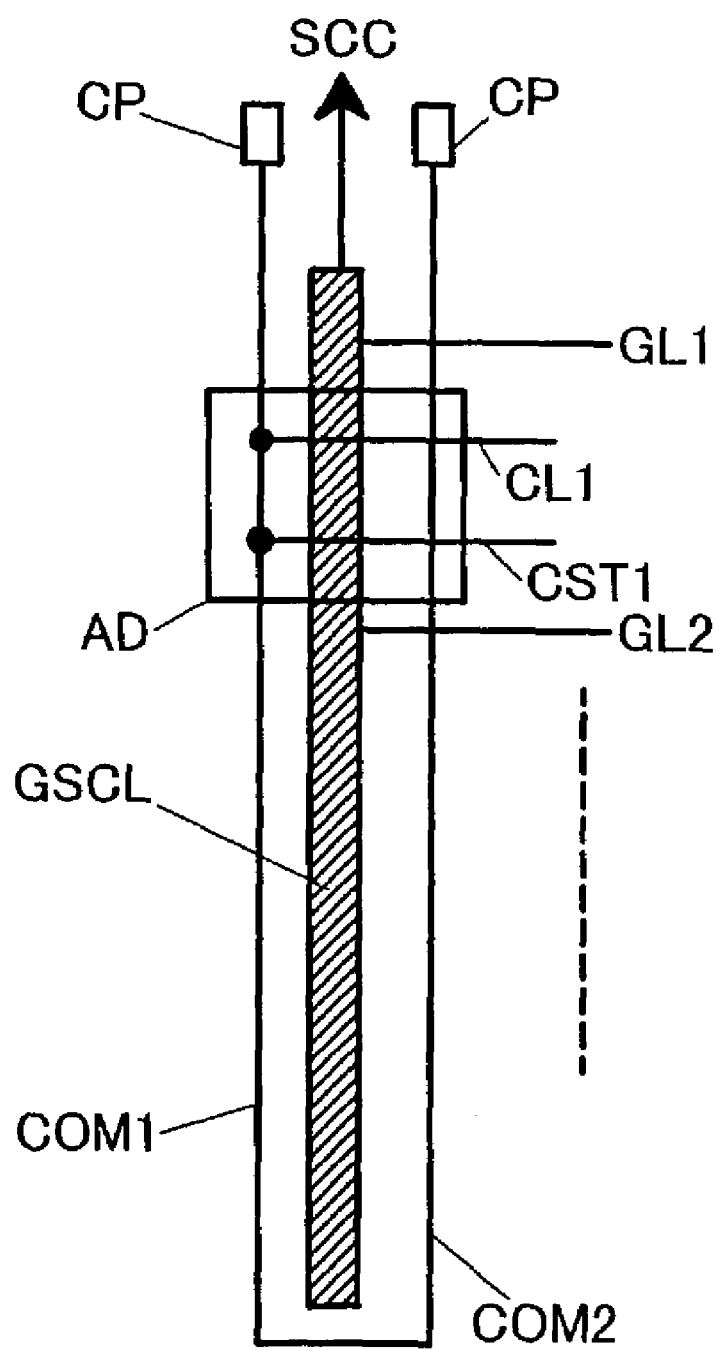
FIG. 26 is an explanatory view of the essential portions of Embodiment 6 of the liquid crystal display device according to the invention.

FIG. 26 is a plan view showing Embodiment 6 of the liquid crystal display device according to the invention, and is a view corresponding to FIG. 21.

As compared with Embodiment 5 shown in FIG. 21, Embodiment 6 has a different construction in that both the capacitance signal line CST1 and the lead line CL1 of the counter voltage signal line CL are connected to the interconnection layer COM1 and the interconnection layer COM2 disposed on the same side as and on the opposite side to the liquid crystal display part AR.

Figure 27:
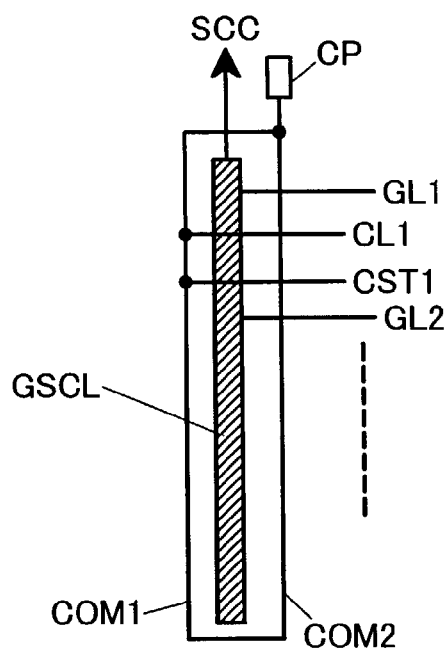
FIG. 27 is an explanatory view of the essential portions of a modification of Embodiment 6 of the liquid crystal display device according to the invention.
Figure 28:
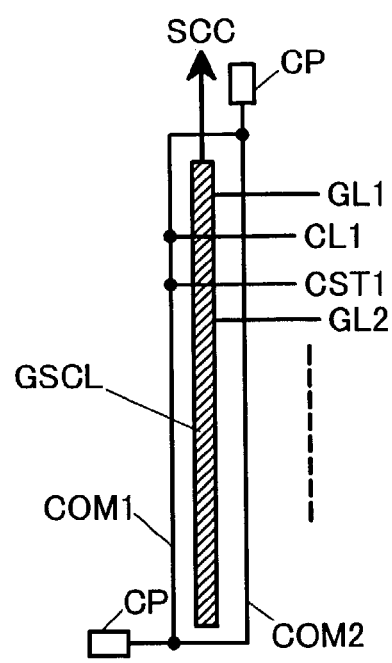
FIG. 28 is an explanatory view of the essential portions of another modification of Embodiment 6 of the liquid crystal display device according to the invention.
Figure 29:
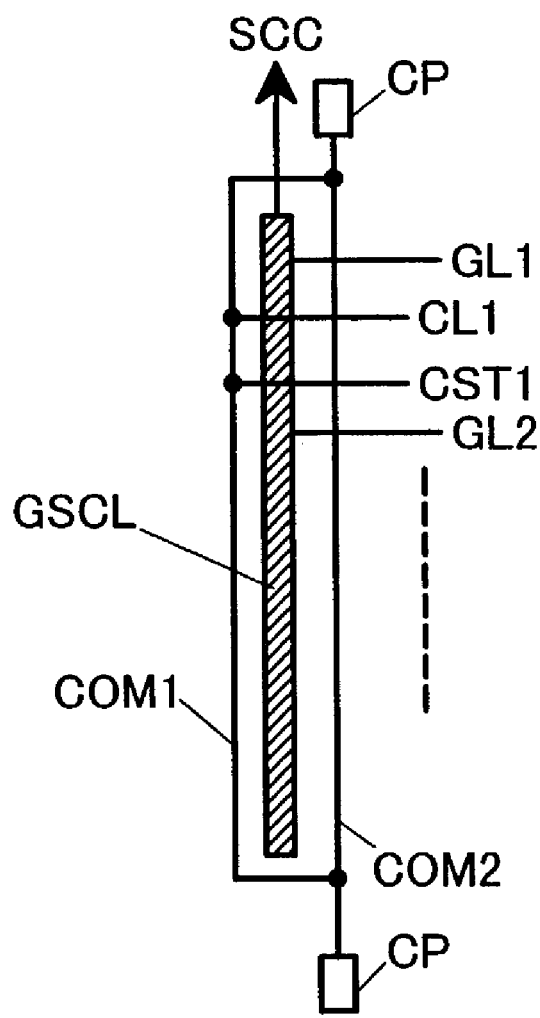
FIG. 29 is an explanatory view of the essential portions of another modification of Embodiment 6 of the liquid crystal display device according to the invention.

Incidentally, in this case as well, as shown in FIG. 27 by way of example, the interconnection layer COM may also be formed to surround completely the scanning signal driver circuit GSCL and to be supplied with a reference signal from one terminal CP. Furthermore, it goes without saying that, as shown in FIGS. 28 and 29, the interconnection layer COM may be formed in such a manner that two terminals CP are respectively provided at the mutually most distant locations and a reference signal is supplied to each of the terminals CP.

EMBODIMENT 7

Figure 30A:
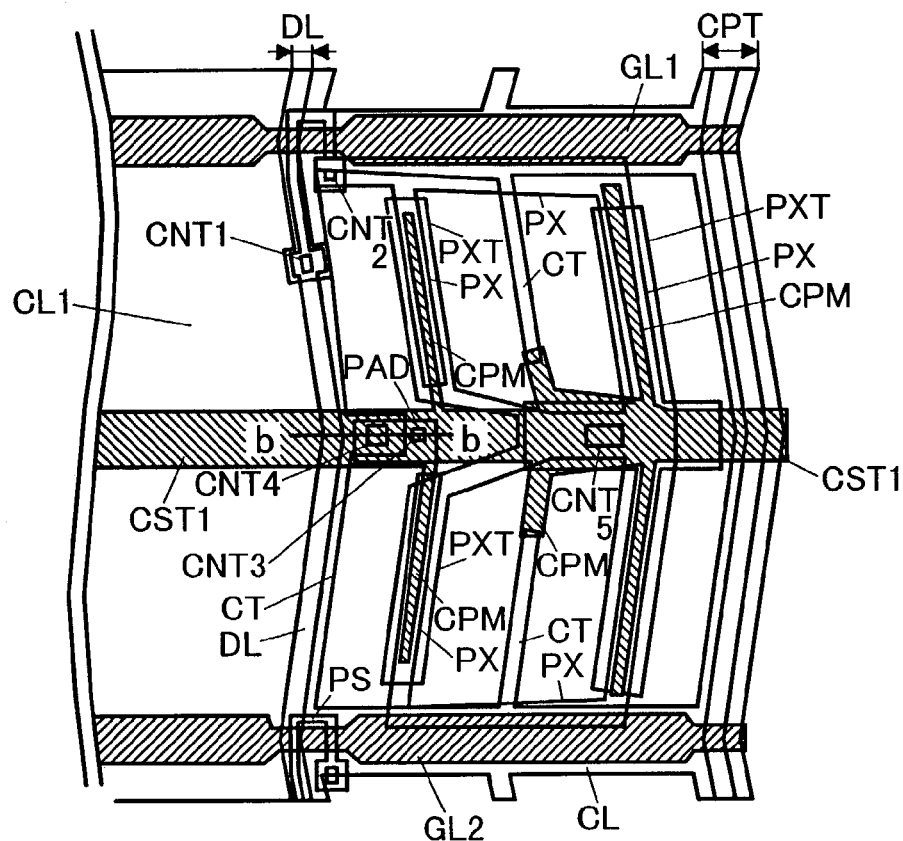
FIG. 30A is a view showing the construction of Embodiment 7 of the liquid crystal display device according to of the invention and FIG. 30B is a sectional view of FIG. 30A taken along line b—b.
Figure 30B:
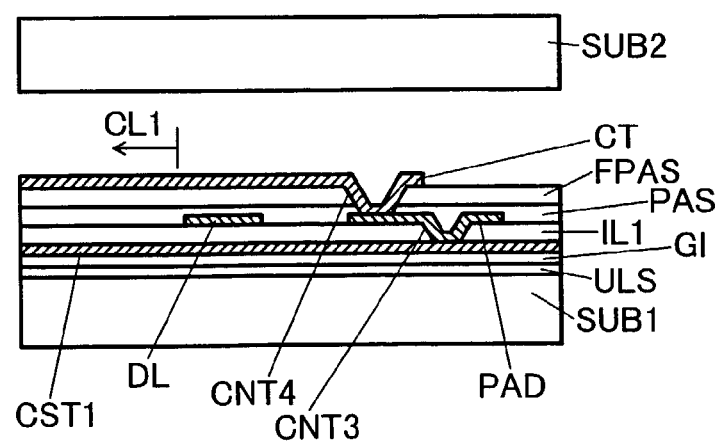

FIG. 30A is a plan view showing a pixel of the liquid crystal display device according to Embodiment 7 of the invention, and is a view corresponding to FIG. 4A. FIG. 30B is a cross-sectional view taken along line b—b of FIG. 30A.

As compared with Embodiment 1 shown in FIG. 4A, Embodiment 7 has a different construction in that the lead line CL1 of the counter voltage signal line CL is formed in the entire area between the liquid crystal display part AR and the scanning signal driver circuit GSCL. In other words, the lead line CL1 is formed in not a linear pattern but a plane pattern.

As described above, the counter electrode CT of each of the pixel areas is formed to cover the drain signal line DL and the gate signal line GL, and an extended portion of the counter electrode CT forms the counter voltage signal line CL.

In this formation, the lead line CL1 can be formed to extend and cover the entire area of the scanning signal driver circuit GSCL.

EMBODIMENT 8

Figure 31A:
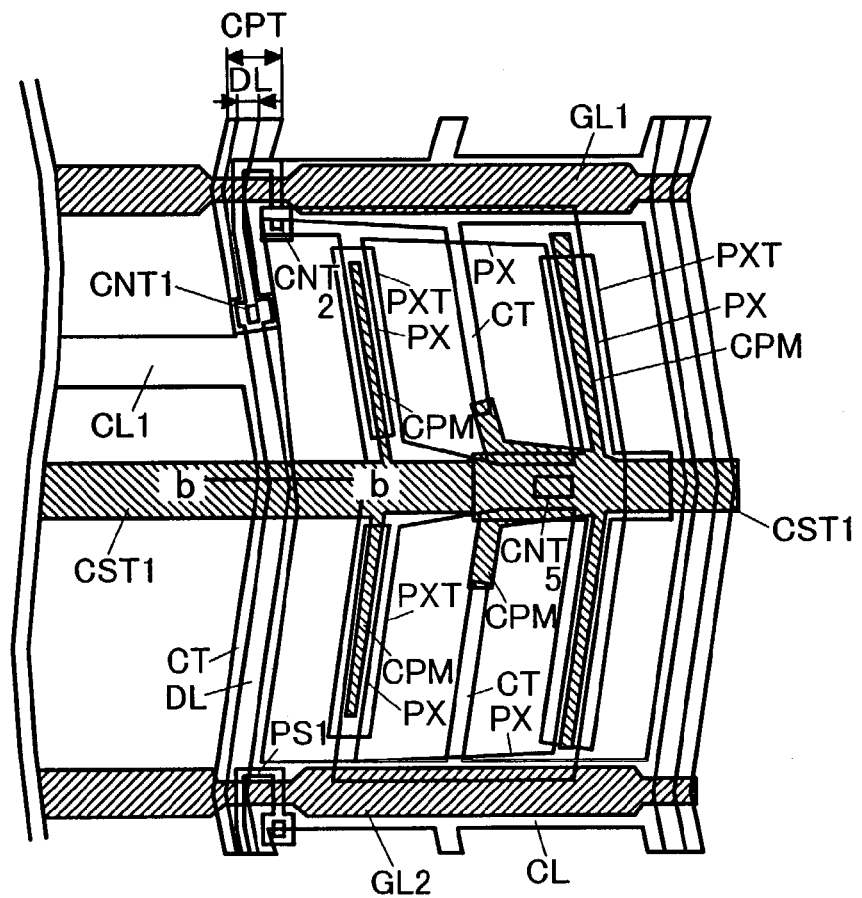
FIG. 31A is a view showing the construction of Embodiment 8 of the liquid crystal display device according to of the invention and FIG. 31B is a sectional view of FIG. 31A taken along line b—b.
Figure 31B:
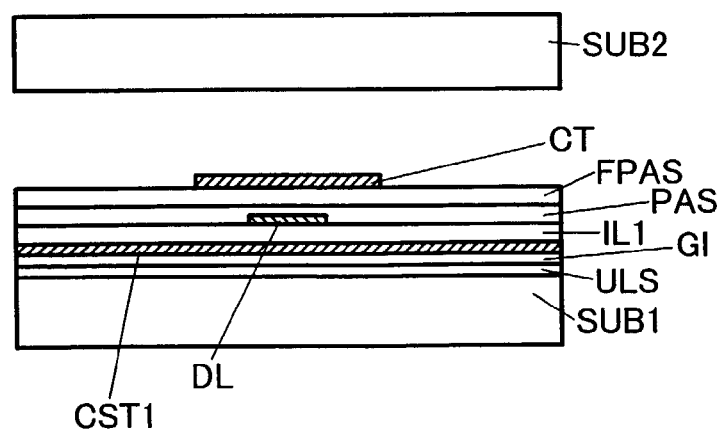

FIG. 31A is a plan view showing a pixel of the liquid crystal display device according to Embodiment 8 of the invention, and is a view corresponding to FIG. 4A. FIG. 31B is a cross-sectional view taken along line b—b of FIG. 31A.

As compared with Embodiment 1 shown in FIG. 4A, Embodiment 8 has a different construction in that no through-holes (CNT3 and CNT4) for providing electrical connection between the capacitance signal line CST1 and the counter electrode CT (the counter voltage signal line CL) are provided in any of the pixel areas. This is because since the capacitance signal line CST1 and the counter electrode CT (the counter voltage signal line CL) are connected to the interconnection layer COM, such through-holes (CNT3 and CNT4) are not needed.

This construction can improve the aperture ratio of each pixel.

EMBODIMENT 9

Figure 32A:
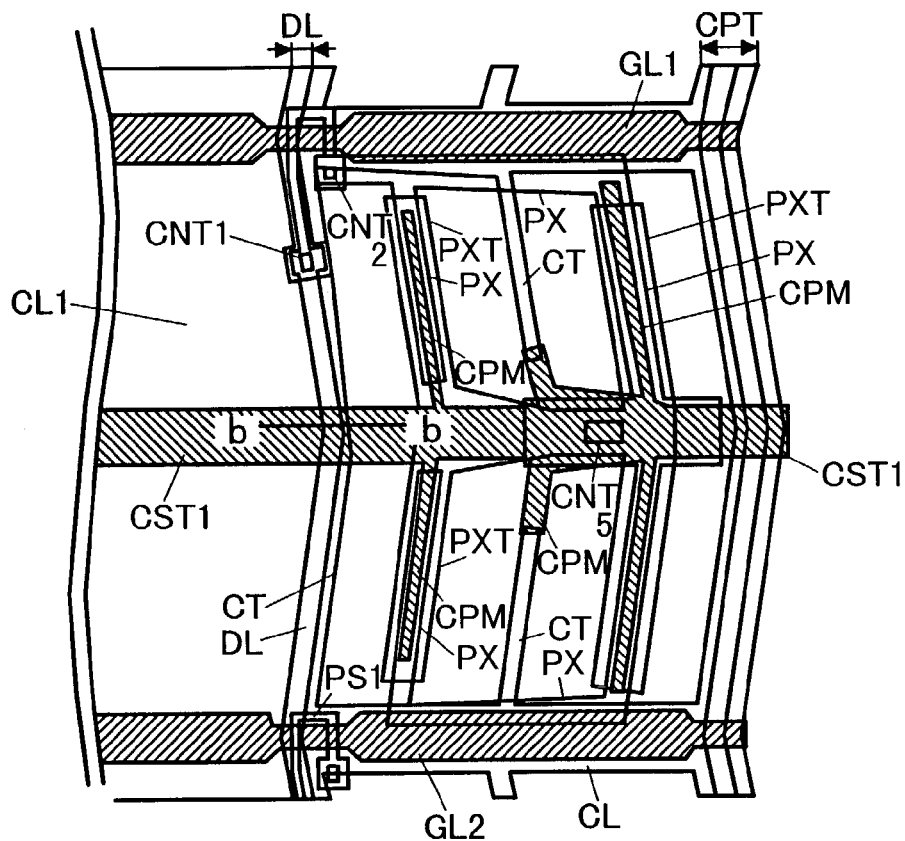
FIG. 32A is a view showing the construction of Embodiment 9 of the liquid crystal display device according to of the invention and FIG. 32B is a sectional view of FIG. 32A taken along line b—b.
Figure 32B:
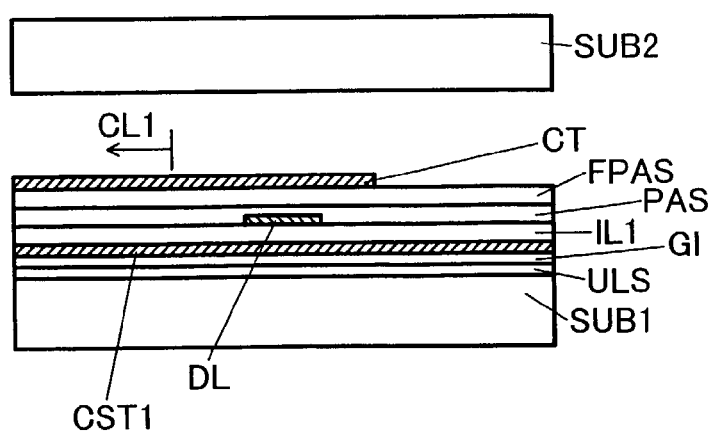

FIG. 32A is a plan view showing a pixel of the liquid crystal display device according to Embodiment 9 of the invention, and is a view corresponding to FIG. 31A. FIG. 32B is a cross-sectional view taken along line b—b of FIG. 32A.

As compared with Embodiment 8 shown in FIG. 31A, Embodiment 9 has a different construction in that the lead line CL1 of the counter voltage signal line CL is formed in the entire area between the liquid crystal display part AR and the scanning signal driver circuit GSCL. In other words, the lead line CL1 is formed in not a linear pattern but a plane pattern.

EMBODIMENT 10

Figure 33A:
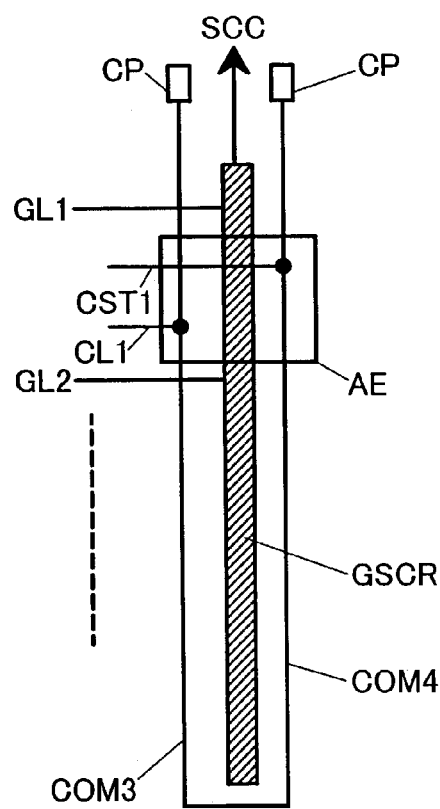
FIGS. 33A and 33B are views showing the construction of Embodiment 10 of the liquid crystal display device according to of the invention.
Figure 33B:
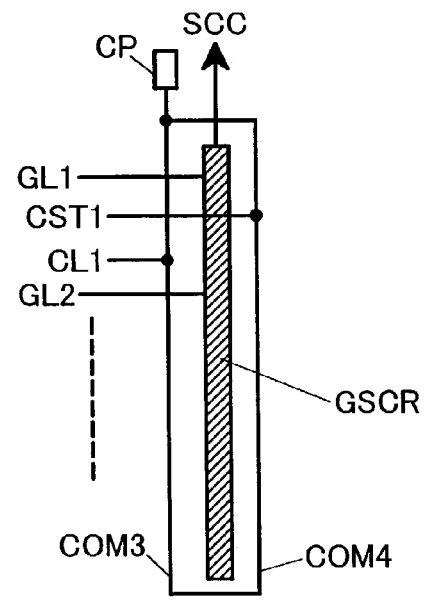

FIG. 33A is a plan view showing Embodiment 10 of the liquid crystal display device according to the invention, and is a view corresponding to FIG. 1A. FIG. 33B is a cross-sectional view taken along line b—b of FIG. 33A.

As shown in FIG. 33A, the scanning signal driver circuit GSCR provided on the side of the other end of the liquid crystal display part AR is also given a function similar to that of the scanning signal driver circuit GSCL shown in FIG. 1.

Accordingly, a construction similar to that shown in FIG. 1 is obtained by reversing the construction of FIG. 1 between the right side and left side about the y axis that passes through the center of the scanning signal driver circuit GSCR as viewed in FIG. 1.

It goes without saying that the construction of any of the above-described embodiments may be adopted as a modification of the peripheral construction of the scanning signal driver circuit GSCR provided on the side of the other end of the gate signal lines GL.

Figure 34:
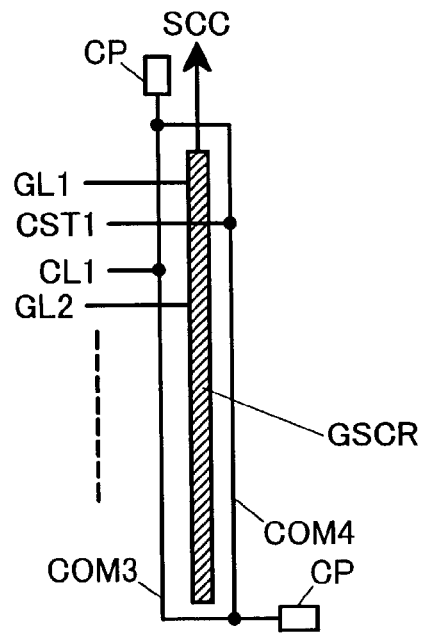
FIG. 34 is a view of the construction of a modification of Embodiment 10 of the liquid crystal display device according to the invention.
Figure 35:
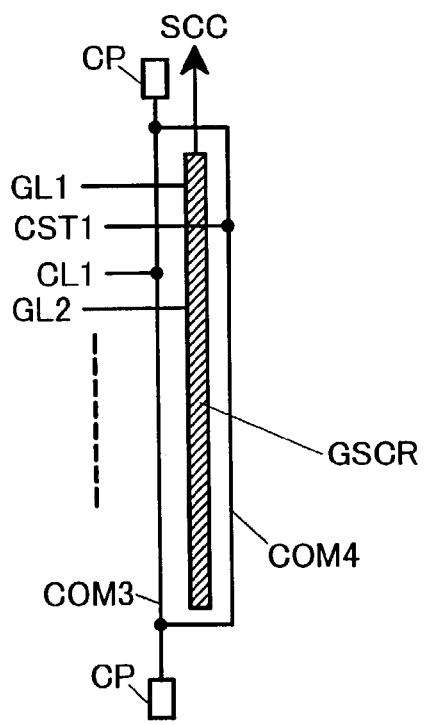
FIG. 35 is a view of the construction of another modification of Embodiment 10 of the liquid crystal display device according to the invention.

Incidentally, in this case as well, as shown in FIG. 33B by way of example, the interconnection layer COM may also be formed to surround completely the scanning signal driver circuit GSCL and to be supplied with a reference signal from one terminal CP. Furthermore, it goes without saying that, as shown in FIGS. 34 and 35, the interconnection layer COM may be formed in such a manner that two terminals CP are respectively provided at the mutually most distant locations and a reference signal is supplied to each of the terminals CP.

Figure 36A:
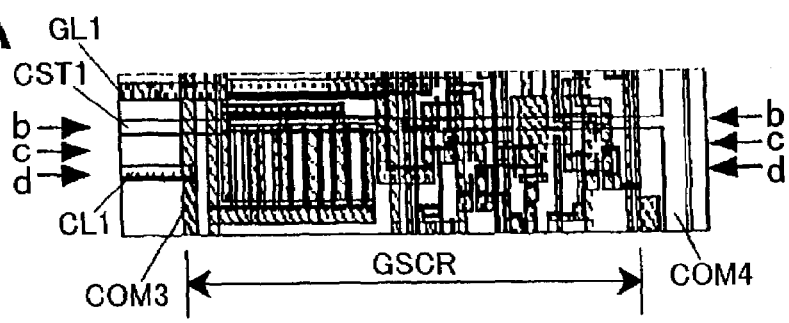
FIG. 36A is a diagrammatic view showing the scanning signal driver circuit and the peripheral portion thereof in Embodiment 10 of the liquid crystal display device according to the invention and FIGS. 36B, 36C and 36D are sectional views of FIG. 36A taken along lines b—b, c—c and d—d respectively.
Figure 36B:
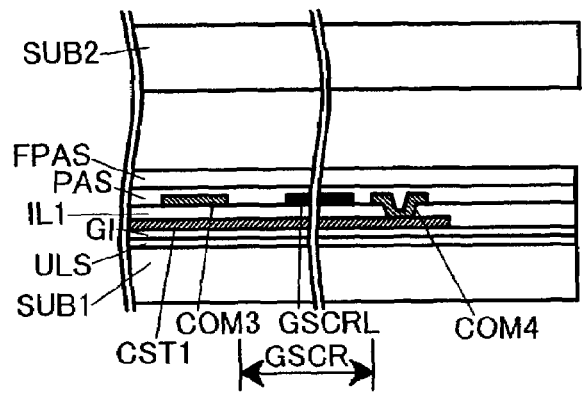
Figure 36C:
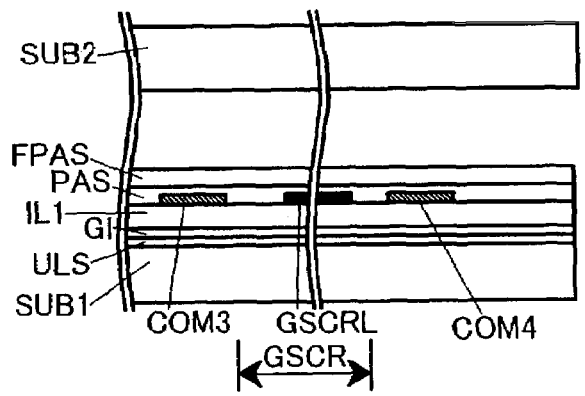
Figure 36D:
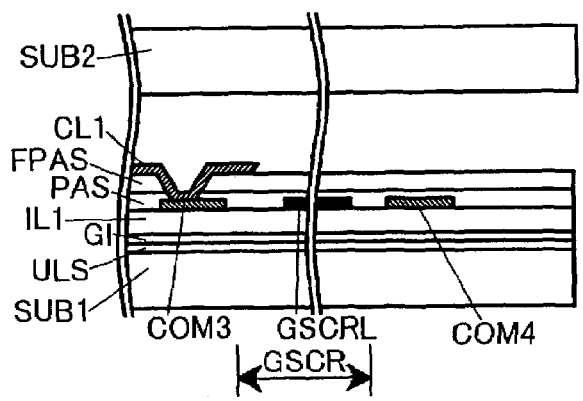

FIG. 36A is a plan view showing a part of the scanning signal driver circuit GSCL, and FIGS. 36B, 36C and 36D are cross-sectional views taken along lines b—b, c—c and d—d of FIG. 36A, respectively.

EMBODIMENT 11

Figure 37:
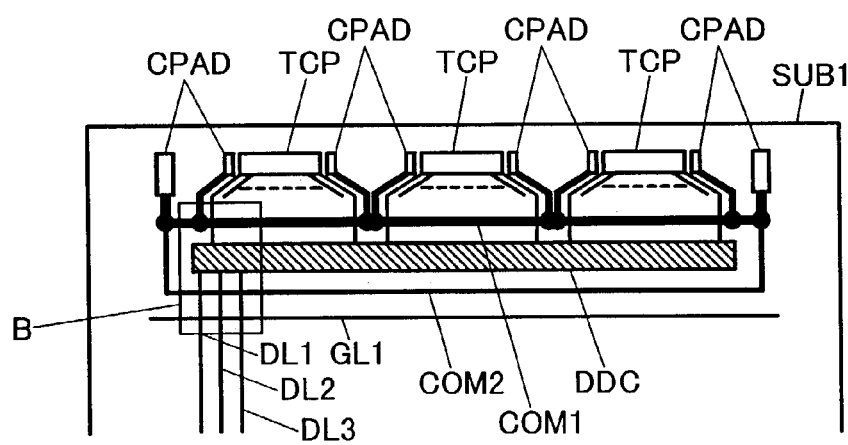
FIG. 37 is an explanatory view of the essential portions of Embodiment 11 of the liquid crystal display device according to the invention.

FIG. 37 is a plan view showing Embodiment 11 of the liquid crystal display device according to the invention, and shows the constructions of the video signal driver circuit and the periphery thereof.

This video signal driver circuit is provided with the drain distribution circuit DDC on the same side as the liquid crystal display part AR. The drain distribution circuit DDC has semiconductor devices made of polysilicon and interconnection layers for interconnecting the semiconductor devices, on a surface of the transparent substrate SUB1.

In addition, in the video signal driver circuit, the circuits except the drain distribution circuit DDC are made of a plurality of semiconductor chips TCP mounted on, for example, the transparent substrate SUB1.

A series of video signals, for example, three video signals, are inputted from one of the terminals of each of the semiconductor chips TCP to the drain distribution circuit DDC via one interconnection layer, and are respectively outputted in parallel to the respective drain signal lines DL, such as drain signal lines DL1, DL2, DL3, . . . by the drain distribution circuit DDC.

According to this construction, it is possible to reduce the number of the semiconductor chips TCP with respect to the number of the drain signal lines DL.

The interconnection layer COM is formed to surround the drain distribution circuit DDC, and is connected to the lead line CL1 of the counter voltage signal line CL in the liquid crystal display part AR.

In this case, the line width of the interconnection layer COM2 disposed along the drain distribution circuit DDC on the opposite side to the liquid crystal display part AR is formed to be thinner than the line width of the interconnection layer COM1 disposed along the drain distribution circuit DDC on the opposite side to the liquid crystal display part AR.

A multiplicity of drain signal lines DL run from the drain distribution circuit DDC in the liquid crystal display part AR, and the interconnection layer COM2 which needs to be formed to intersect the drain signal lines DL is thinned in line width so that it is possible to greatly decrease parasitic capacitance which occurs between the drain signal lines DL and the interconnection layer COM2, thereby decreasing the delay of scanning signals on the drain signal lines DL.

Figure 38A:
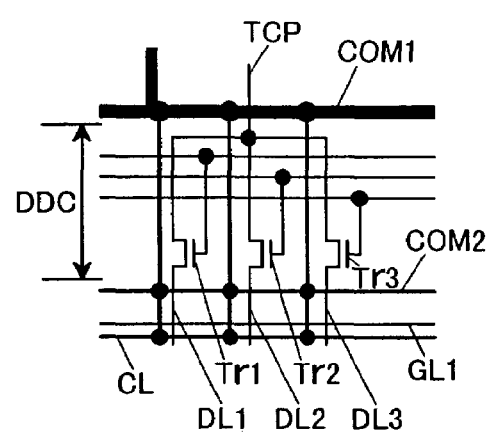
FIG. 38A is a circuit diagram of a video signal driver circuit and a peripheral portion of Embodiment 11 of the liquid crystal display device according to the invention and FIG. 38B is a diagrammatic view of the video signal driver circuit and the peripheral portion of Embodiment 11 of the liquid crystal display device according to the invention and FIG. 38C is a sectional view of FIG. 38B taken along line c—c.

FIG. 38A is a circuit diagram showing one embodiment of the drain distribution circuit DDC, and corresponds to the portion of the area B shown in FIG. 37.

Three video signals which are continuously outputted from one of the semiconductor chip TCP are respectively outputted in parallel to the corresponding drain signal lines DL1, DL2 and DL3 via three switching elements Tr1, Tr2 and Tr3 each of which is to be turned on in synchronism with the timing of outputting of a respective one of the three video signals.

Figure 38B:
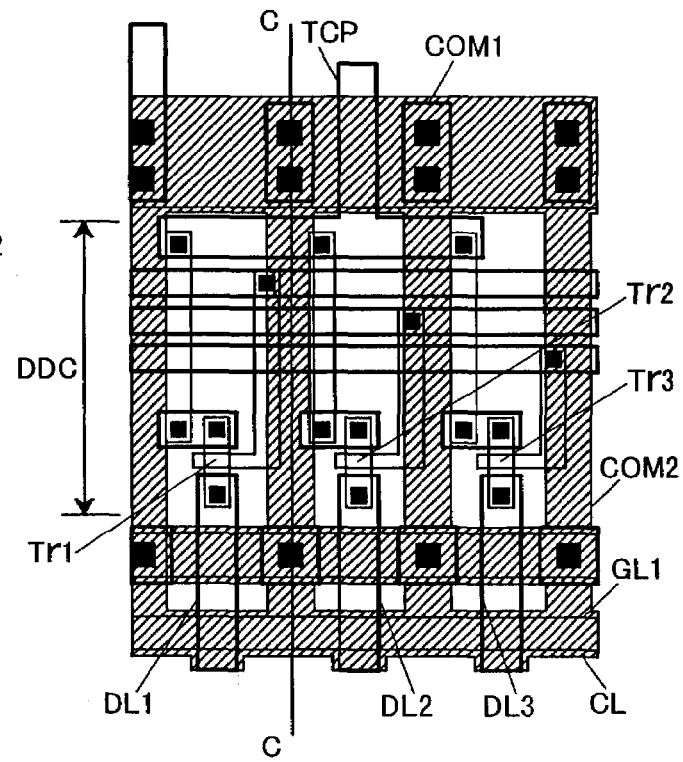

FIG. 38B is a plan view showing one embodiment of an interconnection pattern of the drain distribution circuit DDC formed on the surface of the transparent substrate SUB1, and shows a design geometrically corresponding to the circuit diagram shown in FIG. 38A.

Figure 38C:
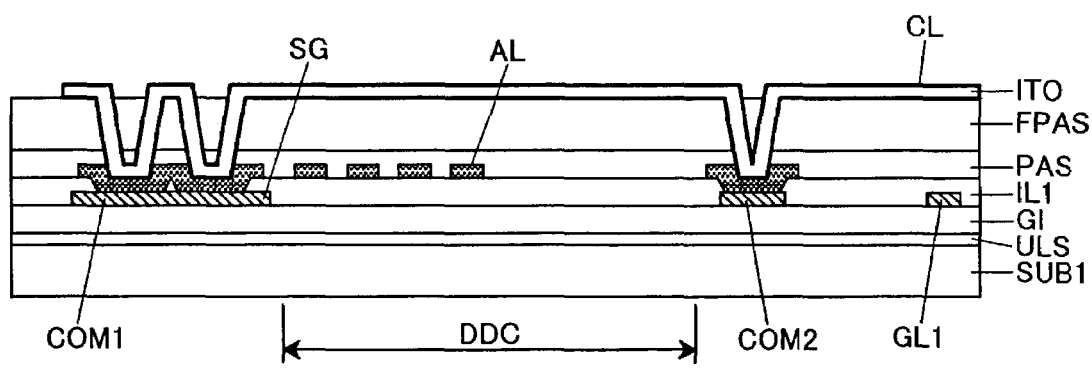

FIG. 38C is a cross-sectional view taken along line c—c of FIG. 38B. The lead line CL1 of the counter voltage signal line CL formed in each of the pixel areas of the liquid crystal display part AR is formed to extend onto an area in which the drain distribution circuit DDC is formed, and is electrically connected to the interconnection layer COM2 disposed along the drain distribution circuit DDC on the same side as the liquid crystal display part AR and to the interconnection layer COM1 disposed along the drain distribution circuit DDC on the opposite side to the liquid crystal display part AR.

The interconnection layer COM is formed in the same layer as the gate signal line GL, and the upper surfaces of the interconnection layer COM and the gate signal line GL are covered with the interlayer insulating film IL1, the protective film PAS and the protective film FPAS in named order. The lead line CL1 of the counter voltage signal line CL is formed on the upper surface of the protective film FPAS, and the electrical connection between the lead line CL1 and the interconnection layer COM is provided through throughholes formed to extend through the protective film FPAS, the protective film PAS and the interlayer insulating film IL1. Such electrical connection is provided via intermediate layers which are formed between the lead line CL1 of the counter voltage signal line CL and the interconnection layer COM at the same time as the formation of the drain signal lines DL. The intermediate layers are intended to decrease contact resistance.

Figure 39:
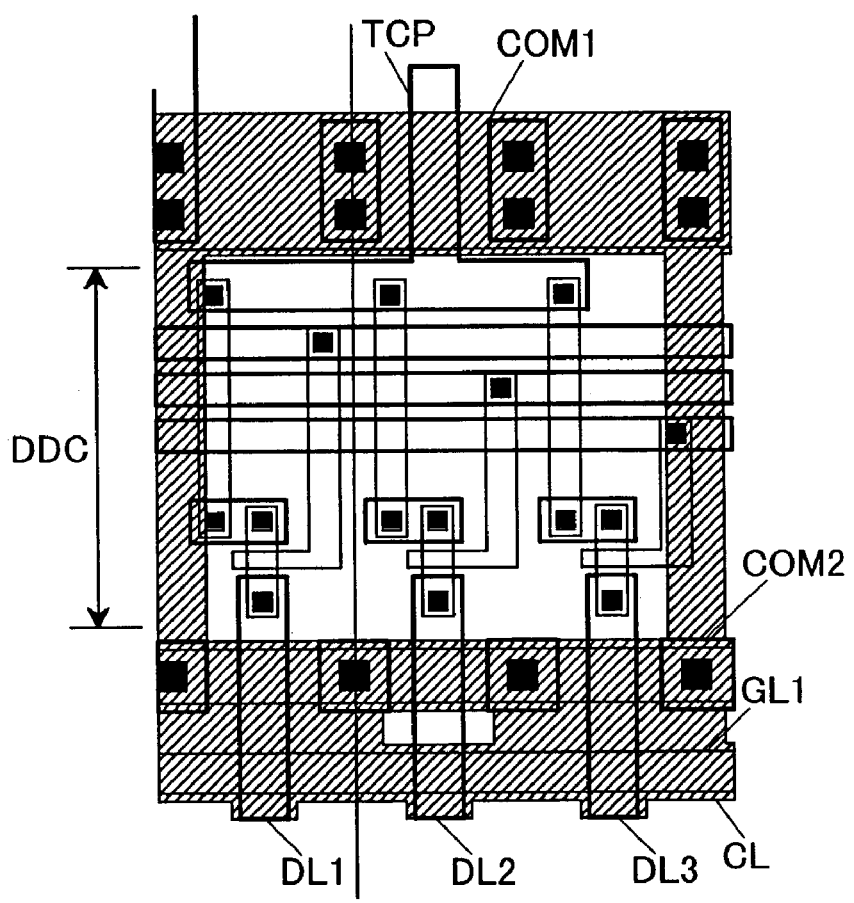
FIG. 39 is a diagrammatic view showing other examples of the video signal driver circuit and the peripheral portion thereof in Embodiment 11 of the liquid crystal display device according to the invention.
Figure 40:
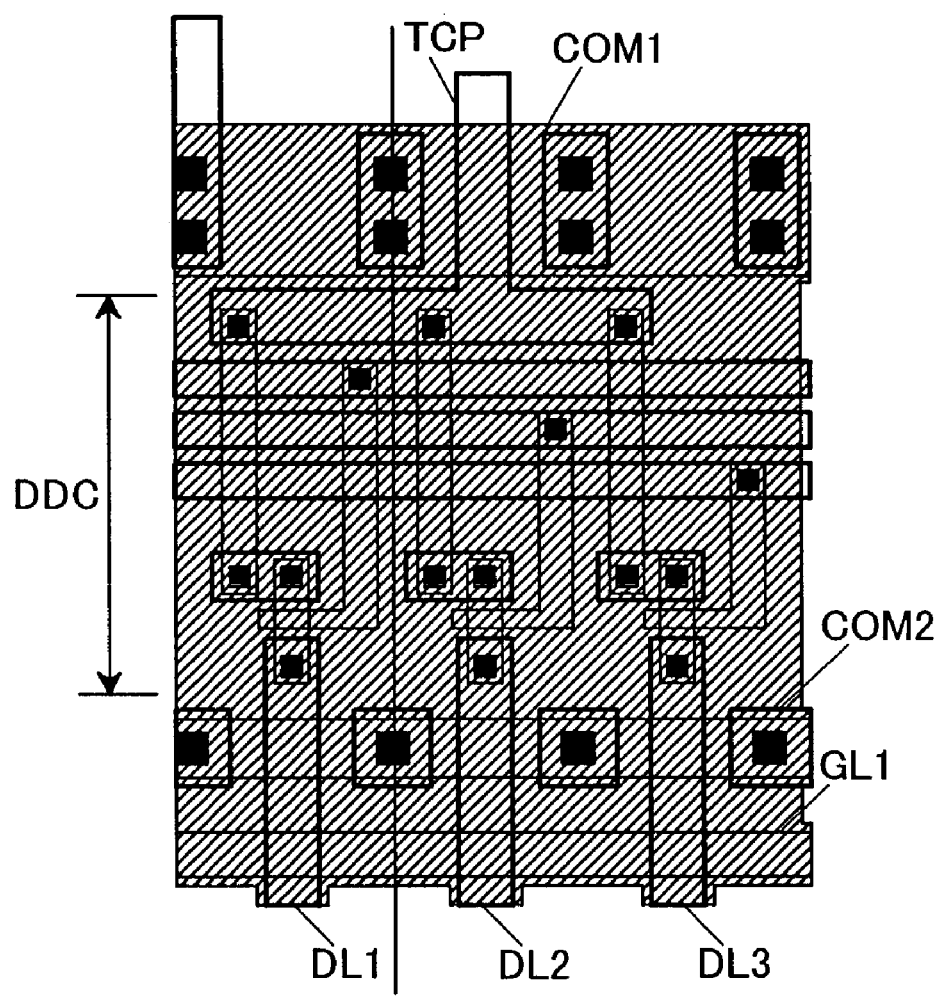
FIG. 40 is a diagrammatic view showing other examples of the video signal driver circuit and the peripheral portion thereof in Embodiment 11 of the liquid crystal display device according to the invention.

FIGS. 39 and 40 are plan views showing another embodiment of the liquid crystal display device according to the invention, and are views each corresponding to FIG. 38B.

The number of counter voltage signal lines CL disposed to intersect the drain distribution circuit DDC is four for each predetermined length thereof, for example, in the case of the construction shown in FIG. 38B and two, for example, in the case of the construction shown in FIG. 39. In the case of the construction shown in FIG. 40, the counter voltage signal lines CL disposed to intersect the drain distribution circuit DDC are formed to cover the whole of the area in which the drain distribution circuit DDC is formed. In the case of the construction shown in FIG. 40, there is an advantage which decreases the electrical resistances of the counter voltage signal lines CL and the interconnection layer COM itself.

EMBODIMENT 12

FIGS. 41A, 41B and 41C are views showing the construction of another embodiment of the liquid crystal display device according to the invention, and are views corresponding to FIGS. 38A, 38B and 38C, respectively.

As compared with Embodiment 11 shown in FIGS. 38A, 38B and 38C, Embodiment 12 has a different construction in that the interconnection layer COM2 disposed along the drain distribution circuit DDC on the same side as the liquid crystal display part AR and the interconnection layer COM1 disposed along the drain distribution circuit DDC on the opposite side to the liquid crystal display part AR are formed in the same layer, and are integrally connected to each other by interconnection layers which traverse the drain distribution circuit DDC and which are formed in the same layer as and of the same material as the interconnection layers COM1 and COM2.

The lead line CL1 of the counter voltage signal line CL is electrically connected to the interconnection layer COM2 on the same side as the liquid crystal display part AR through a through-hole formed to extend through the protective film FPAS, the protective film PAS and the interlayer insulating film IL1.

Figure 42:
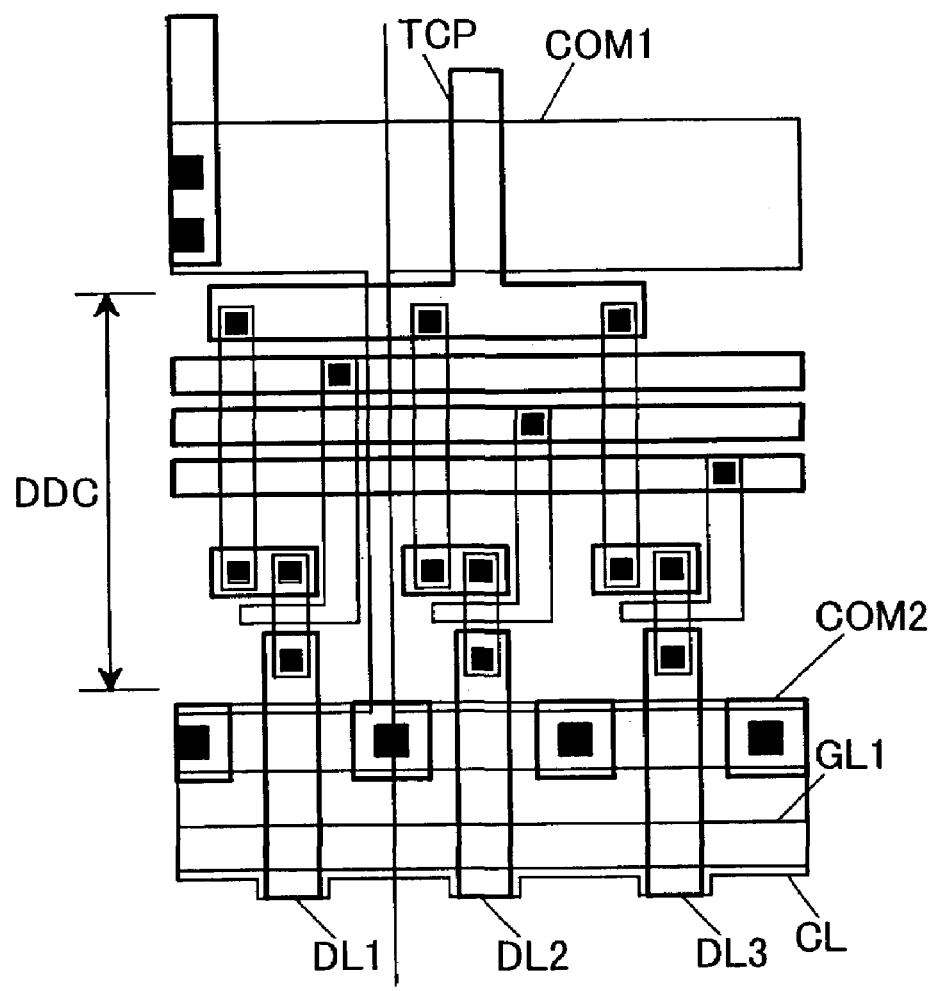
FIG. 42 is a diagrammatic view showing examples of the video signal driver circuit and the peripheral portion thereof in Embodiment 12 of the liquid crystal display device according to the invention.

FIG. 42 is a plan view showing another embodiment of the liquid crystal display device according to the invention, and is a view corresponding to FIG. 41B.

In the case of the construction shown in FIG. 41B, the number of the interconnection layers which provide the connection between the interconnection layer COM2 disposed along the drain distribution circuit DDC on the same side as the liquid crystal display part AR and the interconnection layer COM1 disposed along the drain distribution circuit DDC on the opposite side to the liquid crystal display part AR is three per predetermined length. As shown in FIG. 42, the number of such interconnection layers may be one per predetermined length.

In the case of this connection, it is possible to decrease the load capacitance of the drain distribution circuit DDC.

EMBODIMENT 13

Figure 43A:
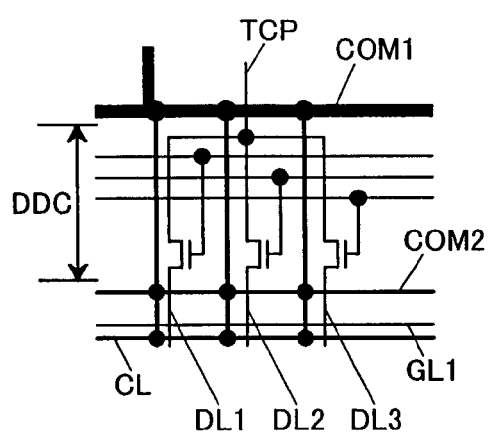
FIG. 43A is a circuit diagram showing a video signal driver circuit and a peripheral portion of Embodiment 13 of the liquid crystal display device according to the invention and FIG. 43B is a diagrammatic view of FIG. 43A.
Figure 43B:
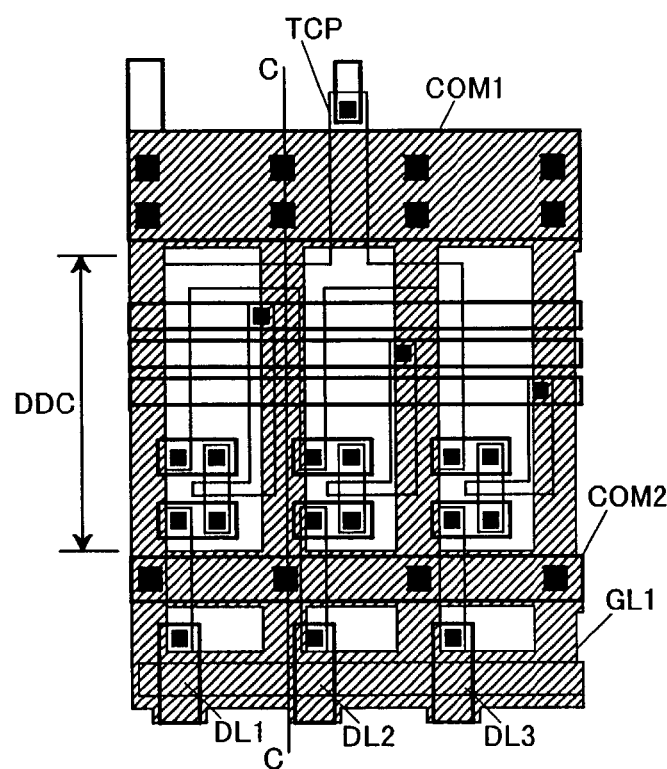
Figure 43C:
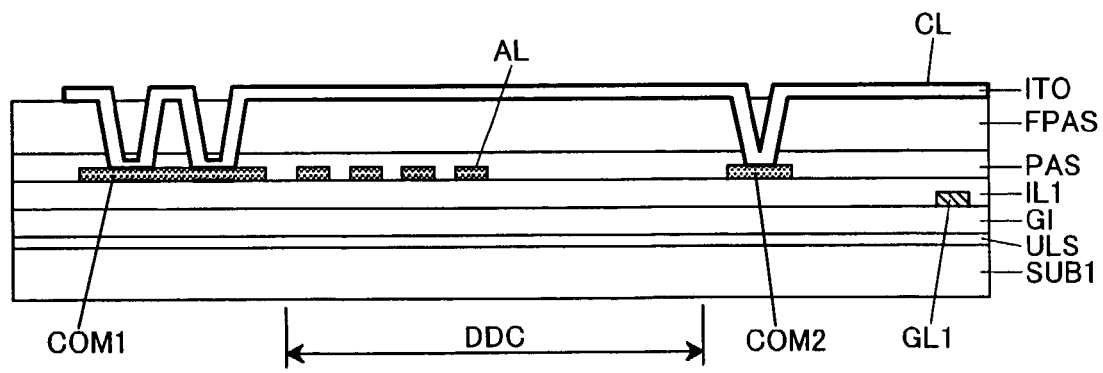

FIGS. 43A, 43B and 43C are views showing the construction of another embodiment of the liquid crystal display device according to the invention, and are views corresponding to FIGS. 41A, 41B and 41C, respectively.

As compared with Embodiment 11 shown in FIGS. 41A, 41B and 41C, Embodiment 13 has a different construction in that the interconnection layer COM disposed to surround the drain distribution circuit DDC is formed in the same layer as and of the same material as the drain signal lines DL.

Figure 44:
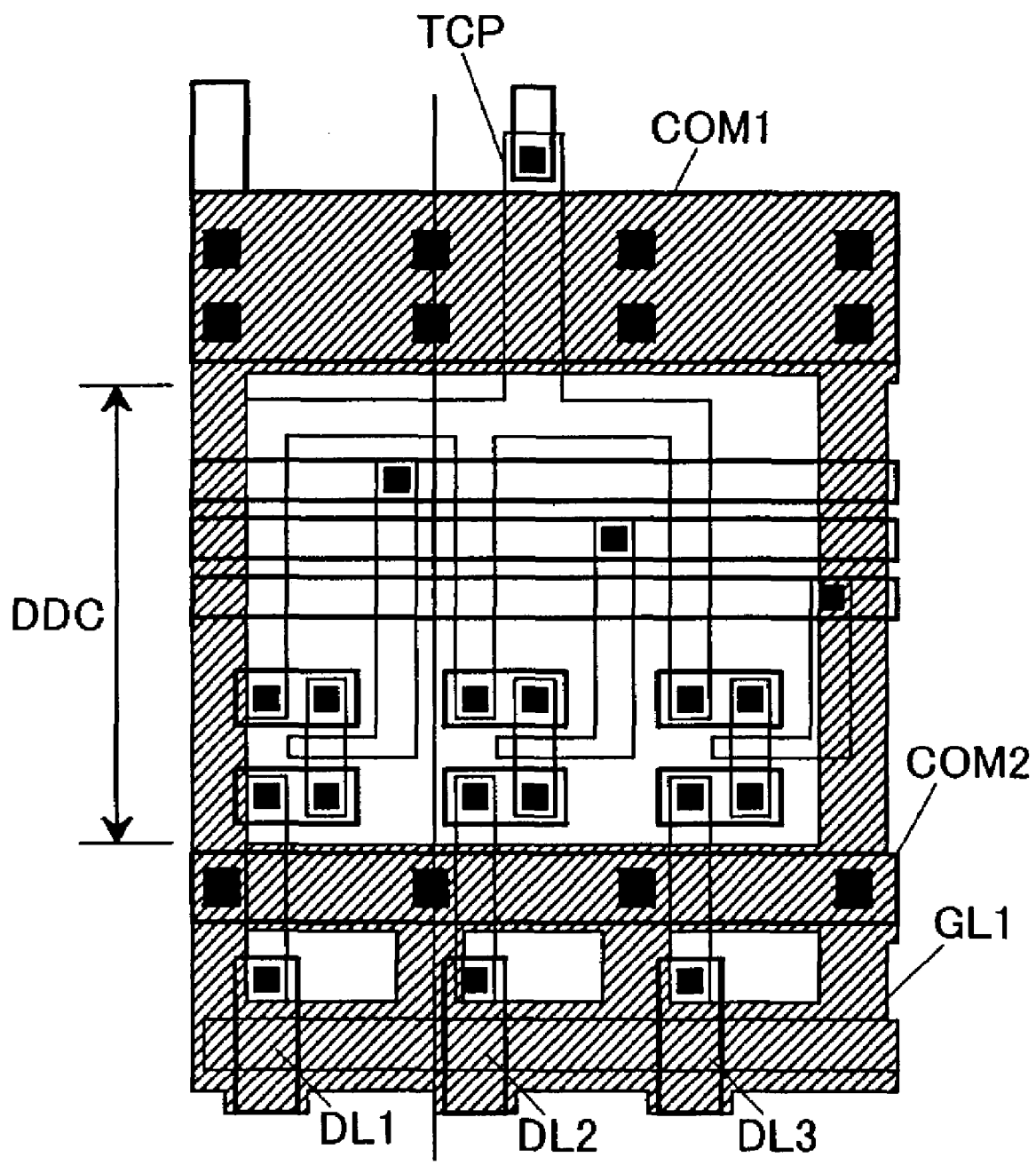
FIG. 44 is a view showing the constructions of other examples of the video signal driver circuit and the peripheral portion thereof in Embodiment 13 of the liquid crystal display device according to the invention.
Figure 45:
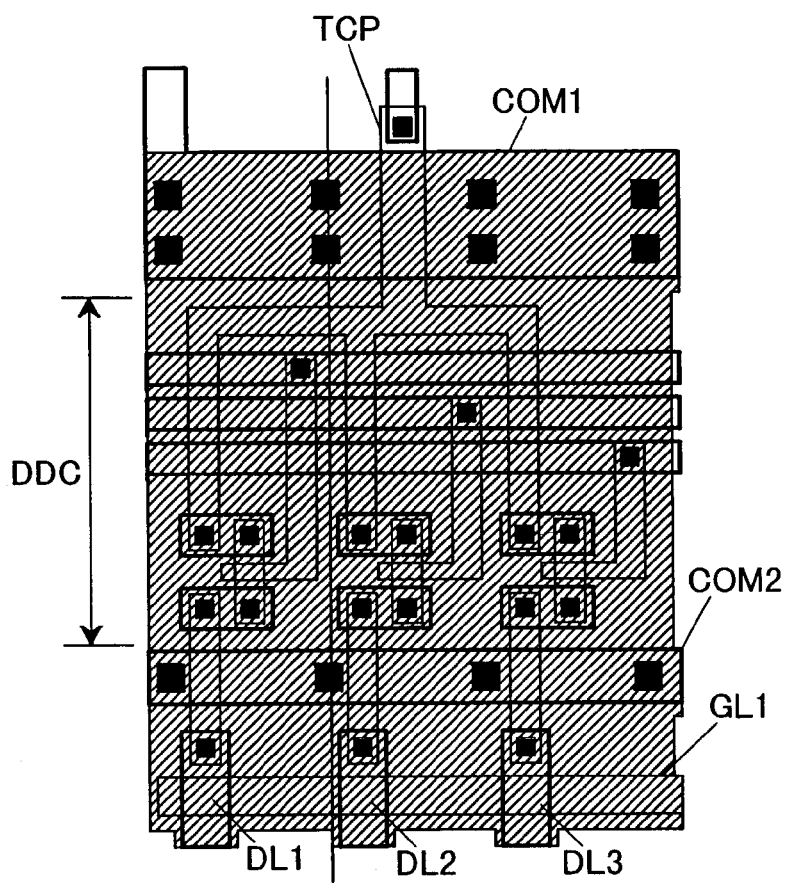
FIG. 45 is a view showing the constructions of other examples of the video signal driver circuit and the peripheral portion thereof in Embodiment 13 of the liquid crystal display device according to the invention.

FIGS. 44 and 45 are plan views showing other embodiments of the liquid crystal display device according to the invention, and are views corresponding to FIG. 43B.

In the case of the construction shown in FIG. 43B, the number of the lead lines CL1 of the counter voltage signal lines CL disposed to intersect the drain distribution circuit DDC is four for each predetermined length thereof, for example, in the case of the construction shown in FIG. 43B, but in the case of the construction shown in FIG. 44, the number of such lead lines CL1 is, for example, two. In the case of the construction shown in FIG. 45, the counter voltage signal lines CL disposed to intersect the drain distribution circuit DDC are formed to cover the whole of the area in which the drain distribution circuit DDC is formed. In the case of the construction shown in FIG. 45, there is an advantage which decreases the electrical resistances of the counter voltage signal lines CL and the interconnection layer COM itself.

EMBODIMENT 14

Figure 46:
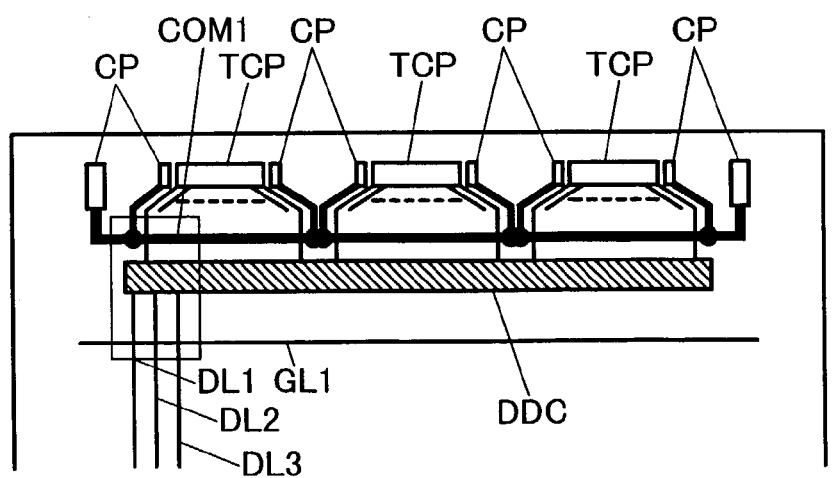
FIG. 46 is an explanatory view of the essential portions of Embodiment 14 of the liquid crystal display device according to the invention.

FIG. 46 is a view showing the construction of another embodiment of the liquid crystal display device according to the invention, and is a view corresponding to FIG. 37.

As compared with Embodiment 11 shown in FIG. 37, Embodiment 14 has a different construction in that the interconnection layer COM disposed close to the drain distribution circuit DDC is formed on only the opposite side to the liquid crystal display part AR, but not on the same side as the liquid crystal display part AR. In other words, the interconnection layer COM has a construction in which only the interconnection layer COM1 is formed.

Accordingly, the intersections of the drain signal lines DL with the other interconnection layer (the interconnection layer COM2) are omitted, thereby decreasing parasitic capacitance which occurs between the drain signal lines DL and the other interconnection layer.

The reason why the interconnection layer COM1 is provided between the drain distribution circuit DDC and the semiconductor chip TCP is as follows. The frequency of a signal to be outputted from each semiconductor chip TCP to the drain distribution circuit DDC becomes a higher frequency corresponding to the division number of the drain distribution circuit DDC.

In the case where such frequency is high, during signal generation in the semiconductor chip TCP, when generated signals rapidly switch over, so-called gridges occurs, and the gridges need to be decreased by the interconnection layer COM1. Accordingly, it is possible to avoid the problem that unnecessary high voltage or noise is applied to the thin film transistors TFT in the liquid crystal display part AR and the reliability of the thin film transistors TFT lowers.

Figure 47A:
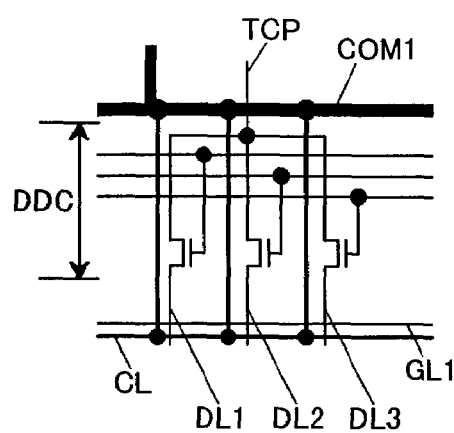
FIG. 47A is a circuit diagram showing a video signal driver circuit and a peripheral portion of Embodiment 14 of the liquid crystal display device according to the invention and FIG. 47B is a diagrammatic view of FIG. 47A.
Figure 47B:
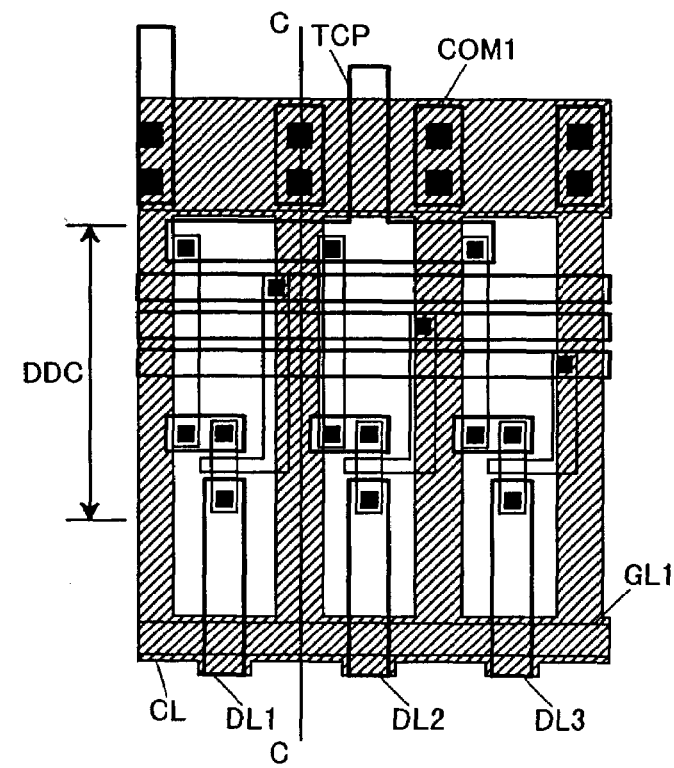

FIGS. 47A, 47B and 47B are views showing a further specific construction of the embodiment shown in FIG. 46, and is a view corresponding to FIG. 43.

The interconnection layer COM1 is formed on the upper surface of the insulating film GI, and the lead line CL1 of the counter voltage signal line CL is formed on the upper surface of the protective film FPAS. The lead line CL1 intersects the drain distribution circuit DDC, and is connected to the interconnection layer COM1 through through-holes formed to extend through the protective film FPAS, the protective film PAS and the interlayer insulating film IL1.

Figure 48:
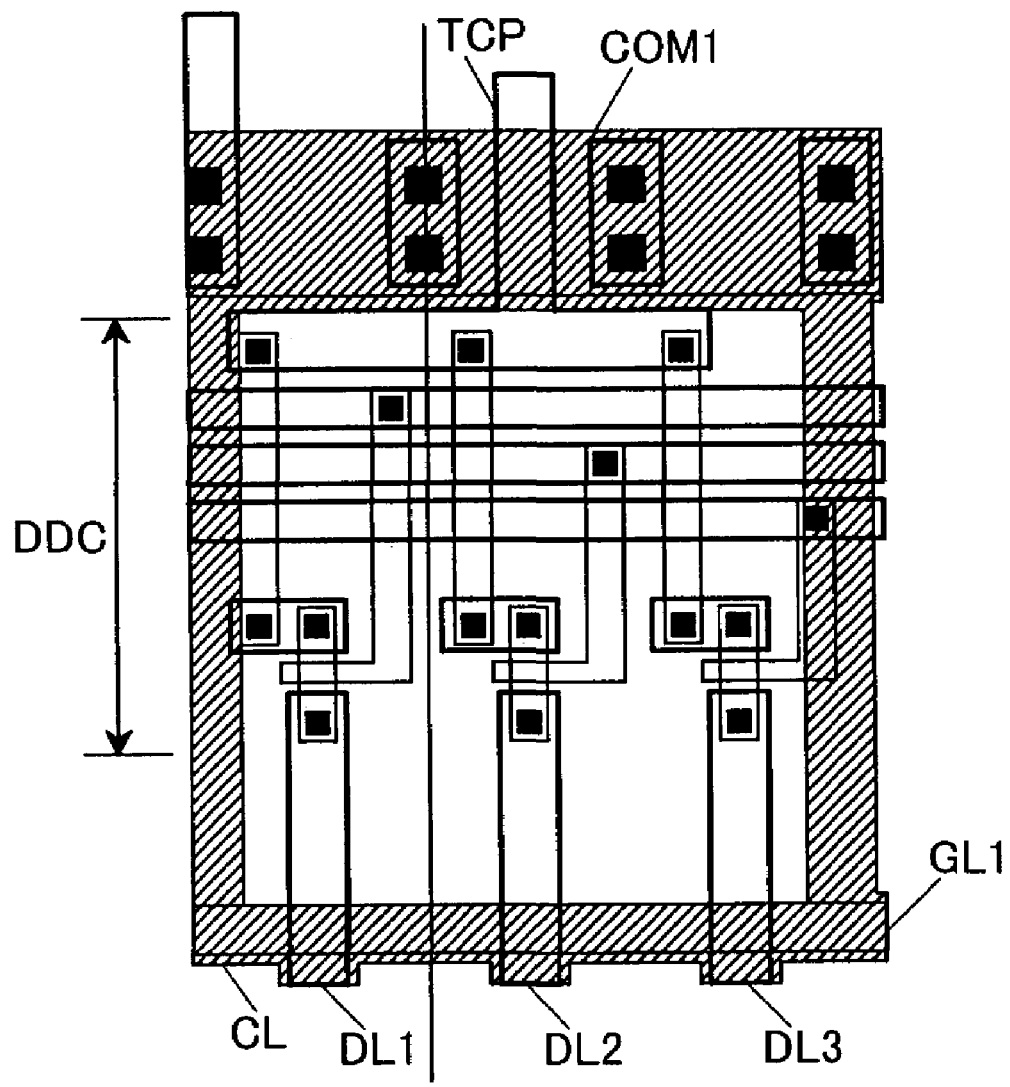
FIG. 48 is a view showing the constructions of other examples of the video signal driver circuit and the peripheral portion thereof in Embodiment 14 of the liquid crystal display device according to the invention.
Figure 49:
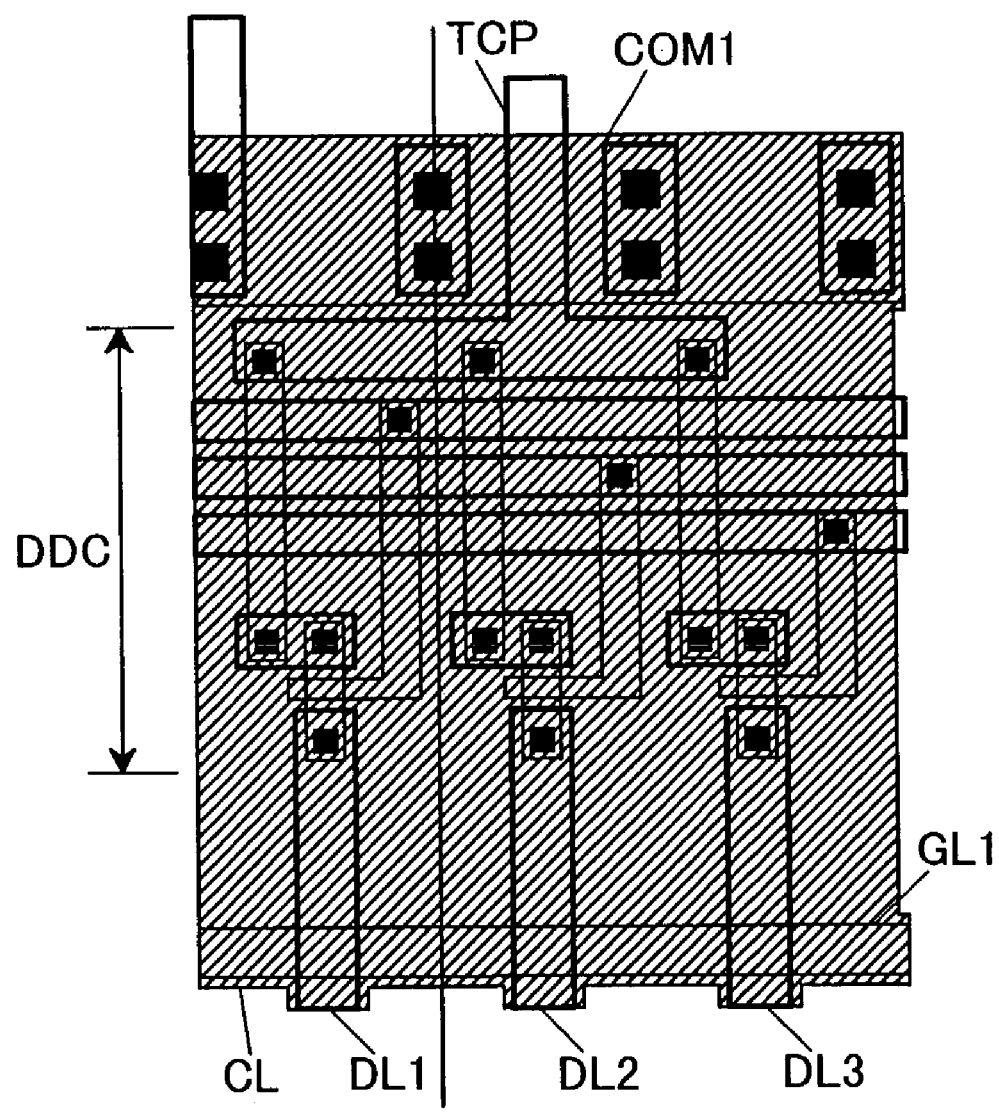
FIG. 49 is a view showing the constructions of other examples of the video signal driver circuit and the peripheral portion thereof in Embodiment 14 of the liquid crystal display device according to the invention.

FIGS. 48 and 49 are plan views showing other embodiments of the liquid crystal display device according to the invention, and are views each corresponding to FIG. 47B.

The number of counter voltage signal lines CL disposed to intersect the drain distribution circuit DDC is four for each predetermined length thereof, for example, in the case of the construction shown in FIG. 47B and two, for example, in the case of the construction shown in FIG. 48. In the case of the construction shown in FIG. 49, the counter voltage signal lines CL disposed to intersect the drain distribution circuit DDC are formed to cover the whole of the area in which the drain distribution circuit DDC is formed. In the case of the construction shown in FIG. 49, there is an advantage which decreases the electrical resistances of the counter voltage signal lines CL and the interconnection layer COM itself.

In Embodiment 14, the interconnection layer COM1 is provided between the drain distribution circuit DDC and the semiconductor chip TCP, and an interconnection layer corresponding to the interconnection layer COM2 is not provided. Accordingly, unnecessary high voltage is prevented from being applied to the drain distribution circuit DDC, and further, waveform rounding is prevented from occurring in a signal applied to the thin film transistors TFT in the liquid crystal display part AR, thereby providing a construction which selectively satisfactorily achieves the advantage of an improvement in reliability.

EMBODIMENT 15

Figure 47C:
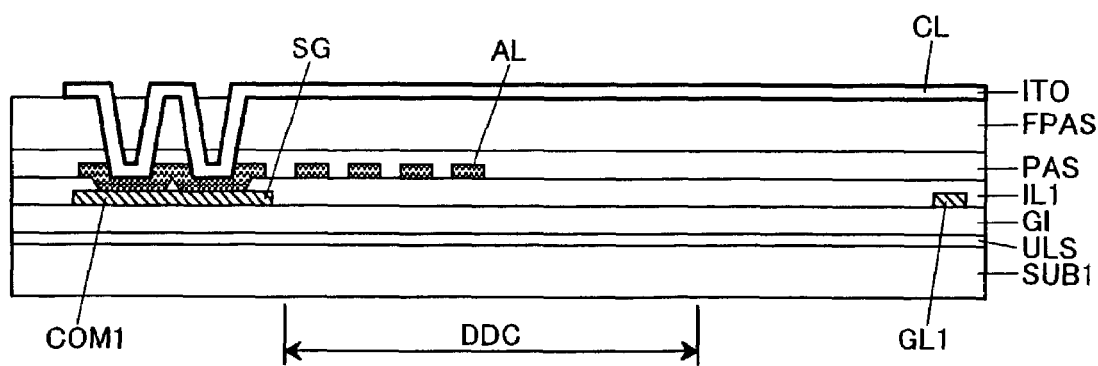
FIG. 47C is a sectional view taken along line c—c of FIG. 47B.
Figure 50A:
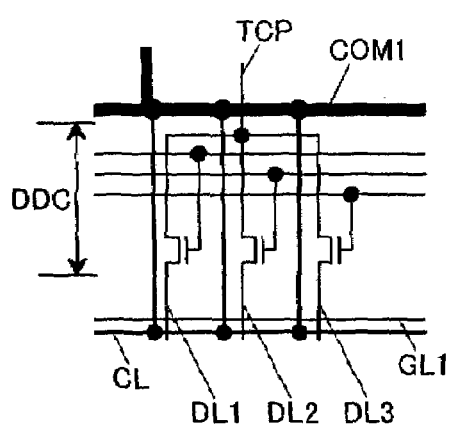
FIG. 50A is a circuit diagram showing a video signal driver circuit and a peripheral portion of Embodiment 15 of the liquid crystal display device according to the invention and FIG. 50B is a diagrammatic view of FIG. 50A.
Figure 50B:
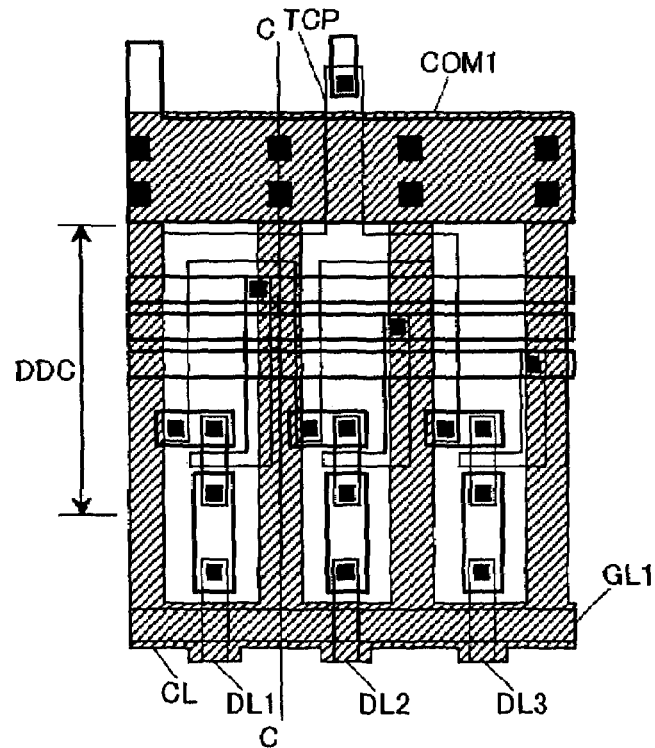
Figure 50C:
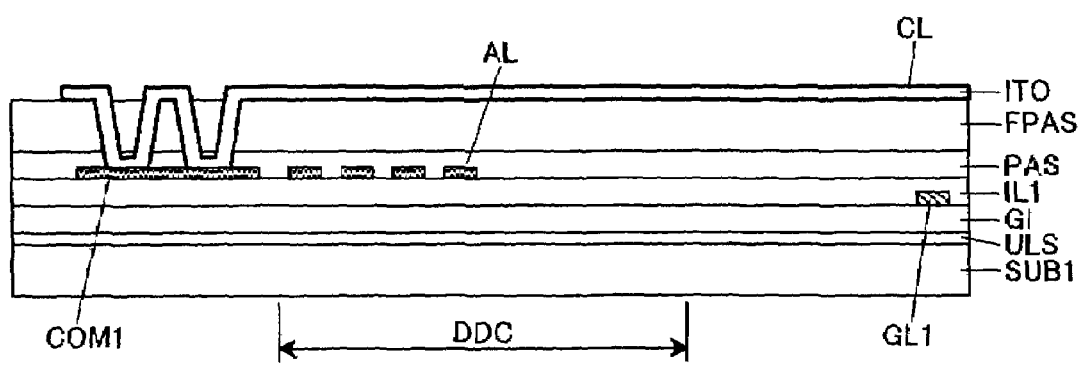
FIG. 50C is a sectional view taken along line c—c of FIG. 50B.

FIGS. 50A, 50B and 50C are views showing the construction of another embodiment of the liquid crystal display device according to the invention, and are views corresponding to FIGS. 47A, 47B and 47C, respectively.

As compared with Embodiment 15 shown in FIGS. 47A, 47B and 47C, Embodiment 15 has a different construction in that the interconnection layer COM1 is formed on the upper surface of the interlayer insulating film IL1 in the same layer as the drain signal lines DL, and is connected to the lead line CL1 of the counter voltage signal line CL formed on the upper surface of the protective film FPAS, through through-holes formed to extend through the protective film FPAS, the protective film PAS and the interlayer insulating film IL1.

Figure 51:
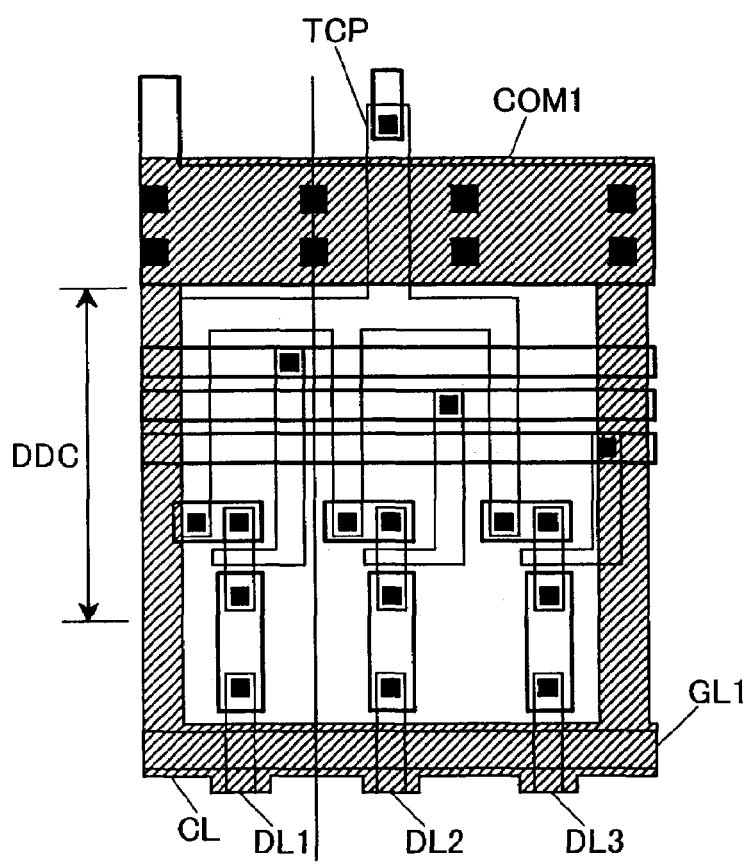
FIG. 51 is a view showing the constructions of other examples of the video signal driver circuit and the peripheral portion thereof in Embodiment 15 of the liquid crystal display device according to the invention.
Figure 52:
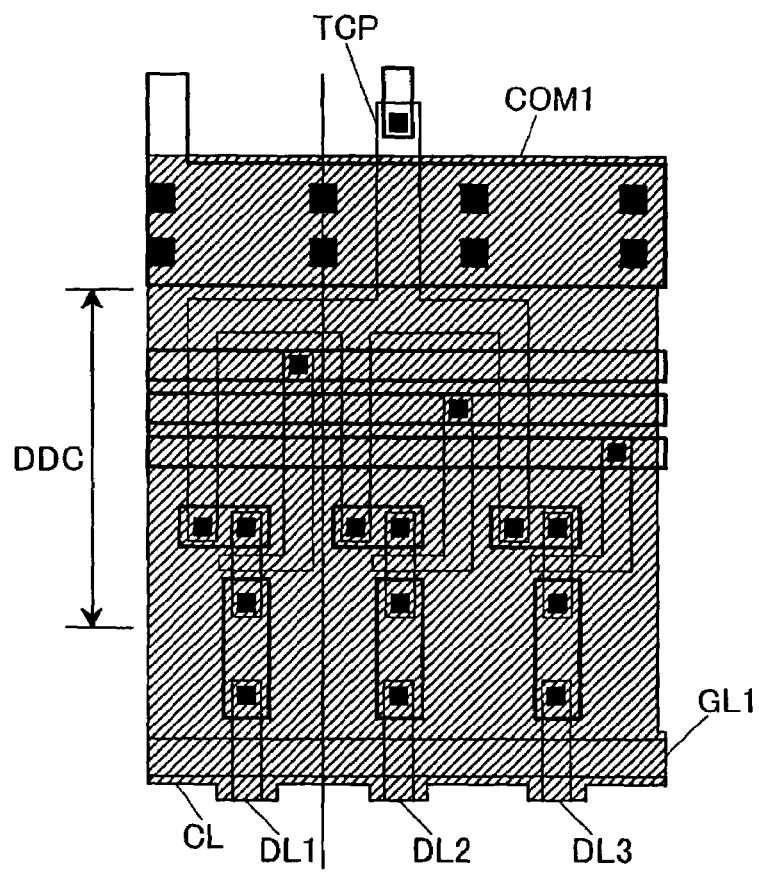
FIG. 52 is a view showing the constructions of other examples of the video signal driver circuit and the peripheral portion thereof in Embodiment 15 of the liquid crystal display device according to the invention.

FIGS. 51 and 52 are plan views showing other embodiments of the liquid crystal display device according to the invention, and are views each corresponding to FIG. 50B.

In the case of the construction shown in FIG. 50B, the number of counter voltage signal lines CL disposed to intersect the drain distribution circuit DDC is, for example, four for each predetermined length thereof in the case of the construction shown in FIG. 50B, but in the case of the construction shown in FIG. 51, the number of such counter voltage signal lines CL is, for example, two. In the case of the construction shown in FIG. 52, the counter voltage signal lines CL disposed to intersect the drain distribution circuit DDC are formed to cover the whole of the area in which the drain distribution circuit DDC is formed. In the case of the construction shown in FIG. 52, there is an advantage which decreases the electrical resistances of the counter voltage signal lines CL and the interconnection layer COM itself.

EMBODIMENT 16

Figure 53:
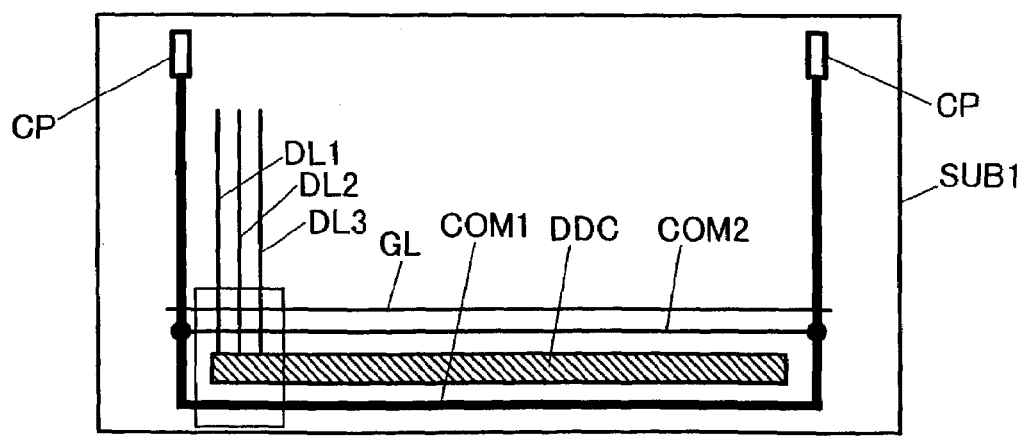
FIG. 53 is an explanatory view of the essential portions of Embodiment 16 of the liquid crystal display device according to the invention.

FIG. 53 is a view showing another embodiment of the liquid crystal display device according to the invention. Embodiment 16 shown in FIG. 53 is intended for a construction in which in addition to the video signal driver circuit provided on the side of one end of each drain signal line DL, another video signal driver circuit is provided on the side of the other end of each drain signal line DL.

The video signal driver circuit is made of, for example, a construction including the drain distribution circuit DDC connected to the drain signal lines DL. In FIG. 53, the illustration of the portions (semiconductor chips) of the video signal driver circuit other than the drain distribution circuit DDC is omitted.

The interconnection layer COM is formed to surround the drain distribution circuit DDC.

In this case as well, the line width of an interconnection layer disposed along the drain distribution circuit DDC on the same side as the liquid crystal display part AR is formed to be thinner than the line width of an interconnection layer disposed along the drain distribution circuit DDC on the opposite side to the liquid crystal display part AR.

Incidentally, in the case where the video signal driver circuits are provided on the opposite ends of each drain signal line DL, it is common practice to connect one of the video signal driver circuits to each even-numbered one of the drain signal lines DL and the other to each odd-numbered one of the drain signal lines DL.

EMBODIMENT 17

Figure 54:
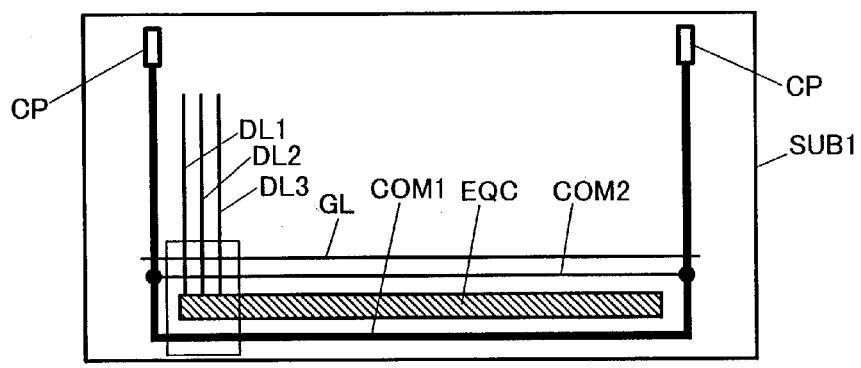
FIG. 54 is an explanatory view of the essential portions of Embodiment 17 of the liquid crystal display device according to the invention.

FIG. 54 is a view showing the construction of another embodiment of the liquid crystal display device according to the invention. Embodiment 17 shown in FIG. 54 has a construction in which an equalizing circuit EQC is formed at the other end of each drain signal line DL whose one end is connected to a video signal driver circuit, and the interconnection layer COM is formed to surround the equalizing circuit EQC.

This equalizing circuit EQC is constructed to become a counter voltage signal (COM) when a drain signal changes from high to low and when a drain signal changes from low to high, and becomes extremely effective in the case of so-called dot-inversion driving or line-inversion driving.

Figure 62A:
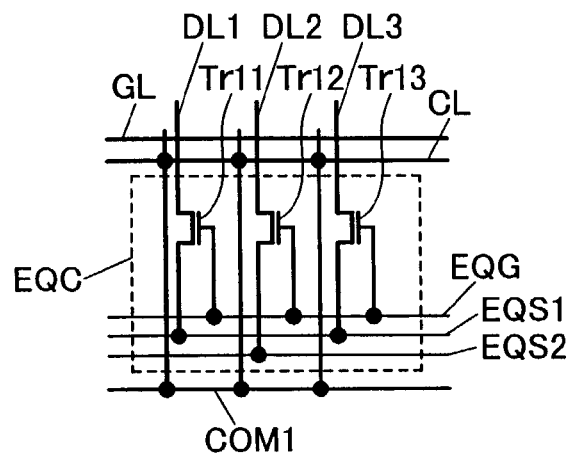
FIG. 62A is a circuit diagram of the equalizing circuit of Embodiment 18 of the liquid crystal display device according to the invention and FIGS. 62B and 62C are timing charts of the equalizing circuit of FIG. 62A.

FIG. 62A is a circuit diagram of one embodiment of the equalizing circuit EQC. Switching element Tr11, Tr12, Tr13, . . . are formed in the respective drain signal lines DL1, DL2, DL3, . . . , and the gates of the respective switching element Tr11, Tr12, Tr13, . . . are connected to a line EQG. A line EQS1 is connected to the drain signal line DL1 via the switching element Tr11, a line EQS2 is connected to the drain signal line DL2 via the switching element Tr12, and a line EQS3 is connected to the drain signal line DL3 via the switching element Tr13.

In this case as well, the lead line CL1 of the counter voltage signal line CL disposed on the same side as the liquid crystal display part AR is extended to intersect the equalizing circuit EQC, and is connected to the interconnection layer COM1.

Figure 62B:
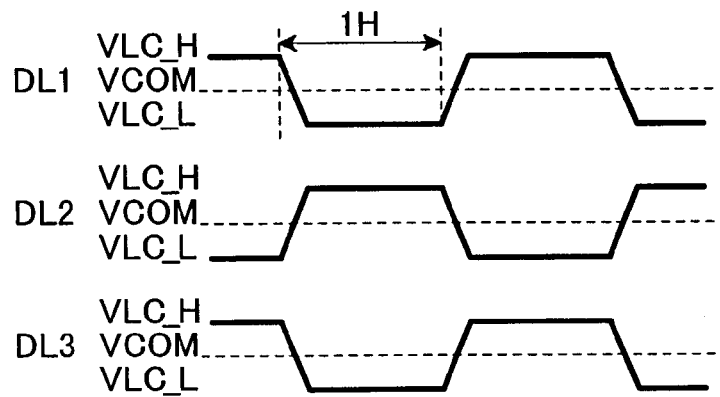
Figure 62C:
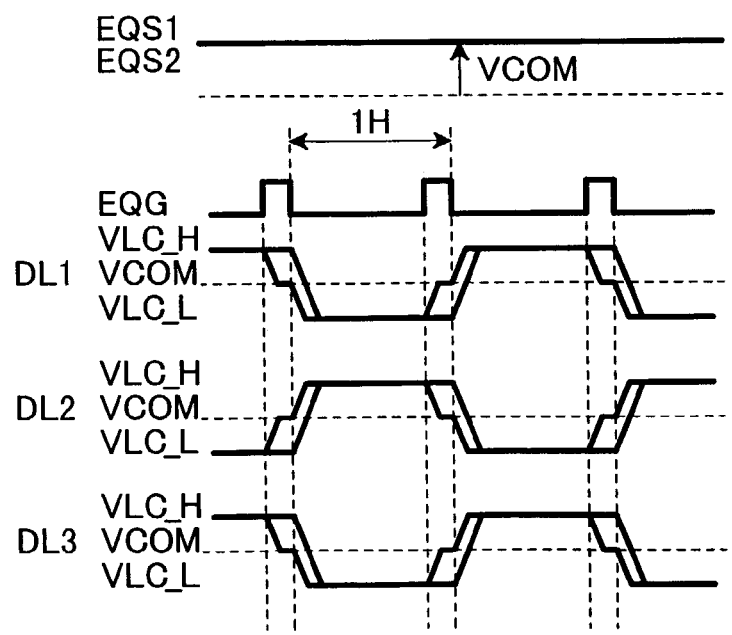

FIG. 62B is a timing chart of the drain signal lines DL during normal driving, and FIG. 62C is a timing chart of the drain signal lines DL during equalizer driving. During equalizer driving, in one horizontal scanning period (1H), after the gate of the thin film transistors TFT of the pixel areas have been turned off, the signal voltages of the drain signal lines DL are set to a common (reference) voltage (EQS1 or EQS2) via the respective switching element Tr11, Tr12, Tr13, . . . of the equalizing circuit EQC.

In the next horizontal scanning period (1H), voltages of opposite polarity are written to the respective drain signal lines DL1, DL2, DL3, . . . .

Accordingly, it is possible to improve the efficiency of voltage writing to the drain signal lines DL and reduce power consumption owing to a reduction in driver output load.

Figure 55A:
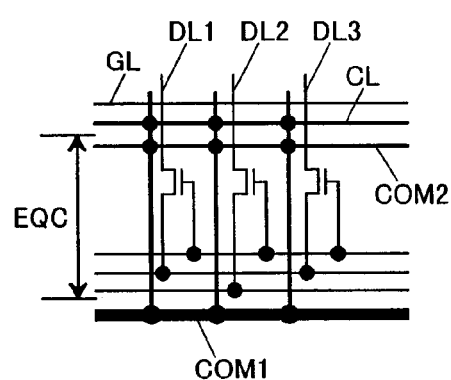
FIG. 55A is a circuit diagram showing a video signal driver circuit and a peripheral portion of Embodiment 17 of the liquid crystal display device according to the invention and FIG. 55B is a diagrammatic view of FIG. 55A.
Figure 55B:
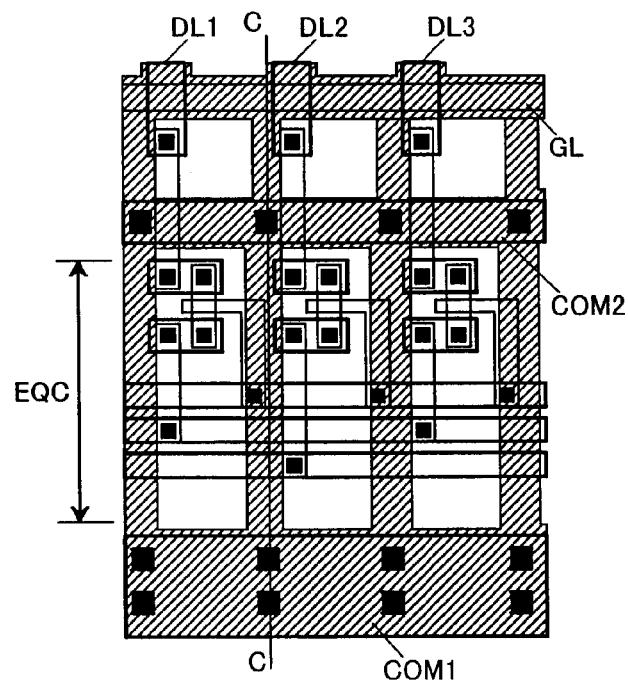
Figure 55C:
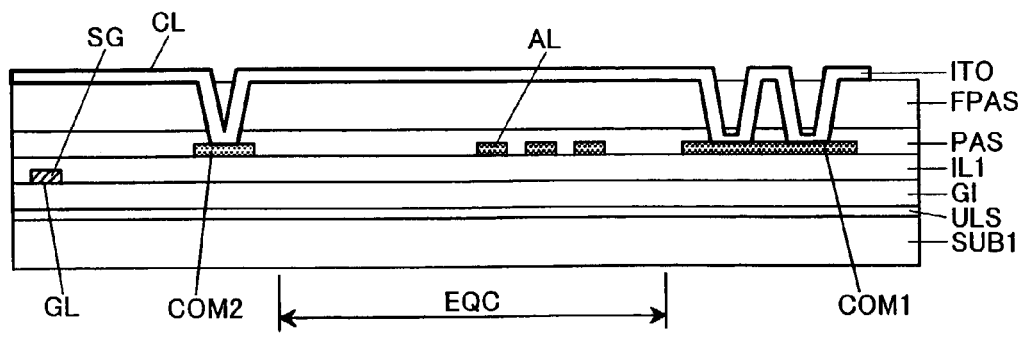
FIG. 55C is a sectional view taken along line c—c of FIG. 55B.

FIG. 55A is a circuit showing the equalizing circuit EQC, and FIG. 55B shows an interconnection pattern of the equalizing circuit EQC formed on the transparent substrate SUB1. FIG. 55B shows a pattern geometrically corresponding to the pattern in FIG. 55A. FIG. 55C is a cross-sectional view taken along line c—c of FIG. 55B.

The counter voltage signal line CL formed on the upper surface of the protective film FPAS is extended to intersect the equalizing circuit EQC, and is electrically connected to the interconnection layer COM1 formed along the equalizing circuit EQC on the opposite side to the liquid crystal display part AR.

Figure 56:
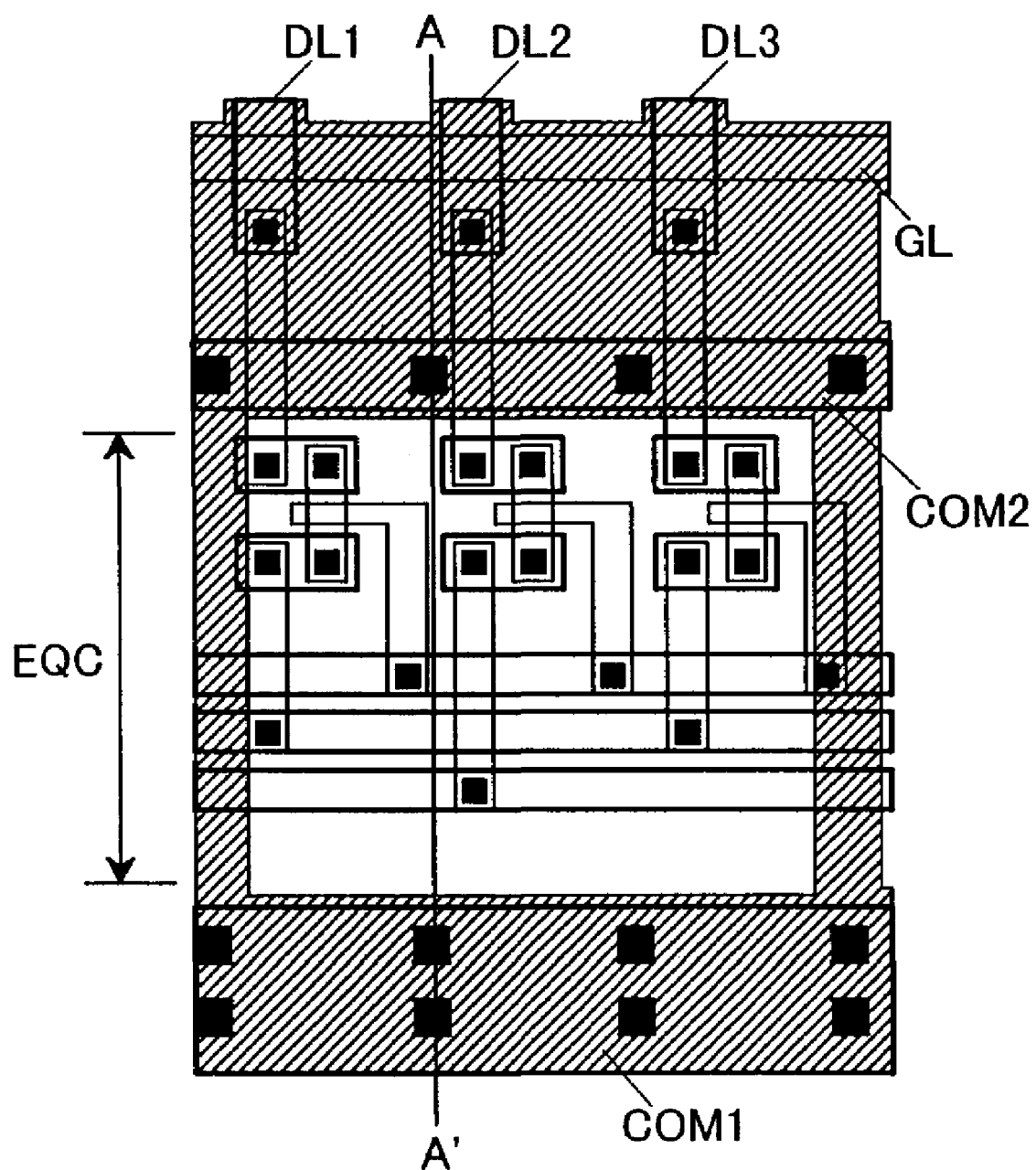
FIG. 56 is a view showing the constructions of other examples of the equalizing circuit and the peripheral portion thereof in Embodiment 17 of the liquid crystal display device according to the invention.
Figure 57:
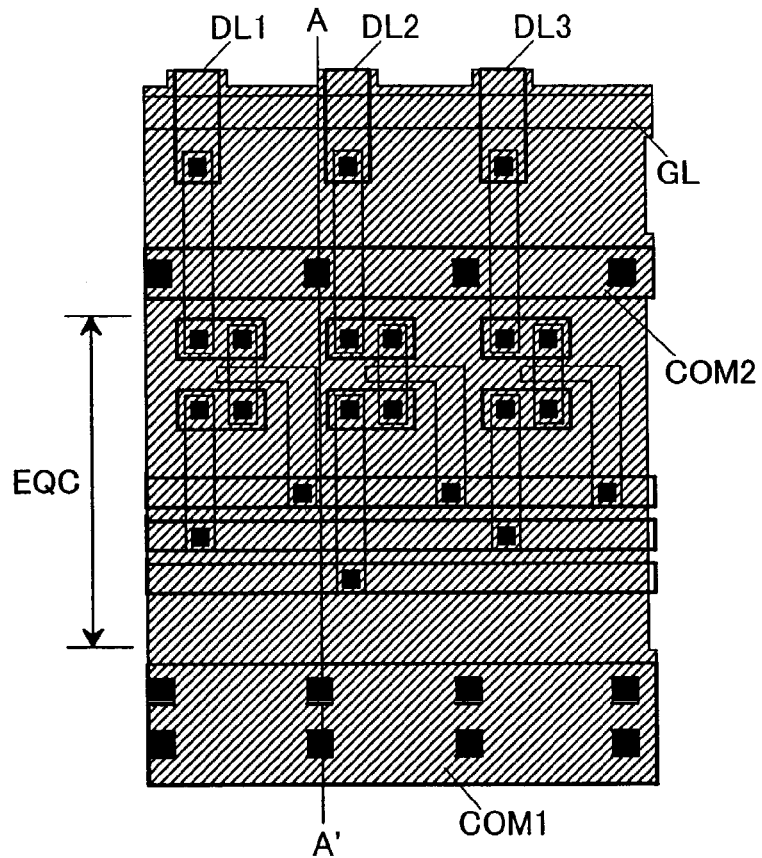
FIG. 57 is a view showing the constructions of other examples of the equalizing circuit and the peripheral portion thereof in Embodiment 17 of the liquid crystal display device according to the invention.

FIGS. 56 and 57 are plan views showing other embodiments of the liquid crystal display device according to the invention, and are views each corresponding to FIG. 55B.

The number of the lead lines CL1 of the counter voltage signal lines CL disposed to intersect the equalizing circuit EQC is four for each predetermined length thereof, for example, in the case of the construction shown in FIG. 55B, but in the case of the construction shown in FIG. 56, the number of such lead lines CL1 is, for example, two. In the case of the construction shown in FIG. 57, the counter voltage signal lines CL disposed to intersect the equalizing circuit EQC are formed to cover the whole of the area in which the equalizing circuit EQC is formed. In the case of the construction shown in FIG. 57, there is an advantage which decreases the electrical resistances of the counter voltage signal lines CL and the interconnection layer COM itself.

EMBODIMENT 18

Figure 58:
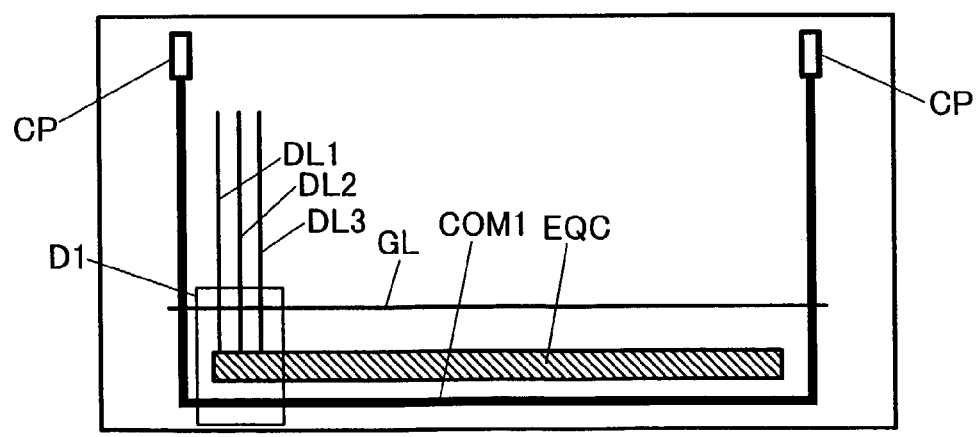
FIG. 58 is an explanatory view of the essential portions of Embodiment 18 of the liquid crystal display device according to the invention.

FIG. 58 is a view showing the construction of another embodiment of the liquid crystal display device according to the invention, and is a view corresponding to FIG. 54.

As compared with Embodiment 17 shown in FIG. 54, Embodiment 18 has a different construction in that the interconnection layer COM disposed close to the equalizing circuit EQC is formed on only the opposite side to the liquid crystal display part AR, but not on the same side as the liquid crystal display part AR.

Accordingly, the intersections of the drain signal lines DL with the other interconnection layer (the interconnection layer COM2) are omitted, thereby decreasing parasitic capacitance which occurs between the drain signal lines DL and the other interconnection layer.

Figure 59A:
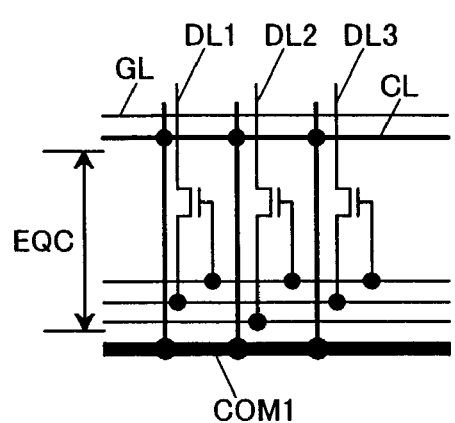
FIG. 59A is a circuit diagram showing a video signal driver circuit and a peripheral portion of Embodiment 18 of the liquid crystal display device according to the invention and FIG. 59B is a diagrammatic view of FIG. 59A.
Figure 59B:
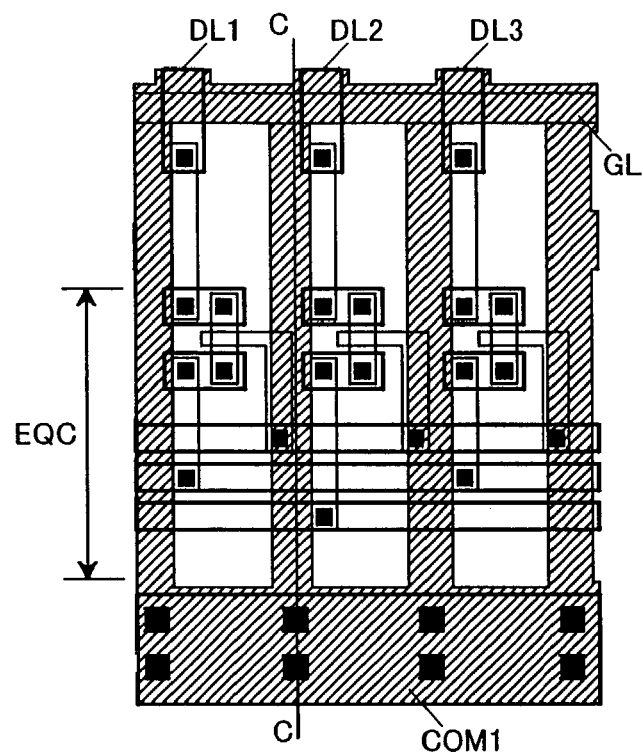
Figure 59C:
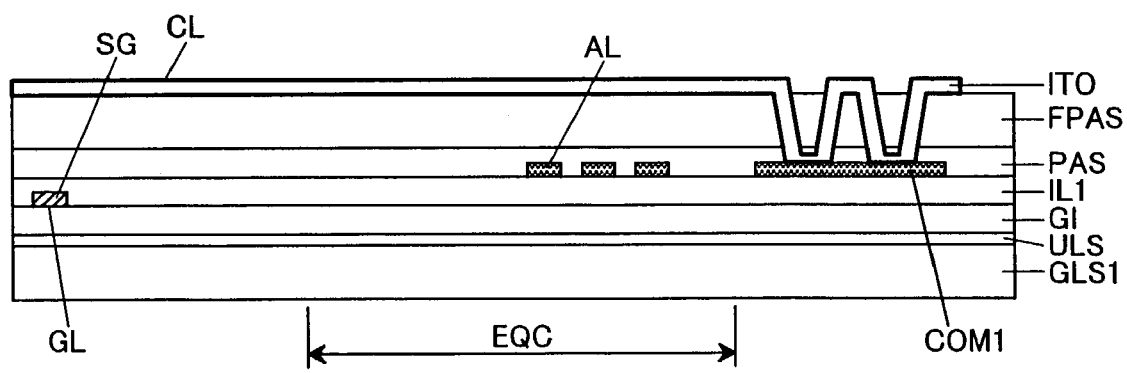
FIG. 59C is a sectional view taken along line c—c of FIG. 59B.

FIGS. 59A, 59B and 59B are views showing a further specific construction of the embodiment shown in FIG. 58, and are views each corresponding to FIGS. 55A, 55B and 55B.

EMBODIMENT 19

Figure 60:
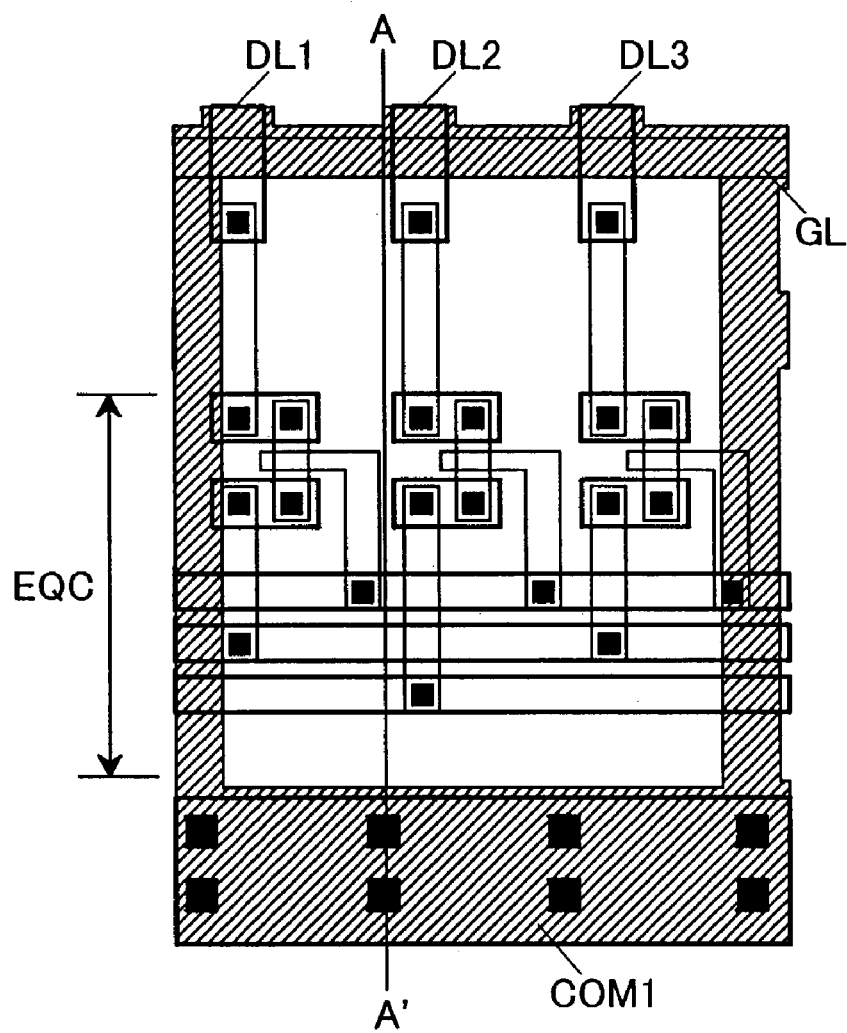
FIG. 60 is a view showing the constructions of other examples of the equalizing circuit and the peripheral portion thereof in Embodiment 18 of the liquid crystal display device according to the invention.
Figure 61:
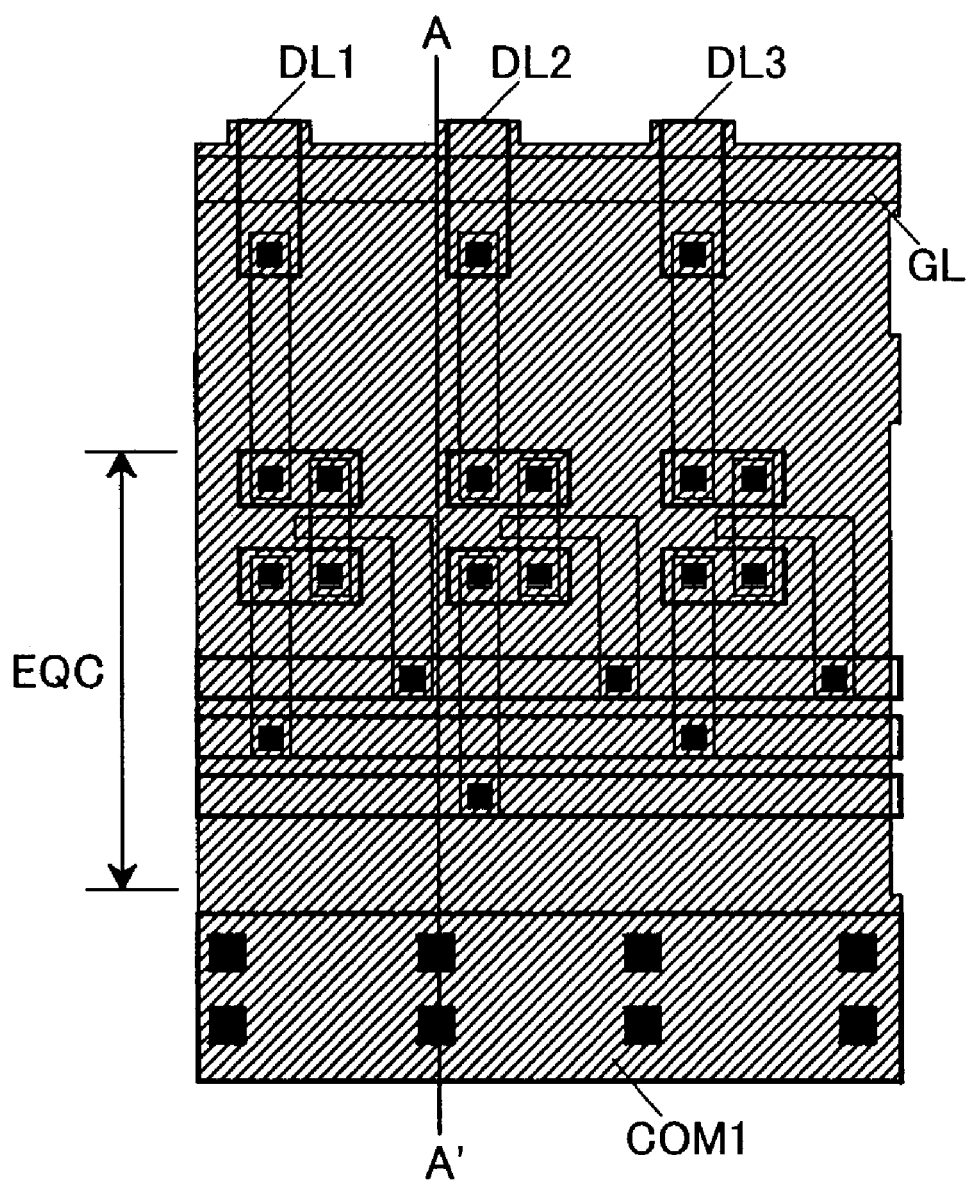
FIG. 61 is a view showing the constructions of other examples of the equalizing circuit and the peripheral portion thereof in Embodiment 18 of the liquid crystal display device according to the invention.

FIGS. 60 and 61 are plan views showing other embodiments of the liquid crystal display device according to the invention, and are views each corresponding to FIG. 59B.

The number of counter voltage signal lines CL disposed to intersect the drain distribution circuit DDC is four for each predetermined length thereof, for example, in the case of the construction shown in FIG. 59B and two, for example, in the case of the construction shown in FIG. 60. In the case of the construction shown in FIG. 61, the counter voltage signal lines CL disposed to intersect the drain distribution circuit DDC are formed to cover the whole of the area in which the drain distribution circuit DDC is formed. In the case of the construction shown in FIG. 61, there is an advantage which decreases the electrical resistances of the counter voltage signal lines CL and the interconnection layer COM itself.

EMBODIMENT 20

Figure 63:
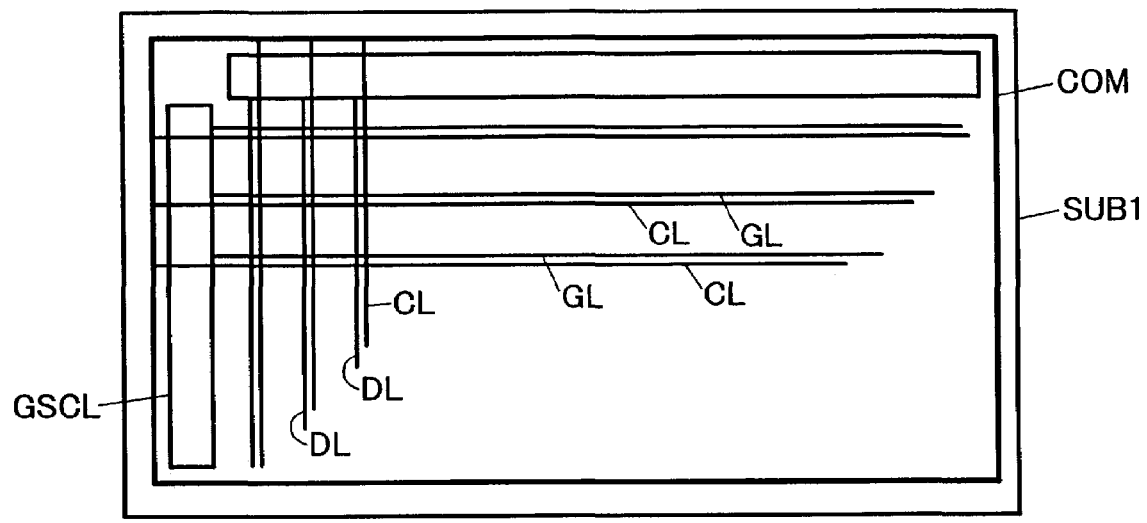
FIG. 63 is an explanatory view of Embodiment 20 of the liquid crystal display device according to the invention.
Figure 64:
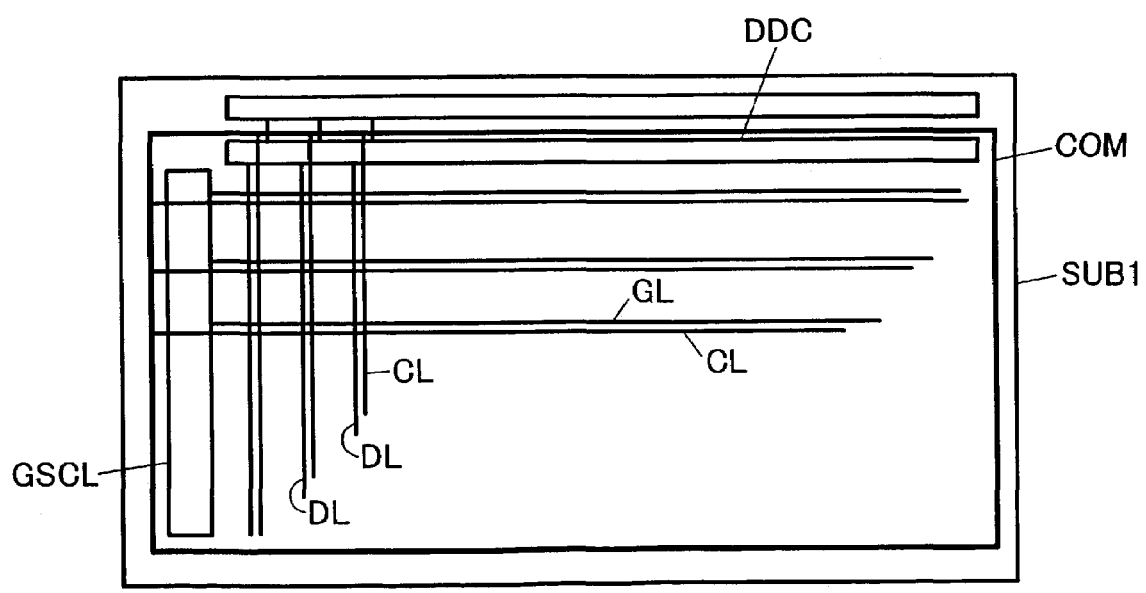
FIG. 64 is an explanatory view of a modification of Embodiment 20 of the liquid crystal display device according to the invention.

FIGS. 63 and 64 are schematic views showing different constructions of Embodiment 20 of the liquid crystal display device according to the invention.

In the construction shown in FIG. 63, a annular-shaped interconnection layer COM is formed to extend along the periphery of the transparent substrate SUB1, and this interconnection layer COM is formed outside the scanning signal driver circuit GSCL and the video signal driver circuit.

In this case as well, the counter voltage signal line CL (or the capacitance signal line CST1) is extended to intersect the scanning signal driver circuit GSCL and the video signal driver circuit, and is electrically connected to the interconnection layer COM.

As shown in FIG. 64, in a construction in which the video signal driver circuit is provided with the drain distribution circuit DDC, the interconnection layer COM may be formed to run through the portion between the drain distribution circuit DDC and the other circuit in the drain current.

Moreover, it goes without saying that the above-described interconnection layer COM is partly formed so that the interconnection layer is formed to surround the scanning signal driver circuit GSCL, the video signal driver circuit, and the drain distribution circuit DDC or the equalizing circuit EQC.

In any of the above-described embodiments, switching elements are made of a semiconductor layer made of polysilicon. However, it goes without saying that any of the embodiments can be applied to switching elements made of a semiconductor layer made of amorphous silicon or the like.

It also goes without saying that the above-described embodiments can be appropriately combined.

Moreover, each of the embodiments has been described with reference to a liquid crystal display device, but as long as the circuit constructions and the pattern layouts of the circuit parts disclosed in the above description of the embodiments are used, any of the embodiments can serve their advantages even in an image display device having no crystal liquid and using self-emission elements such as organic electroluminescent elements or inorganic electroluminescent elements.

As is apparent from the foregoing description, in the liquid crystal display device according to the invention, it is possible to restrain static electricity from entering the scanning signal driver circuit or the video signal driver circuit. It is also possible to restrain the leak of light through the scanning signal driver circuit or the video signal driver circuit. Furthermore, it is possible to prevent the malfunction of the scanning signal driver circuit or the video signal driver circuit.

The invention is not limited to any of the above-described constructions, and can be modified in various ways without departing from the technical idea of the invention.

What is claimed is:

1. A display device comprising:
    a pair of substrates;
    a signal line, a capacitance line and a counter voltage line formed on one substrate of the pair of substrate;
    a pixel comprising a thin film transistor connected to the signal line, a pixel electrode connected to the thin film transistor and a counter electrode connected to the counter voltage line;
    a driver circuit formed on the one substrate and connected to the signal line; and
    a first interconnection layer disposed between the pixel and the driver circuit;
    wherein at least one of the capacitance line and the counter voltage line is connected to the first interconnection layer between the driver circuit and the pixel;
    wherein the signal line is a pate signal line;
    wherein the driver circuit is a scanning signal driver circuit;
    wherein the first interconnection layer is disposed between the scanning signal driver circuit and the pixel, and wherein a second interconnection layer is disposed between the scanning signal driver circuit and a nearest edge of the one substrate to the scanning signal driver circuit.

2. A display device according to claim 1, wherein:
    at least one of the capacitance line and the counter voltage line is connected to the second interconnection layer between the scanning signal driver circuit and the nearest edge of the one substrate.

3. A display device according to claim 1, wherein:
    a width of the first interconnection layer between the scanning signal driver circuit and the pixel is smaller than a width of the second interconnection layer between the scanning signal driver circuit and the nearest edge of the one substrate.

4. A display device comprising:
    a pair of substrates;
    a signal line, a capacitance line and a counter voltage line formed on one substrate of the pair of substrate;
    a pixel comprising a thin film transistor connected to the signal line, a pixel electrode connected to the thin film transistor and a counter electrode connected to the counter voltage line;
    a driver circuit formed on the one substrate and connected to the signal line; and
    a first interconnection layer disposed between the pixel and a nearest edge of the one substrate to the driver circuit;
    wherein at least one of the capacitance line and the counter voltage line is connected to the first interconnection layer at a position between the driver circuit and the nearest edge of the one substrate;
    wherein the signal line is a gate signal line;
    wherein the driver circuit is a scanning signal driver circuit;
    wherein the first interconnection layer is disposed between the scanning signal driver circuit and the nearest edge of the one substrate;
    wherein a second interconnection layer is disposed between the scanning signal driver circuit and the pixel; and
    wherein a width of the second interconnection layer between the scanning signal driver circuit and the pixel is smaller than a width of the first interconnection layer between the scanning signal driver circuit and the nearest edge of the one substrate.

* * * * *